(12) United States Patent
Shibazaki

(10) Patent No.: US 11,691,217 B2
(45) Date of Patent: Jul. 4, 2023

(54) LASER PROCESSING DEVICE WITH OPTICAL DEVICE FOR CHANGING CROSS-SECTIONAL INTENSITY DISTRIBUTION OF A BEAM AT A PUPIL PLANE

(71) Applicant: NIKON CORPORATION, Tokyo (JP)

(72) Inventor: Yuichi Shibazaki, Kumagaya (JP)

(73) Assignee: NIKON CORPORATION, Tokyo (JP)

( * ) Notice: Subject to any disclaimer, the term of this patent is extended or adjusted under 35 U.S.C. 154(b) by 685 days.

(21) Appl. No.: 16/668,305

(22) Filed: Oct. 30, 2019

(65) Prior Publication Data

US 2020/0164463 A1    May 28, 2020

Related U.S. Application Data

(63) Continuation of application No. PCT/JP2018/016986, filed on Apr. 26, 2018.

(51) Int. Cl.
*B23K 26/066* (2014.01)
*B23K 26/064* (2014.01)
(Continued)

(52) U.S. Cl.
CPC .......... *B23K 26/0665* (2013.01); *B23K 26/03* (2013.01); *B23K 26/0344* (2015.10);
(Continued)

(58) Field of Classification Search
None
See application file for complete search history.

(56) References Cited

U.S. PATENT DOCUMENTS 6,737,662 B2    5/2004 Mulder et al.
6,940,582 B1    9/2005 Tanaka
(Continued)

FOREIGN PATENT DOCUMENTS

JP    H07-185863 A    7/1995
JP    H10-293220 A    11/1998
(Continued)

OTHER PUBLICATIONS

Jul. 7, 2021 Office Action issued in Taiwanese Patent Application No. 107114704.
(Continued)

*Primary Examiner* — Geoffrey S Evans
(74) *Attorney, Agent, or Firm* — Oliff PLC

(57) ABSTRACT

A processing apparatus is equipped with: a first stage system that has a table on which a workpiece is placed and moves the workpiece held by the table; a beam irradiation system that includes a condensing optical system to emit beams; and a controller to control the first stage system and the beam irradiation system, and processing is performed to a target portion of the workpiece while the table and the beams from the condensing optical system are relatively moved, and at least one of an intensity distribution of the beams at a first plane on an exit surface side of the condensing optical system and an intensity distribution of the beams at a second plane whose position in a direction of an optical axis of the condensing optical system is different from the first plane can be changed.

81 Claims, 20 Drawing Sheets

(51) Int. Cl.
  *B23K 26/06* (2014.01)
  *B23K 26/03* (2006.01)
  *B23K 26/70* (2014.01)
  *B23K 26/073* (2006.01)
  *B23K 26/08* (2014.01)
  *B23Q 3/18* (2006.01)

(52) U.S. Cl.
  CPC .......... *B23K 26/064* (2015.10); *B23K 26/066* (2015.10); *B23K 26/0643* (2013.01); *B23K 26/0648* (2013.01); *B23K 26/073* (2013.01); *B23K 26/0861* (2013.01); *B23K 26/705* (2015.10); *B23Q 3/186* (2013.01)

(56) References Cited

U.S. PATENT DOCUMENTS

| | | | |
|---|---|---|---|
| 7,009,717 | B2 | 3/2006 | Van Coppenolle et al. |
| 7,782,443 | B2 * | 8/2010 | Fiolka ................ G03F 7/70116 359/639 |
| 8,456,624 | B2 | 6/2013 | Tanitsu et al. |
| 9,339,889 | B2 | 5/2016 | Urata et al. |
| 9,659,774 | B2 | 5/2017 | Nakazawa et al. |
| 2002/0017509 | A1 | 2/2002 | Ishide et al. |
| 2002/0041377 | A1 | 4/2002 | Hagiwara et al. |
| 2012/0105867 | A1 | 5/2012 | Komatsu |
| 2014/0008340 | A1 | 1/2014 | Urata et al. |
| 2014/0070073 | A1 | 3/2014 | Ishizuka et al. |
| 2015/0336209 | A1 | 11/2015 | Yamashita et al. |
| 2016/0005606 | A1 | 1/2016 | Nakazawa et al. |
| 2017/0304947 | A1 * | 10/2017 | Shibazaki .......... B23K 26/0665 |

FOREIGN PATENT DOCUMENTS

| | | |
|---|---|---|
| JP | H10-314965 A | 12/1998 |
| JP | 2000-071086 A | 3/2000 |
| JP | 2000-180648 A | 6/2000 |
| JP | 2003-334674 A | 11/2003 |
| JP | 2007-253167 A | 10/2007 |
| JP | 4891445 B1 | 3/2012 |
| JP | 2012-192503 A | 10/2012 |
| JP | 2014-133248 A | 7/2014 |
| JP | 2016-018816 A | 2/2016 |
| WO | 2016-075802 A1 | 5/2016 |
| WO | WO-2016075802 A1 * | 5/2016 ............. B22F 10/00 |
| WO | WO-2016075803 A1 * | 5/2016 ............. B22F 3/105 |

OTHER PUBLICATIONS

Jul. 17, 2018 International Search Report issued in International Patent Application No. PCT/JP2018/016986.
Jul. 17, 2018 Written Opinion of the International Searching Authority issued in International Patent Application No. PCT/JP2018/016986.
Apr. 16, 2021 Office Action issued in Chinese Patent Application No. 201880037290.3.
May 20, 2021 Search Report issued in European Patent Application No. 18794057.2.
Jun. 15, 2021 Office Action issued in Japanese Patent Application No. 2019-516303.
May 12, 2022 Office Action issued in Chinese Patent Application No. 201880037290.3.
Nov. 24, 2021 Japanese Office Action issued for Japanese Patent Application No. 2019-515710.
Oct. 19, 2021 Office Action issued in Chinese Patent Application No. 201880037290.3.
Feb. 14, 2023 Office Action issued in Japanese Patent Application No. 2022-005260.
Apr. 4, 2023 Office Action issued in European Patent Application No. 18 794 057.2.

* cited by examiner

Fig. 5
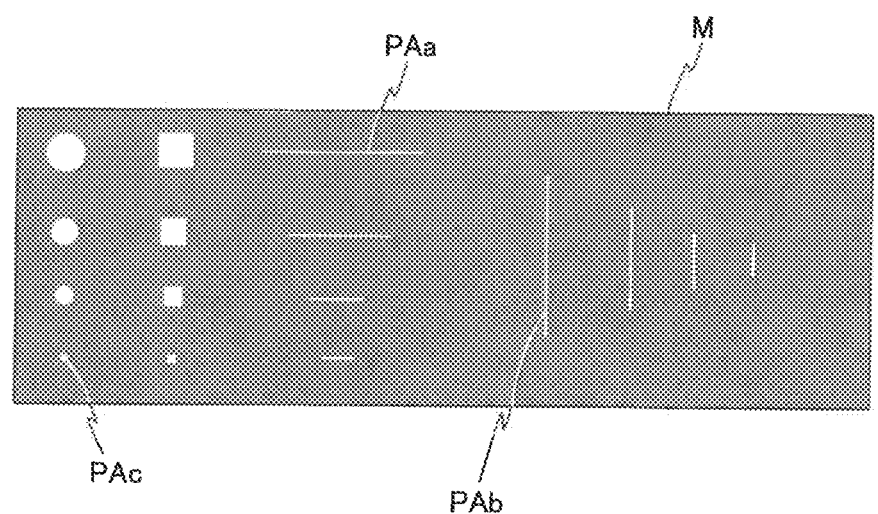
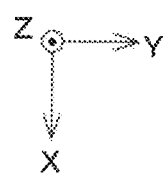

Fig. 10A
| PROCESSING MODE | 1 | 2 | 3 | 4 | 5 | 6 |
|---|---|---|---|---|---|---|
| ILLUMINATION SHAPE | | | | | | |
| OPENING SHAPE | 10μm x 10mm Slit | 10μm x 10mm Slit | 10μm x 10mm Slit | 10μm x 10mm Slit | Φ10μm Pinhole | Φ10μm Pinhole |
| OPTICAL BLADE FRONT VIEW | Tip width 1μm, 1mm | | | | Φ1μm Beam | Φ1μm Spot |
| OPTICAL BLADE SIDE VIEW | | | | | Φ1μm Beam | Φ1μm Spot |
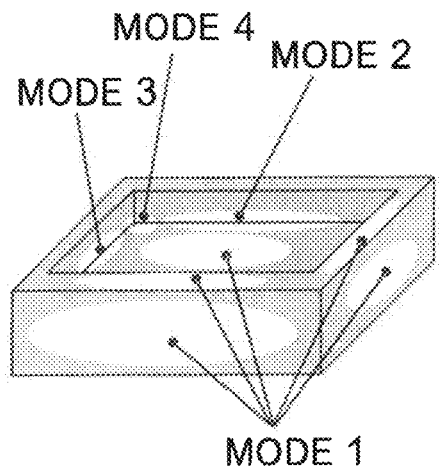
Fig. 10B
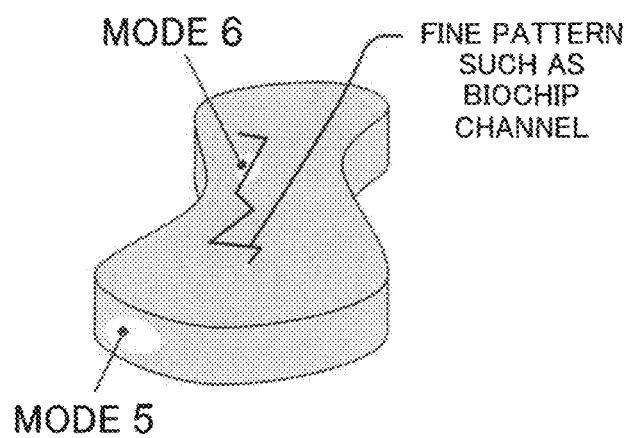
Fig. 10C

*Fig. 13A*  *Fig. 13B*
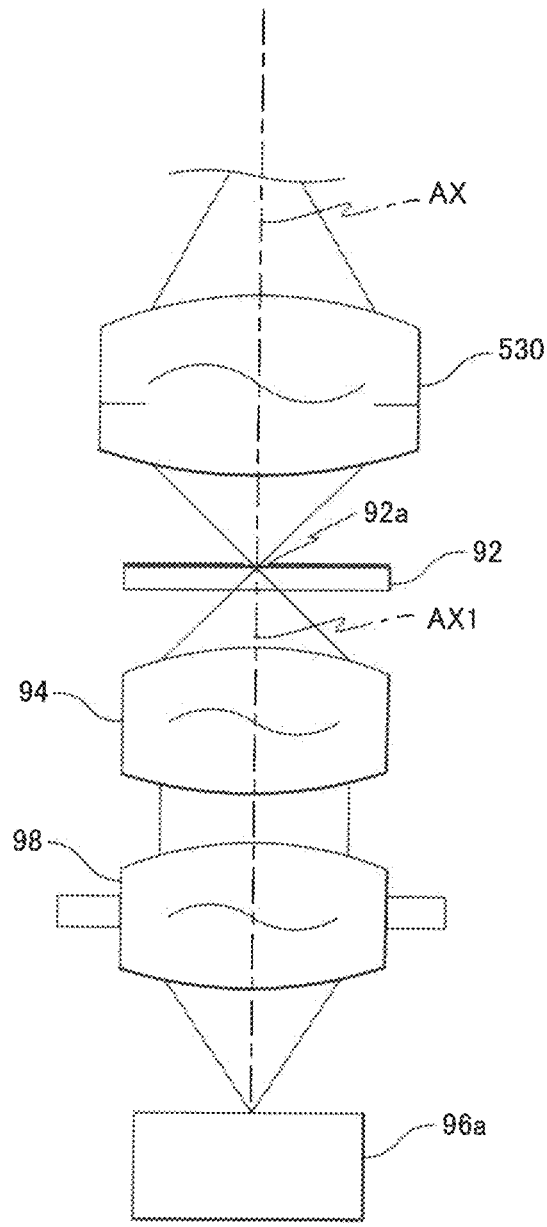
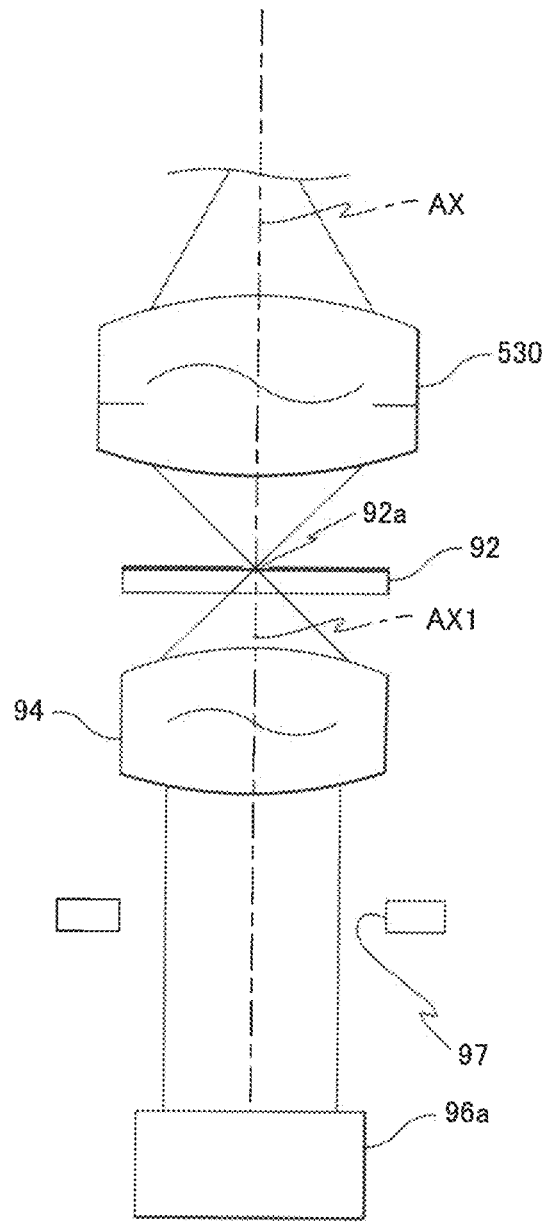
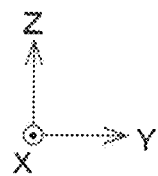

Fig. 17

| | CONVENTIONAL MACHINE TOOL | PROCESSING TYPE | PROCESSING APPARATUS RELATED TO EMBODIMENT | |
|---|---|---|---|---|
| | | | APPLICABILITY | NOTE |
| REMOVAL PROCESSING | MACHINING CENTER/ GRINDING CENTER | PLANE CUTTING/GRINDING | YES | |
| | | CYLINDRICAL CUTTING/GRINDING | YES | |
| | | DRILLING CUTTING/GRINDING | YES | APPLICABLE WITH HIGH ACCURACY |
| | PLANE GRINDER | PLANE GRINDING/POLISHING | YES | |
| | CYLINDRICAL GRINDER | CYLINDRICAL GRINDING | YES | |
| | LASER PROCESSING MACHINE | CUTTING-OFF | YES | APPLICABLE WITH HIGH ACCURACY |
| | LASER WRITER | PRINTING/ENGRAVING OF CHARACTERS/PATTERNS | YES | |
| | DIE SINKING ELECTRIC DISCHARGE MACHINE | TRANSFER IN FREE FORM BY METAL MOLD | YES | APPLICABLE WITH HIGH ACCURACY AND HIGH SPEED |
| | WIRE ELECTRIC DISCHARGE MACHINE | CUTTING-OFF | YES | |
| | LOW-END EXPOSURE APPARATUS | GENERATION OF FINE SHAPES | YES | ALSO APPLICABLE TO THREE-DIMENSIONAL SHAPES |
| HEAT TREATMENT | LASER QUENCHING MACHINE | QUENCHING TREATMENT (SURFACE MODIFICATION TREATMENT) | YES | POSSIBLE IN PARALLEL WITH REMOVAL PROCESSING |
| MEASUREMENT | THREE-DIMENSIONAL MEASUREMENT INSTRUMENT | SHAPE INSPECTION | YES | POSSIBLE TO USE MEASUREMENT SYSTEM 400 ALSO FOR INSPECTION |

LASER PROCESSING DEVICE WITH OPTICAL DEVICE FOR CHANGING CROSS-SECTIONAL INTENSITY DISTRIBUTION OF A BEAM AT A PUPIL PLANE

CROSS-REFERENCE TO RELATED APPLICATIONS

This application is a continuation of International Application PCT/JP2018/016986, with an international filing date of Apr. 26, 2018, the disclosure of which is hereby incorporated herein by reference in its entirety, which was not published in English.

BACKGROUND OF THE INVENTION

Field of the Invention

The present invention relates to a processing apparatus and a processing method, and more particularly to a processing apparatus and a processing method to process a workpiece by irradiating the workpiece with a beam.

Description of the Background Art

In the field of machine tools to make machines, improvement in convenience and performance of processing apparatuses using laser beams or the like (e.g., see U.S. Patent Application Publication No. 2002/0017509), as machine tools, is strongly desired.

SUMMARY OF THE INVENTION

According to a first aspect of the present invention, there is provided a processing apparatus to process a workpiece by irradiating the workpiece with a beam, the apparatus comprising: a first holding system that has a first holding member on which the workpiece is placed, and moves the workpiece held by the first holding member; a beam irradiation system including a condensing optical system to emit the beam; and a controller, wherein processing is performed to a target portion of the workpiece while the first holding member and a beam from the condensing optical system are relatively moved, and at least one of an intensity distribution of the beam at a first plane on an exit surface side of the condensing optical system and an intensity distribution of the beam at a second plane can be changed, the second plane being different from the first plane in position in a direction of an optical axis of the condensing optical system.

Here, the first plane may be a virtual (imaginary) plane which the target portion of the workpiece should be aligned with on the processing. The first plane may be, for example, a plane perpendicular to the optical axis of the condensing optical system. The first plane may be an image plane of the condensing optical system or a plane near the image plane, or a rear side focal plane or a plane near the rear side focal plane.

According to a second aspect of the present invention, there is provided a processing apparatus to process a workpiece by irradiating the workpiece with a beam, the apparatus comprising: a first holding system that has a first holding member on which the workpiece is placed, and moves the workpiece held by the first holding member; a beam irradiation system including a condensing optical system to emit the beam; and a controller, wherein processing is performed to a target portion of the workpiece while a beam irradiated from the condensing optical system to a first plane and the first holding member are relatively moved, and the beam irradiation system has an optical device that is capable of changing a cross-sectional intensity distribution of a beam, emitted from the condensing optical system, at a pupil plane of the condensing optical system.

According to a third aspect of the present invention, there is provided a processing apparatus to process a workpiece by irradiating the workpiece with a beam, the apparatus comprising: a first holding system that has a first holding member on which the workpiece is placed, and moves the workpiece held by the first holding member; a beam irradiation system including a condensing optical system to emit the beam; and a controller, wherein processing is performed to a target portion of the workpiece while the first holding member and a beam from the condensing optical system are relatively moved, and an intensity distribution of the beam, at a plane perpendicular to an optical axis of the condensing optical system on an exit surface side of the condensing optical system, can be changed.

According to a fourth aspect of the present invention, there is provided a processing apparatus to process a workpiece by irradiating the workpiece with a beam, the apparatus comprising: a first holding system that has a first holding member on which the workpiece is placed, and moves the workpiece held by the first holding member; a beam irradiation system including a condensing optical system to emit the beam; and a controller, wherein processing is performed to a target portion of the workpiece while a beam that is irradiated from the condensing optical system to a first plane and the first holding member are relatively moved, and an intensity distribution in a cross section of the beam emitted from the condensing optical system is onefold rotationally symmetric.

According to a fifth aspect of the present invention, there is provided a processing method of processing a workpiece by irradiating the workpiece with a beam, the method comprising: holding a workpiece on a first holding member; and performing processing to a target portion of the workpiece while relatively moving a beam emitted from a beam irradiation system including a condensing optical system and the first holding member on which the workpiece is held, wherein on the processing, at least one of an intensity distribution of the beam at a first plane on an exit surface side of the condensing optical system and an intensity distribution of the beam at a second plane is changed, the second plane being different from the first plane in position in a direction of an optical axis of the condensing optical system.

According to a sixth aspect of the present invention, there is provided a processing method of processing a workpiece by irradiating the workpiece with a beam, the method comprising: holding a workpiece on a first holding member; and performing processing to a target portion of the workpiece while relatively moving a beam, irradiated from a beam irradiation system including a condensing optical system to a first plane, and the first holding member on which the workpiece is held, wherein on the processing, an intensity distribution, at a pupil plane of the condensing optical system, of a beam emitted from the condensing optical system is changed.

According to a seventh aspect of the present invention, there is provided a processing method of processing a workpiece by irradiating the workpiece with a beam, the method comprising: holding a workpiece on a first holding member; and performing processing to a target portion of the workpiece while relatively moving a beam, irradiated from a beam irradiation system including a condensing optical system to a first plane, and the first holding member on which the workpiece is held, wherein an intensity distribution in a cross section of a beam emitted from the condensing optical system is one-fold rotationally symmetric.

According to an eighth aspect of the present invention, there is provided a processing method of processing a workpiece by irradiating the workpiece with a beam, the method comprising: holding a workpiece on a first holding member; and performing processing to a target portion of the workpiece while relatively moving a beam emitted from a beam irradiation system including a condensing optical system and the first holding member on which the workpiece is held, wherein on the processing, an intensity distribution of the beam, at a plane perpendicular to an optical axis of the condensing optical system on an exit surface side of the condensing optical system, is changed.

BRIEF DESCRIPTION OF DRAWINGS

In the accompanying drawings;

FIG. 5 is a plan view of the mask;

FIG. 10A is a diagram for an example of processing modes that can be set in the processing apparatus related to the present embodiment, FIG. 10B is a view for explaining a processing with each of optical blades of Mode 1, Mode 2, Mode 3 and Mode 4, and FIG. 10C is a view for explaining a processing with each of optical blades of Mode 5 and Mode 6;

FIG. 13A is a view showing an optical arrangement when the intensity distribution of the beams at an image plane of the condensing optical system is measured, and FIG. 13B is a view showing an optical arrangement when the intensity distribution of the beams at a pupil plane is measured;

FIG. 17 is a view showing the contents of various types of processing that can be performed by the processing apparatus, made to correspond to conventional machine tools used for performing the respective types of processing;

DESCRIPTION OF EMBODIMENTS

Figure 1:
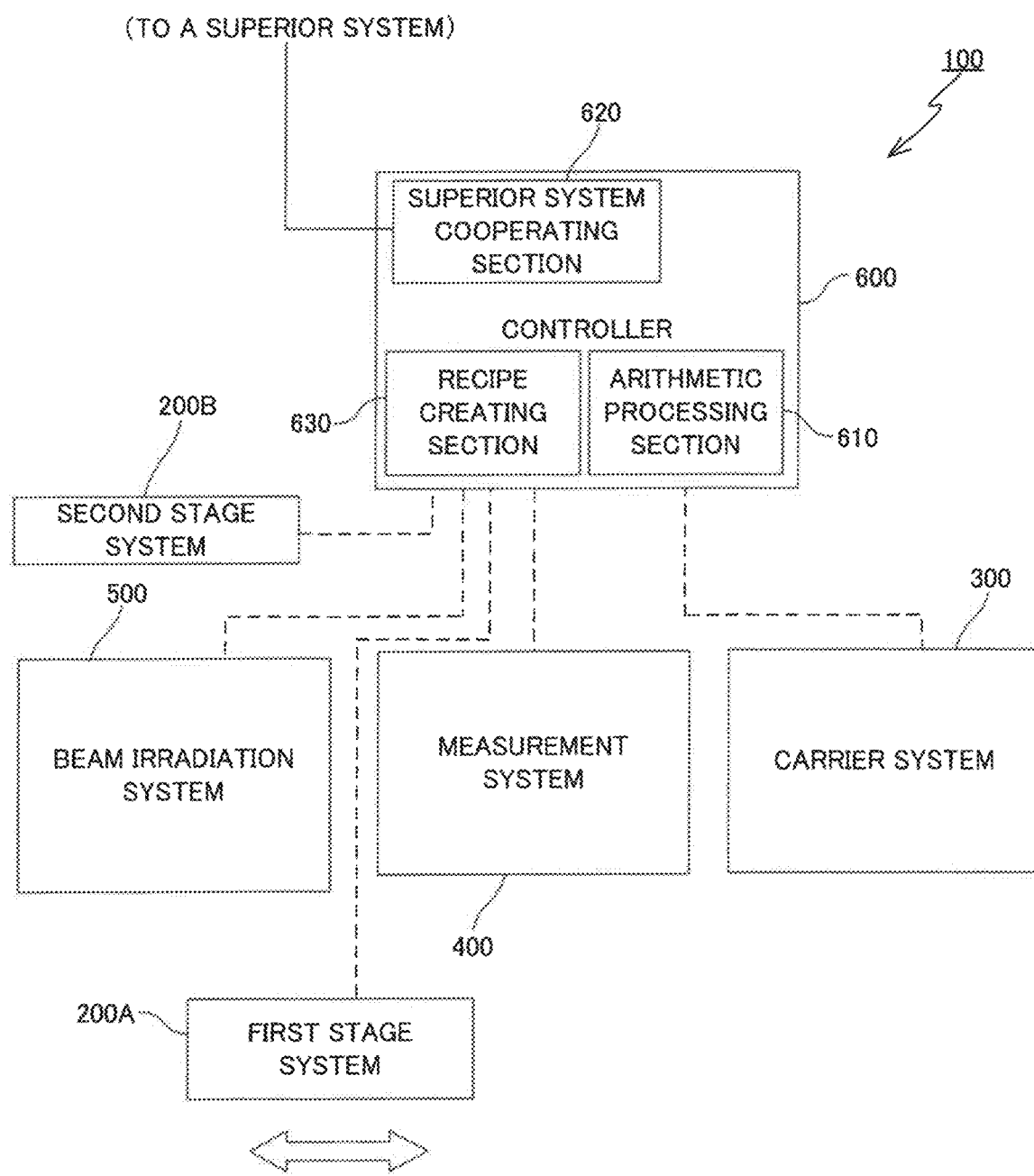
FIG. 1 is a block diagram showing the overall configuration of a processing apparatus related to an embodiment.

An embodiment will be described below, on the basis of FIGS. 1 to 21. FIG. 1 shows in a block diagram the overall configuration of a processing apparatus 100 related to the embodiment.

Processing apparatus 100 is an apparatus that performs various types of processing including removal processing (corresponding to cutting machining, grinding machining and the like performed as machine processing) by irradiating a processing target (which is also referred to as a workpiece) with a beam (generally, a laser beam).

Processing apparatus 100 is equipped with a first stage system 200A, a second stage system 200B, a carrier system 300, a measurement system 400 and a beam irradiation system 500, and a controller 600 to control the entire processing apparatus 100 including these five systems. Carrier system 300, measurement system 400 and beam irradiation system 500, of these systems, are disposed separately from each other in a predetermined direction. Hereinafter, for the sake of convenience, carrier system 300, measurement system 400 and beam irradiation system 500 are assumed to be disposed separately from each other in an X-axis direction (see FIG. 2) which will be described later.

Figure 2:
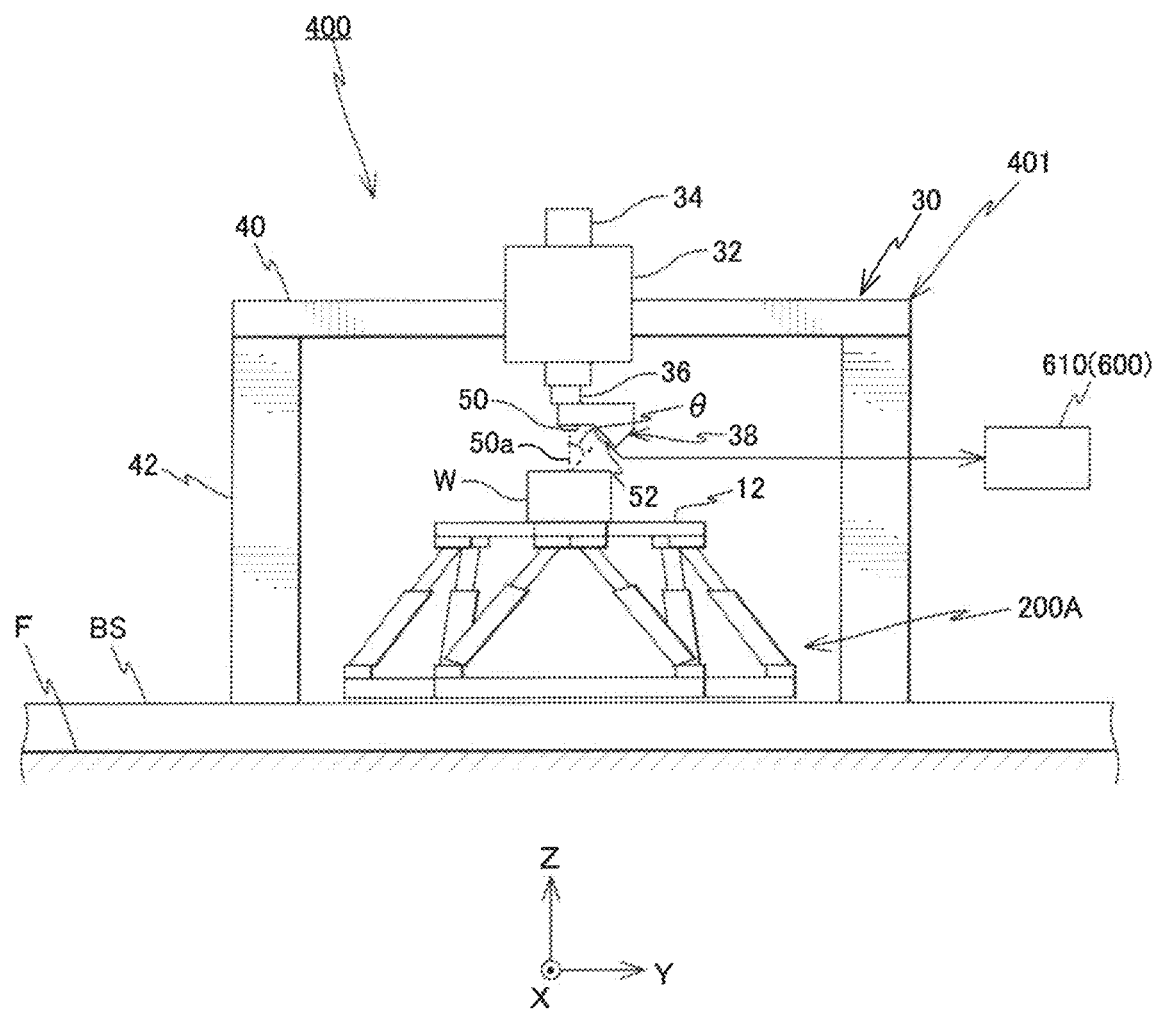
FIG. 2 is a view schematically showing the configuration of a first stage system, together with a measurement system.
Figure 3:
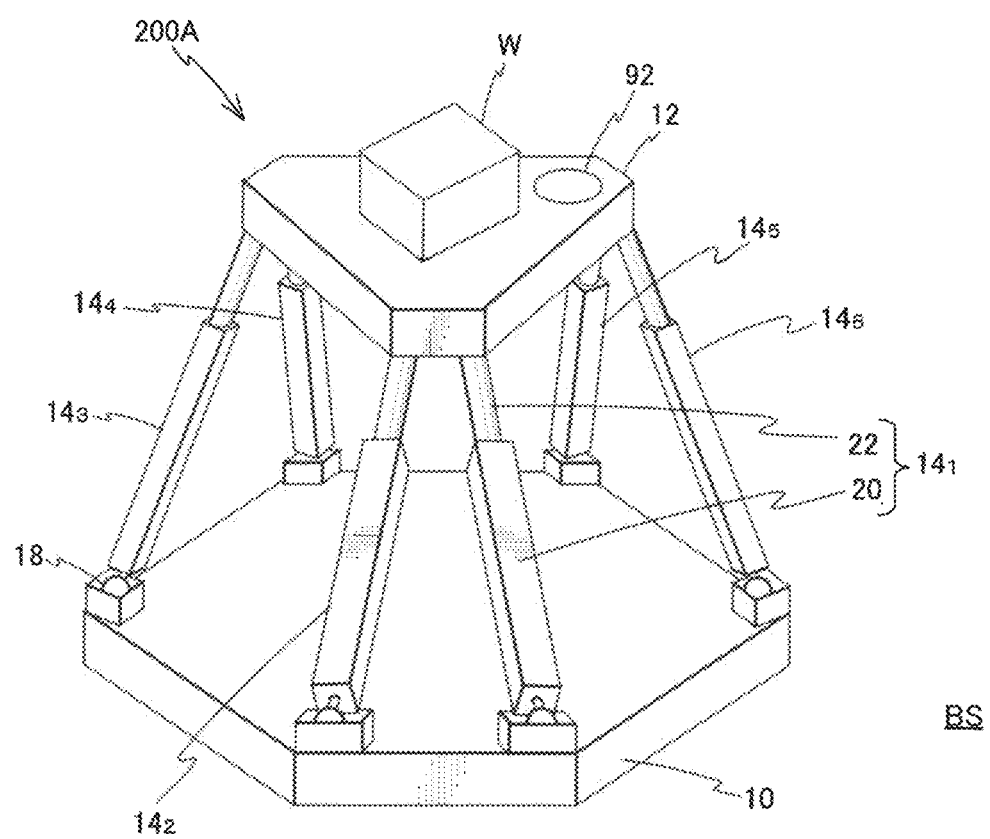
FIG. 3 is a perspective view showing the first stage system on which a workpiece is mounted.

FIG. 2 schematically shows the configuration of the first stage system 200A, together with measurement system 400. FIG. 3 shows in a perspective view the first stage system 200A on which a workpiece W is mounted. Hereinafter, the explanation will be made assuming that a lateral direction in a paper surface of FIG. 2 is a Y-axis direction, a direction orthogonal to the paper surface is the X-axis direction, and a direction orthogonal to the X-axis and the Y-axis is a Z-axis direction, and rotation (tilt) directions around the X-axis, the Y-axis and the Z-axis are a ex direction, a θy direction and a θz direction, respectively.

The first stage system 200A changes the position and the attitude of workpiece W. Specifically, a table to be described later, on which workpiece W is mounted, is moved in directions of six degrees of freedom (respective directions of the X-axis, the Y-axis, the Z-axis, the θx, the θy and the θz), and thereby the position of workpiece W in the directions of six degrees of freedom is changed. In the present text, regarding the table, the workpiece or the like, its position in directions of three degrees of freedom, i.e., the θx direction, the θy direction and the θz direction is generically referred to as the attitude where necessary, and correspondingly thereto, its position in remaining directions of three degrees of freedom (the X-axis direction, the Y-axis direction and the Z-axis direction) is generically referred to as the position where necessary.

The first stage system 200A is equipped with a six degrees of freedom parallel link mechanism of Stewart platform type, as an example of a drive mechanism to change the position and the attitude of the table. The Stewart platform is a robot that supports one flat surface (a member, e.g., a top plate) with six actuators and controls the position and the tilt of the top plate. The top plate configures an end effector. The top plate is supported at three points, and each point is supported by the two actuators. The length of each actuator is controllable, and the angle is free. The top plate has the six degrees of freedom. Since the Stewart platform is capable of controlling the tope pate in the six degrees of freedom, it is also referred to as a six-axis platform, a 6-DOF platform, a six degrees of freedom parallel link mechanism, and the like. Note that the first stage system 200A is not limited to a system capable of moving the table in the directions of six degrees of freedom, and not limited to the parallel link mechanism.

As shown in FIG. 2, the first stage system 200A (but, excluding a stator of a planar motor to be described later) is disposed on a base BS installed on a floor F so that the upper surface of base BS is substantially parallel to an XY-plane. Note that a vibration isolating device may be disposed between floor F and base BS. As shown in FIG. 3, the first stage system 200A has: a slider 10 having a hexagonal shape in planar view that configures a base platform; a table that configures an end effector, six extendable/contractible rods (links) $14_1$ to $14_6$ that link slider 10 and table 12; and telescopic mechanisms $16_1$ to $16_6$ (not illustrated in FIG. 3, see FIG. 14) that are provided at rods $14_1$ to $14_6$, respectively, and extend and contract the respective rods. The first stage system 200A has a structure capable of controlling movement of table 12 in six degrees of freedom within a three-dimensional space, by independently adjusting the lengths of rods $14_1$ to $14_6$ by telescopic mechanisms $16_1$ to $16_6$, respectively. Since the first stage system 200A is equipped with the six degrees of freedom parallel link mechanism of Stewart platform type as the drive mechanism for table 12, the first stage system 200A has features such as high precision, high rigidity, large support force, easy inverse kinematic calculation and the like.

In processing apparatus 100 related to the present embodiment, at the time such as when processing with respect to workpieces is performed, in order to perform desirable processing to the workpieces, the position and the attitude of workpiece W (table 12) are controlled relative to beam irradiation system 500, more specifically, a beam from an illumination optical system to be described later. In principle, the beam from the illumination optical system may be movable, which is reverse to the above, or both of the beam and the workpiece (the table) may be movable. Beam irradiation system 500 has a complicated configuration as will be described later, and therefore, it is easier and more convenient to move the workpiece.

Herein, table 12 is made up of a plate member having a shape like an equilateral triangle with respective vertices cut away. Workpiece W to be processed is mounted on the upper surface of table 12. Table 12 is provided with a chuck mechanism 13 (not illustrated in FIG. 3, see FIGS. 4 and 14) for fixing workpiece W. As chuck mechanism 13, for example, a mechanical chuck, a vacuum chuck or the like is employed. Further, table 12 is provided with a measurement device 110 (see FIGS. 11 and 12) that includes a measurement member 92 with a circular shape in planar view as shown in FIG. 3. Measurement device 110 will be described later. Note that the shape of table 12 is not limited to that shown in FIG. 3, but may be any shape such as a rectangular plate shape or a discoidal shape.

In this case, as clear from FIG. 3, both ends of each of rods $14_1$ to $14_6$ are connected to slider 10 and table 12 via universal joints 18. Further, rods $14_1$ and $14_2$ are connected to the vicinity of one vertex position of the triangle of table 12, and are disposed so that a rough triangle is formed by slider 10 and these rods $14_1$ and $14_2$. Similarly, rods $14_3$ and $14_4$ and rods $14_5$ and $14_6$ are connected to the vicinity of the remaining vertex positions of the triangle of table 12, respectively, and disposed so that a rough triangle is formed by slider 10 and rods $14_3$ and $14_4$, and a rough triangle is formed by slider 10 and rods $14_5$ and $14_6$.

Each of these rods $14_1$ to $14_6$ has a first axis member 20 and a second axis member 22 that are relatively movable in the respective axis directions, as representatively shown by rod $14_1$ in FIG. 3, and one end (the lower end) of the first axis member 20 is attached to slider 10 via universal joint 18, and the other end (the upper end) of the second axis member 22 is attached to table 12 via the universal joint.

Inside the first axis member 20, a hollow section with a stepped columnar shape is formed, and for example, an air cylinder of bellows type is housed on the lower end side of this hollow section. An air pressure circuit and an air pressure source (neither of them is illustrated) are connected to this air cylinder. And, the inner pressure of the air cylinder is controlled by controlling the air pressure of compressed air supplied from the air pressure source via the air pressure circuit, which allows reciprocal movement in the axis direction of a piston that the air cylinder has. Note that movement of the piston may be performed by utilizing the gravity force acting on the piston.

Further, on the upper end side within the hollow section of the first axis member 20, an armature unit (not illustrated) made up of a plurality of armature coils lying side by side in the axis direction is disposed.

The second axis member 22 has one end (the lower end) located in the hollow section of the first axis member 20. At this one end of the second axis member 22, a small diameter section with a diameter smaller compared to the other sections is formed, and around this small diameter section, a mover yoke having a circular pipe shape and being made up of a magnetic member is provided. On the outer periphery of the mover yoke, a magnetic body having a hollow columnar shape, i.e., a cylindrical shape, and being made up of a plurality of permanent magnets with the same dimension is provided. In this case, the mover yoke and the magnetic body configure a magnet unit with a hollow columnar shape. In the present embodiment, the armature unit and the magnet unit configure a shaft motor that is a type of electromagnetic force linear motors. In the shaft motor thus configured, drive electric current of sinusoidal wave with a predetermined period and a predetermined amplitude is supplied to each coil of the armature unit serving as a stator, and thereby the second axis member 22 is relatively moved with respect to the first axis member 20 in the axis direction by the Lorentz force (a drive force) generated by the electromagnet interaction that is a type of electromagnetic interactions between the magnet unit and the armature unit.

That is, in the present embodiment, the air cylinder and the shaft motor described above configure each of the foregoing telescopic mechanism $16_1$ to $16_6$ (see FIG. 14) to respectively extend and contract rods $14_1$ to $14_6$ by relatively moving the first axis member 20 and the second axis member 22 in the axis direction.

Further, the magnet unit serving as a mover of the shaft motor is supported in a noncontact manner with respect to the armature unit serving as the stator, via an air pad provided on the inner periphery surface of the first axis member 20.

Figure 14:
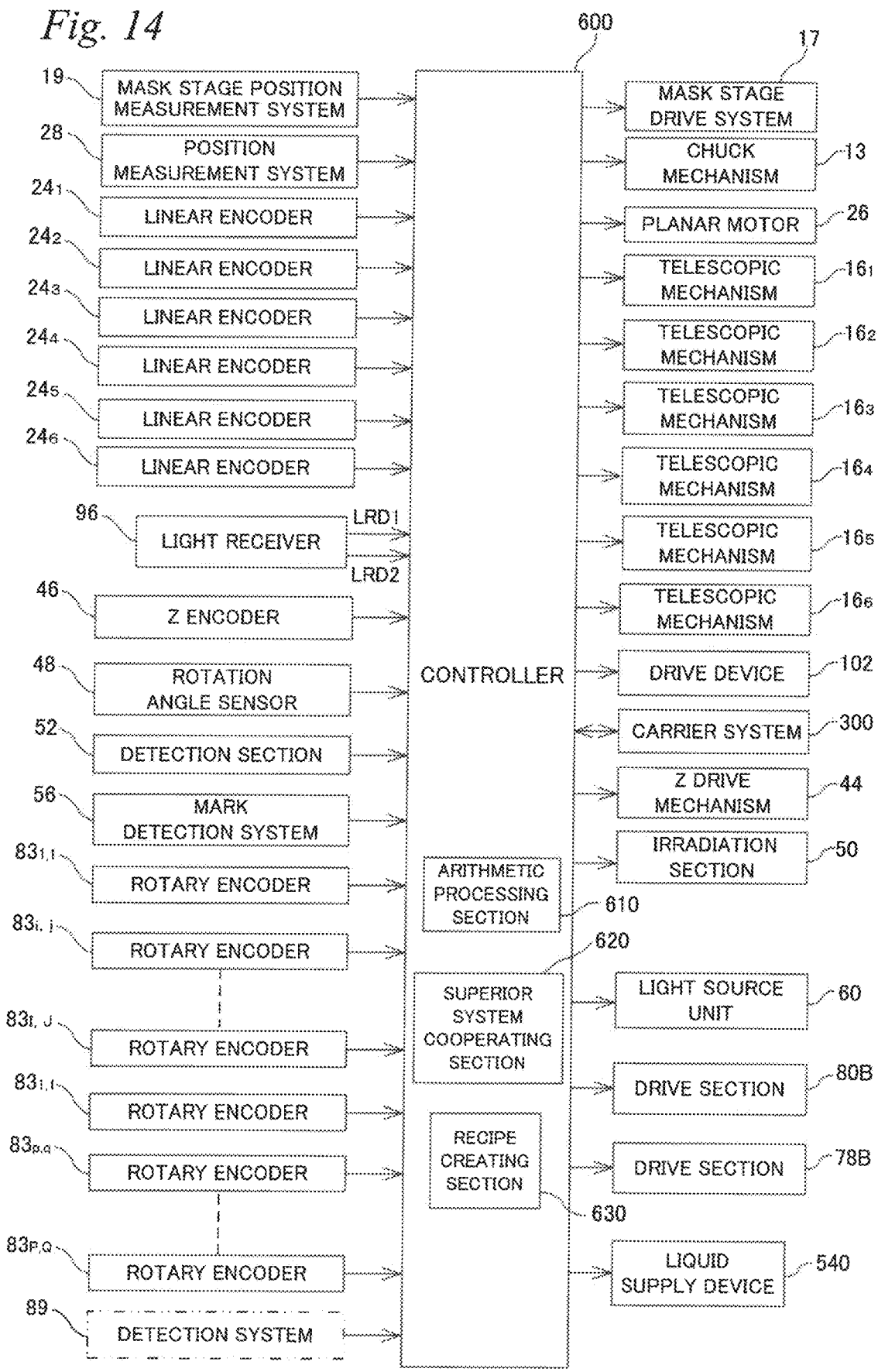
FIG. 14 is a block diagram showing the input/output relationship of a controller that centrally configures a control system of the processing apparatus.

Further, rods $14_1$ to $14_6$ are provided with linear encoders $24_1$ to $24_6$ of absolute type, respectively, that detect the position of the second axis member 22 in the axis direction with the first axis member 20 serving as a reference, though the illustration is omitted in FIG. 3, and the outputs of linear encoders $24_1$ to $24_6$ are supplied to controller 600 (see FIG. 14). The position of the second axis member 22 in the axis direction detected by each of linear encoders $24_1$ to $24_6$ corresponds to the length of each of rods $14_1$ to $14_6$.

Telescopic mechanisms $16_1$ to $16_6$ are controlled by controller 600, on the basis of the outputs of linear encoders $24_1$ to $24_6$ (see FIG. 14). The details of the configuration of a parallel link mechanism similar to the first stage system 200A of the present embodiment are disclosed in, for example, U.S. Pat. No. 6,940,582, and controller 600 controls the position and the attitude of table 12 via telescopic mechanisms $16_1$ to $16_6$ using inverse kinematic calculation, with a method similar to that disclosed in the above-mentioned U.S. patent.

In the first stage system 200A, telescopic mechanisms $16_1$ to $16_6$ provided respectively at rods $14_1$ to $14_6$ each have an air cylinder and a shaft motor, being a type of the electromagnetic force linear motors, that are mutually disposed in series (or in parallel). Therefore, with controller 600, table 12 can be roughly and largely moved by the air pressure control of the air cylinders, and also can be finely and slightly moved by the shaft motor. As a result, the position in the directions of six degrees of freedom (i.e., the position and the attitude) of table 12 can be accurately controlled in a short time.

Further, each of rods $14_1$ to $14_4$ has the air pad that supports the magnet unit serving as the mover of the shaft motor in a noncontact manner with respect to the armature unit serving as the stator, and therefore friction that is a nonlinear component when controlling the extension/contraction of the rods by the telescopic mechanisms can be avoided, and accordingly the position and the attitude of table 12 can be controlled with much higher accuracy.

Further, in the present embodiment, the shaft motor is employed as the electromagnetic force linear motor that configures each of telescopic mechanisms $16_1$ to $16_6$, and the magnet unit in which the magnet having a cylindrical shape is used on the mover side is employed in the shaft motor, and therefore, magnet flux (magnet field) is generated in all directions of the radiation directions of the magnet, and it is possible to make the magnet flux in the all directions contribute to the generation of the Lorentz force (the drive force) by the electromagnet interaction, and for example, it is possible to generate the thrust apparently larger compared to that of a typical linear motor or the like, which enables the motor to be downsized easily compared to a hydraulic cylinder or the like.

Consequently, with the first stage system 200A in which each of the rods includes the shaft motor, reduction in size and weight and improvement in outputs can be realized simultaneously, and the first stage system 200A can be suitably applied to processing apparatus 100.

Further, with controller 600, the low frequency vibration can be damped by controlling the air pressure of the air cylinder that configures each of the telescopic mechanisms, and the high frequency vibration can be isolated by the electric current control with respect to the shaft motors. Note that the telescopic mechanisms may be configured including the hydraulic cylinders.

Figure 20:
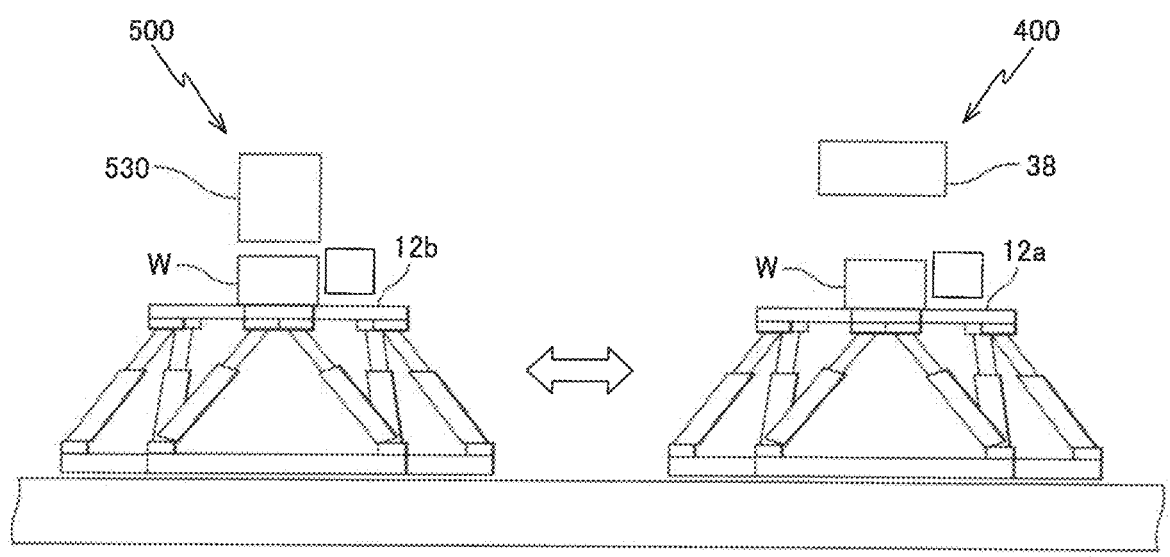
FIG. 20 is a view showing an example in which a plurality of tables are employed, in the processing apparatus related to the embodiment.

The first stage system 200A is further equipped with a planar motor 26 (see FIG. 14). On the bottom surface of slider 10, a mover of planar motor 26 made up of a magnet unit (or a coil unit) is provided, and correspondingly thereto, a stator of planar motor 26 made up of a coil unit (or a magnet unit) is housed inside base BS. The bottom surface of slider 10 is provided with a plurality of air bearings (air hydrostatic bearings) surrounding the mover, and slider 10 is levitated and supported above the upper surface (a guide surface) of base BS that is finished to have a high flatness degree, via a predetermined clearance (gap or spacing). Slider 10 is moved within the XY-plane in a noncontact manner with respect to the upper surface of base BS, by the electromagnetic force (the Lorentz force) generated by the electromagnet interaction between the stator and the mover of planar motor 26. In the present embodiment, the first stage system 200A is capable of freely moving table 12 among the arrangement positions of measurement system 400, beam irradiation system 500 and carrier system 300, as shown in FIG. 1. Note that the first stage system 200A may be equipped with a plurality of tables 12 on each of which workpiece W is mounted. For example, as shown in FIG. 20, the first stage system 200A may be equipped with two tables (12a and 12b) (in FIG. 20, a sensor section 38 to be described later representing measurement system 400, and a condensing optical system 530 to be described later representing beam irradiation system 500 are each shown). For example, while processing with beam irradiation system 500 is performed to a workpiece held by one of the plurality of tables, measurement with measurement system 400 may be performed to another workpiece held by another table. In such a case, each of the tables is freely movable among the arrangement positions of measurement system 400, beam irradiation system 500 and carrier system 300. Alternatively, in the case of employing a configuration in which a table for holding a workpiece for exclusive use at the time of measurement with measurement system 400 and another table holding a workpiece for exclusive use at the time of the processing with beam irradiation system 500 are provided and the carry-out and the carry-in of workpieces with respect to the two tables can be performed by a workpiece carrier system or the like, slider 10 for each table may be fixed on base BS. Even in the case providing the plurality of tables 12, tables 12 are each movable in the directions of six degrees of freedom, and their positions in the directions of six degrees of freedom are controllable.

Note that planar motor 26 is not limited a planar motor of air-floating method but a planar motor of magnetic levitation method may be employed. In the latter case, the air bearings need not be provided at slider 10. Further, as the type of planar motor 26, either of a moving-magnet type or a moving-coil type can be employed.

With controller 600, slider 10 can be freely moved in the X-Y two dimensional directions above base BS, by controlling at least one of the magnitude and the direction of the electric current supplied to each coil of the coil unit that configures planar motor 26.

In the present embodiment, the first stage system 200A is equipped with a position measurement system 28 (see FIG. 14) to measure position information of slider 10 in the X-axis direction and the Y-axis direction. As position measurement system 28, a two-dimensional absolute encoder can be employed. Specifically, a two-dimensional scale having a band-shaped absolute code with a predetermined width across the overall length in the X-axis direction is provided at the upper surface of base BS, and correspondingly thereto, a light source such as a light-emitting element, and an X head having a one-dimensional light-receiving element array arrayed in the X-axis direction and a Y head having a one-dimensional light-receiving element array arrayed in the Y-axis direction that each receive reflection light from the two-dimensional scale illuminated by light flux emitted from the light source are provided at the bottom surface of slider 10. Note that the two-dimensional scale may be provided at the bottom surface of slider 10 and the encoder heads may be provided at base BS. As the two-dimensional scale, for example, a two-dimensional scale is employed in which a plurality of square reflection sections (marks) are two-dimensionally arrayed at a constant period along two directions (the X-axis direction and the Y-axis direction) orthogonal to each other on a non-reflective base material (with a reflectance of 0%), and the reflection property (the reflectance) of the reflection sections has gradation that follows a predetermined rule. As the two-dimensional absolute encoder, a configuration that is similar to a two-dimensional absolute encoder disclosed in, for example, U.S. Patent Application Publication No. 2014/0070073 may be employed. With the two-dimensional encoder of absolute type having a configuration similar to that in U.S. Patent Application Publication No. 2014/0070073, measurement of two-dimensional position information with high accuracy that is equivalent to a conventional incremental encoder can be performed. Since the absolute encoder is employed, the origin detection is unnecessary, which is different from the incremental encoder. Measurement information of position measurement system 28 is sent to controller 600.

In the present embodiment, as will be described later, position information within a three-dimensional space (which is shape information in the present embodiment) of at least apart of a target surface (e.g. an upper surface) of workpiece W mounted on table 12 is measured by measurement system 400, and after such measurement, processing with respect to workpiece W is performed. Herein, the target surface means a surface on which a target portion for processing is provided. Consequently, when the shape information of at least a part of the target surface of workpiece W is measured, controller 600 makes the measurement results of the shape information, correspond to the measurement results of linear encoders $24_1$ to $24_6$ provided at rods $14_1$ to $14_6$ and the measurement results of position measurement system 28 at the time of measuring the shape information, thereby allowing the position and the attitude of the target portion provided at the target surface of workpiece W mounted on table 12, to be correlated with a reference coordinate system of processing apparatus 100 (hereinafter, referred to as a table coordinate system). Accordingly, after that, the position control in the directions of six degrees of freedom of the target portion (the target surface) of workpiece W with respect to a target value can be performed by controlling the position of table 12 in the directions of six degrees of freedom on the basis of the measurement results of linear encoders $24_1$ to $24_6$ and position measurement system 28. In the present embodiment, since the encoders of absolute type are employed as linear encoders $24_1$ to $24_6$ and position measurement system 28, the origin detection is not needed, which allows the reset to be performed easily. Note that the foregoing position information within the three-dimensional space to be measured by measurement system 400, which is used to enable the position control in the directions of six degrees of freedom of the target portion of workpiece W with respect to the target value by controlling the position of table 12 in the directions of six degrees of freedom, is not limited to the shape information, but three-dimensional position information in at least three points in accordance with the shape of the target surface suffices.

Note that, in the present embodiment, the case has been described where planar motor 26 is employed as a drive device to move slider 10 within the XY-plane, but a linear motor may be employed instead of planar motor 26. In this case, instead of the foregoing two-dimensional absolute encoder, a linear encoder of absolute type may configure a position measurement system to measure the position information of slider 10. Further, the position measurement system to measure the position information of slider 10 is not limited to the encoder, but may be configured including an interferometer system.

Further, in the present embodiment, the case has been exemplified where a mechanism to move the table is configured including: the planar motor to move the slider within the XY-plane; and the six degrees of freedom parallel link mechanism of Stewart platform type in which the base platform is structured by the slider. However, this is not intended to be limiting, and the mechanism to move the table may be configured including the other type parallel link mechanism or a different mechanism other than the parallel link mechanism. For example, a slider that moves within the XY-plane and a Z-tilt drive mechanism to move table 12 in the Z-axis direction and a tilt direction with respect to the XY-plane on the slider may be employed. Given as an example of the Z-tilt drive mechanism is a mechanism that supports table 12 from below at respective vertices positions of a triangle via universal joints or other joints, and has three actuators (such as voice coil motors) capable of driving the respective support points independently from each other in the Z-axis direction. However, the configuration of a mechanism to move the table in the first stage system 200A is not limited these mechanisms, and is sufficient in a configuration that is capable of moving a table (a movable member) where a workpiece is placed in at least directions of five degrees of freedom which are the directions of three degrees of freedom within the XY-plane, the Z-axis direction and the tilt direction with respect to the XY-plane, and thus a slider that moves within the XY-plane need not be provided. For example, the first stage system may be configured of a table and a robot (e.g. a multijoint robot) to move the table. In any configuration, if a measurement system to measure the position of a table is configured including a combination of absolute-type linear encoders or a combination of such a linear encoder and an absolute-type rotary encoder, the reset can be performed easily.

Besides, instead of the first stage system 200A, a system may be employed that is capable of moving table 12 in at least directions of five degrees of freedom which are the directions of three degrees of freedom within the XY-plane (including the θz direction), the Z-axis direction, and the tilt direction (θx or θy) with respect to the XY-plane. In this case, table 12 itself may be levitated and supported (supported in a noncontact manner) by air-floating or magnetic levitation, via a predetermined clearance (gap or spacing), above the upper surface of a support member such as base BS. If such a configuration is employed, the table is moved in a noncontact manner with respect to a member that supports the table, which is extremely advantageous in the positioning accuracy and greatly contributes to improving processing accuracy.

Measurement system 400 performs measurement of three-dimensional position information of a workpiece for correlating the position and the attitude of the workpiece mounted on table 12 with the table coordinate system, as an example, measurement of the shape of the workpiece. As shown in FIG. 2, measurement system 400 is equipped with a three-dimensional measuring device 401 of laser noncontact method. Three-dimensional measuring device 401 is equipped with: a frame 30 installed on base BS; a head section 32 attached to frame 30; a Z-axis member 34 mounted to head section 32; a rotation mechanism 36 provided at the lower end of Z-axis member 34; and sensor section 38 connected to the lower end of rotation mechanism 36.

Frame 30 is made up of a horizontal member (a first support member) 40 extending in the Y-axis direction, and a pair of column members (second support members) 42 supporting horizontal member 40 from below at both ends in the Y-axis direction.

Head section 32 is attached to horizontal member 40 of frame 30.

Note that a vibration isolation device may be provided between base BS and column members 42. And, a vibration isolation device may be provided between column members 42 and horizontal member 40. Further, a vibration isolation device may be provided between horizontal member 40 and head section 32.

Z-axis member 34 is mounted to head second 32 to be movable in the Z-axis direction, and is moved by a Z drive mechanism 44 (not illustrated in FIG. 2, see FIG. 14) in the Z-axis direction. The position (or the displacement from a reference position) of Z-axis member 34 in the Z-axis direction is measured by a Z encoder 46 (not illustrated in FIG. 2, see FIG. 14).

Rotation mechanism 36 is capable of rotating continuously (or at a predetermined angle step) sensor section 38 with respect to head section 32 (Z-axis member 34) in a predetermined angle range (e.g., in a range of 90 degrees ($\pi/2$) or 180 degrees ($\pi$)) around a rotation center axis parallel to the Z-axis. In the present embodiment, the rotation center axis of sensor section 38 by rotation mechanism 36 is coincident with the center axis of a line beam irradiated from an irradiation section to be described later that configures sensor section 38, but the rotation center axis needs not be coincident therewith. The rotation angle of sensor section 38 by rotation mechanism 36 from a reference position (or the position of sensor section 38 in the $\theta z$ direction) is measured by a rotation angle sensor 48 (not illustrated in FIG. 2, see FIG. 14) such as, for example, a rotary encoder.

Sensor section 38 has: an irradiation section 50 to irradiate an object to be detected (workpiece W in FIG. 2) placed on table 12 with a line beam for performing light-section; and a detection section 52 to detect the surface of the object with the light-section plane (line) that appears due to being irradiated with the line beam. Further, an arithmetic processing section 610 to obtain the shape of the object on the basis of image data detected by detection section 52 is connected to sensor section 38. Arithmetic processing section 610 is included in controller 600 for totally controlling the respective constituents of processing apparatus 100 in the present embodiment (see FIGS. 1 and 14).

Irradiation section 50 is configured of a cylindrical lens, a slit plate with an elongate band-shaped cutout, and the like (none of which is illustrated), and is configured to receive the illumination light from a light source and generate a line beam 50a. As the light source, an LED, a Laser beam source, an SLD (Super Luminescent Diode) or the like can be employed. In the case of employing the LED, the light source can be formed with low cost. In the case of employing the laser beam source, the line beam having few aberration can be made because it is the spot light source, and the laser beam source is excellent in wavelength stability and has a small half bandwidth and a filter with a small half bandwidth can be used for stray light cutting, and therefore the influence by disturbance can be reduced. Further, in the case of employing the SLD, in addition to the properties of the laser beam source, the coherence is lower than that of the laser beam, and therefore, speckles on the surface of the object can be suppressed from being generated. Detection section 52 is configured to image line beam 50a projected on the surface of the object (workpiece W) from a direction different from the light-irradiation direction of irradiation section 50. Further, detection section 52 is configured of an image-forming lens, a CCD and the like (none of which is illustrated), and is configured to image the object (workpiece W) by moving table 12 and scanning the object (workpiece W) with line beam 50a, as will be described later. Note that the positions of irradiation section 50 and detection section 52 are determined so that the incidence direction of line beam 50a on the surface of the object (workpiece W) with respect to detection section 52 and the light-irradiation direction of irradiation section 50 forms a predetermined angle $\theta$. Although the predetermined angle $\theta$ is set at, for example, an angle of 45 degrees in the present embodiment, the predetermined angle $\theta$ needs not be the angle of 45 degrees.

The image data of the object (workpiece W) captured by detection section 52 is sent to arithmetic processing section 610, in which predetermined image arithmetic processing is performed, and the height of the surface of the object (workpiece W) (e.g., the position in the Z-axis direction at a plurality of positions on the surface of the object (workpiece W)) is calculated, and the three-dimensional shape (the surface shape) of the object (workpiece W) is obtained. On the basis of position information of the light-section plane (line) by line beam 50a that is deformed in accordance with the unevenness of the object (workpiece W) in the image of the object (workpiece W), arithmetic processing section 610 calculates the height of the surface of the object (workpiece W) from a reference plane, by the principle of triangulation for each pixel in a longitudinal direction in which the light-section plane (line) (line beam 50a) extends, and performs the arithmetic processing to obtain the three-dimensional shape of the object (workpiece W).

In the present embodiment, controller 600 moves table 12 in a direction intersecting the longitudinal direction of line beam 50a projected on the object (workpiece W), for example, in the Y-axis direction that is roughly right-angled with respect to the longitudinal direction of line beam 50a, thereby causing line beam 50a to scan the surface of the object (workpiece W). Controller 600 detects the rotation angle of sensor section 38 with rotation angle sensor 48, and on the basis of the detection result, moves table 12 in the Y-axis direction that is roughly right-angled with respect to the longitudinal direction of line beam 50a. In this manner, in the present embodiment, table 12 is moved when measurement of the shape and the like of the object (workpiece W) is performed, and therefore, as the premise thereof, the position and the attitude (the position in the directions of six degrees of freedom) of table 12 are constantly set in a predetermined reference state at the point in time when table 12 holding workpiece W is moved to below sensor section 38 of measurement system 400. The reference state is, for example, a state where each of rods $14_1$ to $14_6$ has a length corresponding to the neutral point (or the minimum length) of the extendable/contractible stroke range, and at this time, the position of table 12 in respective directions of the Z-axis, the θx, the θy and the θz (Z, θx, θy, θz) is at ($Z_0$, 0, 0, 0). Further, in this reference state, the position within the XY-plane (X, Y) of table 12 coincides with the X-position and the Y-position of slider 10 measured by position measurement system 28.

After that, the foregoing measurement with respect to the object (workpiece W) is started, and the position of table 12 in the directions of six degrees of freedom is managed on the table coordinate system by controller 600, also during this measurement. That is, controller 600 controls planar motor 26 on the basis of the measurement information of position measurement system 28 and also controls telescopic mechanisms $16_1$ to $16_6$ on the basis of measurement values of linear encoders $24_1$ to $24_6$, thereby controlling the position of table 12 in the directions of six degrees of freedom.

Incidentally, in the case of employing the light-section method as in three-dimensional measuring device 401 related to the present embodiment, line beam 50*a* irradiated from irradiation section 50 of sensor section 38 to the object (workpiece W) is preferably disposed in a direction orthogonal to a relative movement direction of sensor section 38 and table 12 (the object (workpiece W)). For example, in FIG. 2, in the case where the relative movement direction of sensor section 38 and the object (workpiece W) is set in the Y-axis direction, it is preferable to dispose line beam 50*a* along the X-axis direction. This is because, by doing so, relative movement with respect to the object (workpiece W) effectively utilizing the entire area of line beam 50*a* can be performed at the time of measurement, and the shape of the object (workpiece W) can be optimally measured. Rotation mechanism 36 is provided so that the orientation of line beam 50*a* and the relative movement direction described above can be made constantly orthogonal to each other.

Three-dimensional measuring device 401 described above is configured similar to a profile measuring apparatus disclosed in, for example, U.S. Patent Application Publication No. 2012/0105867. However, the scanning of a line beam with respect to an object to be detected in a direction parallel to the XY-plane is performed by movement of a sensor section in the apparatus described in U.S. Patent Application Publication No. 2012/0105867, whereas such the scanning is performed by movement of table 12 in the present embodiment, which is the difference therebetween. Note that, in the present embodiment, on scanning of a line beam with respect to the object in a direction parallel to the Z-axis, either of Z-axis member 34 or table 12 may be moved.

In the measurement method with three-dimensional measuring device 401 related to the present embodiment, by employing the light-section method, each time when projecting a line-shaped projection pattern composed of one line beam on the surface of the object and causing the line-shaped projection pattern to scan an entire area of the surface of the object, the image of the line-shaped projection pattern projected on the object is captured at an angle different from the projection direction. Then, from the captured image of the surface of the object, the height of the surface of the object from the reference plane is calculated by the principle of triangulation or the like, for each pixel in a longitudinal direction of the line-shaped projection pattern, and the three-dimensional shape of the surface of the object is obtained.

Besides, as the three-dimensional measuring device configuring measurement system 400, a device having a configuration similar to that of an optical probe disclosed in, for example, U.S. Pat. No. 7,009,717 can also be employed. This optical probe is configured of two or more optical groups, and includes two or more visual field directions and two or more projection directions. One optical group includes one or more visual field direction (s) and one or more projection direction (s), and at least one visual field direction and at least one projection direction are different between the optical groups, and data obtained in the visual field direction is generated only by a pattern projected from the projection direction of the same optical group.

Measurement system 400 may be equipped with a mark detection system 56 (see FIG. 14) to optically detect alignment marks, instead of or in addition to the forgoing three-dimensional measuring device 401. Mark detection system 56 is capable of detecting alignment marks formed, for example, at the workpiece. Controller 600 accurately detects each of the center positions of at least three alignment marks (the three-dimensional coordinates) with mark detection system 56, thereby calculating the position and the attitude of the workpiece (or table 12). Such mark detection system 56 can be configured including, for example, a stereo camera. Note that in addition to or in replacement of the alignment marks of the workpiece, alignment marks provided at table 12 holding the workpiece may be detected with mark detection system 56.

In the present embodiment, controller 600 scans the surface (a target surface) of workpiece W and acquires surface shape data thereof, with three-dimensional measuring device 401 in the manner as described above. Then, controller 600 performs the least square processing using the surface shape data, and correlates the three-dimensional position and attitude of the target surface of the workpiece with the table coordinate system. In this case, the position of table 12 in the directions of six degrees of freedom is managed on the table coordinate system by controller 600, also during the foregoing measurement with respect to the object (workpiece W). Therefore, after the three-dimensional position and attitude of the workpiece has been correlated with the table coordinate system, also at the time of processing, all the control of the position of workpiece W in the directions of six degrees of freedom (i.e., the position and the attitude) can be performed by the control of table 12 in accordance with the table coordinate system.

Figure 4:
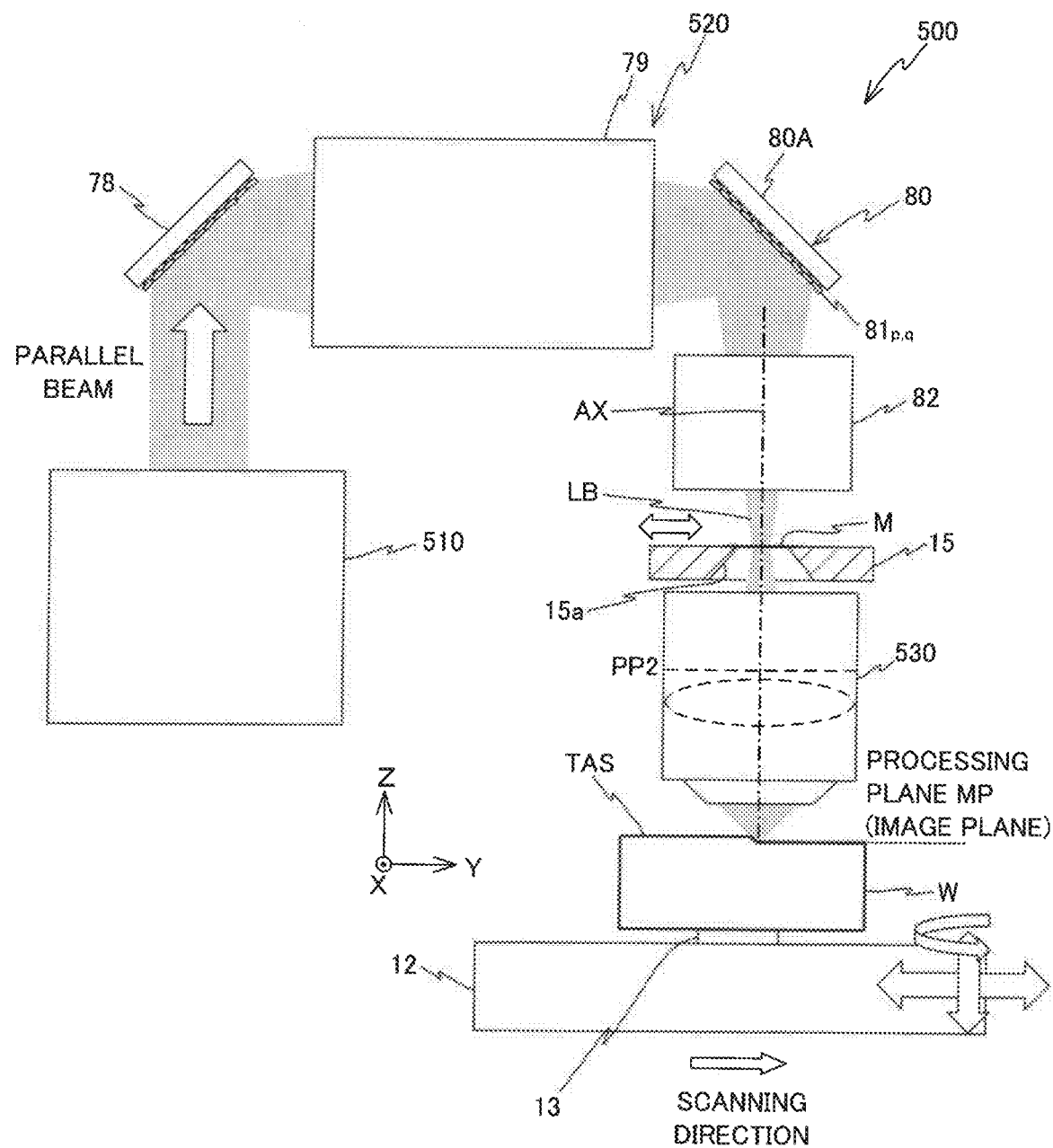
FIG. 4 is a view showing a beam irradiation system, together with a mask stage on which a mask is provided and a table on which a workpiece is mounted.

FIG. 4 shows beam irradiation system 500, together with a mask stage 15 serving as a holding member to hold mask M, and table 12 on which workpiece W is mounted.

Mask M serving as an opening member having a plurality of openings (opening patterns) is held by mask stage 15 configuring apart of the second stage system 200B. Note that a mask provided with through holes as openings may be employed or a mask may be formed by vapor-depositing a light-shielding member such as chromium so that openings are formed in the upper surface or the lower surface of a base material (such as synthetic quartz) capable of transmitting beams. In the present embodiment, mask M is normally provided at mask stage 15, but a configuration in which a mask on mask stage 15 can be exchanged may be employed. The second stage system 200B is capable of changing the position of mask M with respect to condensing optical system 530 by movement of mask stage 15, as will be described later. Specifically, mask stage 15 on which mask M is normally provided is moved in directions of four degrees of freedom (respective directions of the X-axis, the Y-axis, the Z-axis and the θz) by a mask stage drive system 17 (not illustrated in FIG. 4, see FIG. 14), and thereby the position of mask M in the directions of four degrees of freedom is changed. Position information of mask stage 15 in the X-axis direction, the Y-axis direction, the θz direction and the Z-axis direction is measured at, for example, a resolution around 0.25 nm to 1 nm, by a mask stage position measurement system 19 (not illustrated in FIG. 4, see FIG. 14) made up of, for example, an interferometer system. Mask stage position measurement system 19 may be configured of an encoder system or other sensors.

Mask stage drive system 17 is configured of, for example, a planar motor of magnetic levitation type. The mask stage drive system is not limited to being configured of the planar motor, but may be configured of, for example, a linear motor system having a configuration capable of moving mask stage 15 also in the Z-axis direction, in addition to the X-axis direction and the Y-axis direction. Note that mask stage drive system 17 is capable of moving mask stage 15 in the directions of four degrees of freedom, but may be capable of moving mask stage 15 in the directions of six degrees of freedom, or mask stage 15 may be configured movable only in the X-axis direction or the Y-axis direction as far as the change of the openings can be performed.

In the present embodiment, a film-shaped or plate-shaped mask is employed as mask M. A stencil mask may also be employed as mask M. Mask M may be formed of a material with low thermal expansion. At mask stage 15, a through hole 15a in a vertical direction (the Z-axis direction) serving as a path of beams is formed, as shown in a cross-sectional view in FIG. 4, and mask M is disposed in the upper section of through hole 15a. FIG. 5 shows the plan view of mask M. As shown in FIG. 5, formed at mask M are: plural types (four types as an example) of slit-shaped openings each extending in the X-axis direction, having the same linewidth (e.g. 10 μm) and having different lengths in the X-axis direction; plural types (four types as an example) of slit-shaped openings each extending in the Y-axis direction, having the same linewidth (e.g. 10 μm) and having different lengths in the Y-axis direction; plural types (four types as an example) of circular openings (pinhole-shaped openings) having different diameters; and plural types (four types as an example) of square openings having sides of different lengths. Each of an opening PAa and an opening Pab shown in FIG. 5 is a slit-shaped opening with a linewidth of 10 μm and a length of 10 mm, as an example. And, an opening PAc is a pinhole-shaped opening with a diameter of 10 μm, as an example. Note that the shapes of the openings are not limited to the slit, circular and square shapes, and it is needless to say that other shapes such as rectangular and polygonal shapes may be employed, and at least one of the slit-shaped openings, the circular openings and the square openings need not be provided. Further, the number (the types) of the openings with each shape is not limited to four, and for example, one circular opening and three square openings may be provided.

As shown in FIG. 4, beam irradiation system 500 is equipped with a light source system 510, an illumination optical system 520 to irradiate mask M with beams emitted from the light source system, and condensing optical system 530 to condense the beams having passed through mask M onto the target surface of workpiece W.

Figure 6:
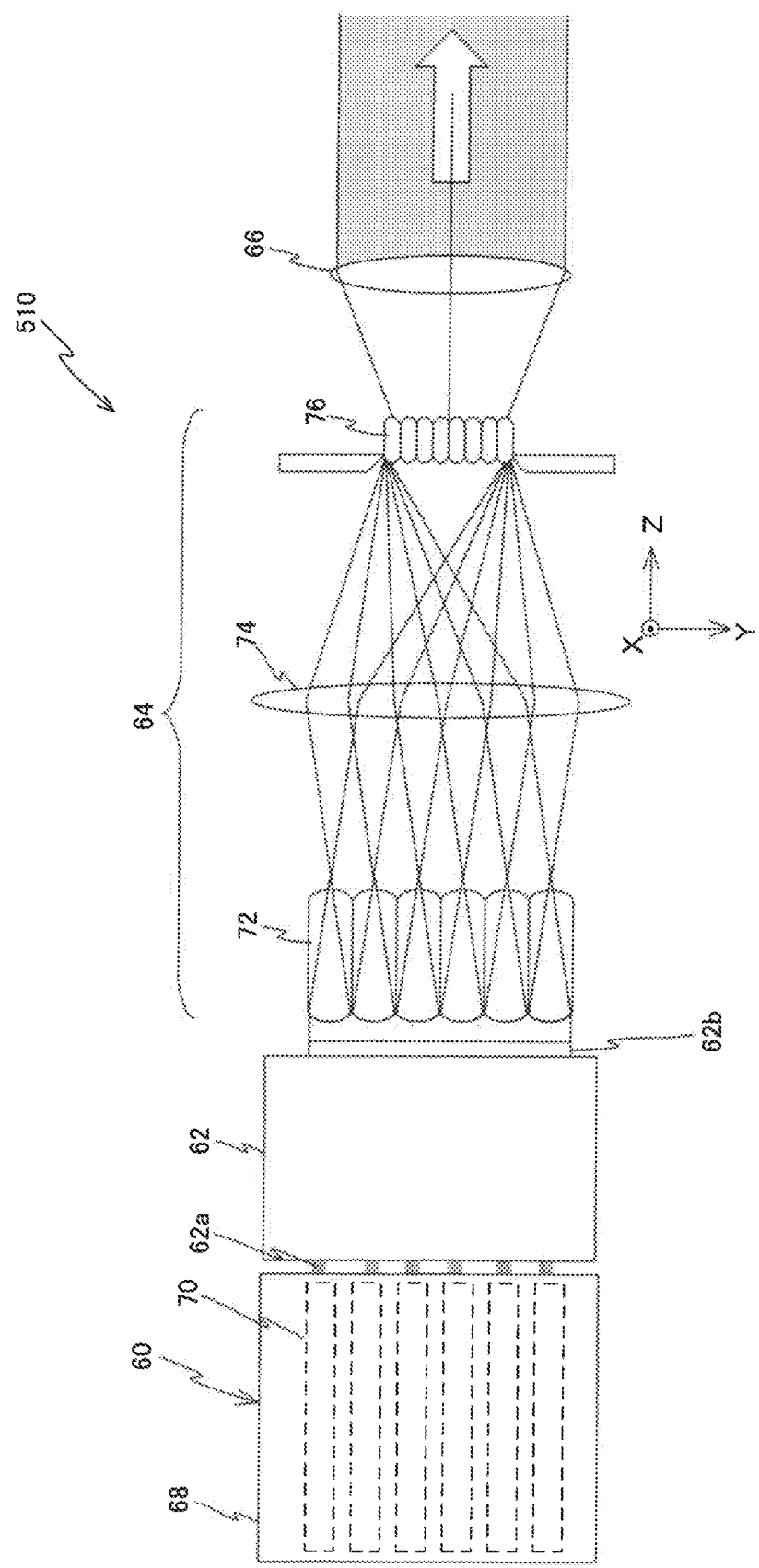
FIG. 6 is a view showing an example of the configuration of a light source system equipped in the beam irradiation system.

As shown in FIG. 6, light source system 510 is equipped with a light source unit 60, a light guide fiber 62 connected to light source unit 60, a double fly-eye optical system 64 disposed on an exit side of light guide fiber 62, and a condenser lens system 66.

Light source unit 60 is equipped with a housing 68, and a plurality of laser units 70 housed inside housing 68 and arranged in a matrix shape parallel to each other. As laser unit 70, a unit of light sources of various types of lasers to perform pulse oscillation or continuous wave oscillation operations such as, for example, carbon dioxide gas laser, Nd: YAG laser, fiber laser or GaN system semiconductor laser can be employed. Further, the laser employed as laser unit 70 may be nanosecond laser or picosecond laser or femtosecond laser.

Light guide fiber 62 is a fiber bundle composed of multiple optical fiber element wires randomly bundled, and has a plurality of incidence ports 62a individually connected to the emitting ends of the plurality of laser units 70, and an emitting section 62b having emitting ports that are larger in number than incidence ports 62a. Light guide fiber 62 receives a plurality of laser beams (hereinafter, shortly referred to as □beams□ where necessary) respectively emitted from the plurality of laser units 70 via the respective incidence ports 62a and allots them to multiple emitting ports, and then causes at least part of each laser beam to be emitted from the common emitting port. In this manner, light guide fiber 62 mixes the beams emitted respectively from the plurality of laser units 70 and emits them. Accordingly, compared to the case of employing a single laser unit, the total output can be increased in accordance with the number of laser units 70. However, in the case where the sufficient output can be obtained with a single laser unit, a plurality of laser units need not be employed.

Herein, emitting section 62b has a cross-sectional shape that is homothetic to the entire shape of the incidence end of a first fly-eye lens system configuring the incidence end of double fly-eye optical system 64, which will be described next, and emitting ports are substantially uniformly arranged in the cross section. Therefore, light guide fiber 62 also serves as a shaping optical system that shapes the beams mixed as described above to be homothetic to the entire shape of the incidence end of the first fly-eye lens system. Note that emitting section 62b may be disposed apart from the incidence surface of a first fly-eye lens system 72 in an optical axis direction of illumination optical system 520. In this case, a light intensity distribution formed on the incidence surface of the first fly-eye lens system 72 becomes less steep, and therefore, the uniformity of the illuminance distribution on mask M can be improved. In this case, if emitting section 62b is exceedingly remote from the incidence surface of the first fly-eye lens system 72 in the optical axis direction of illumination optical system 520, light quantity loss could be caused thereby. Therefore, a spacing between emitting section 62b and the incidence surface of the first fly-eye lens system 72 in the optical axis direction may be determined in view of the balance between the illuminance uniformity and the light quantity loss.

Double fly-eye optical system 64 is configured to uniformize the cross-sectional intensity distributions of the beams (illumination light), and is equipped with the first fly-eye lens system 72, a lens system 74 and a second fly-eye lens system 76 that are sequentially disposed in the beam paths (optical paths) of the laser beams at the rear of light guide fiber 62. Note that a diaphragm is provided around the second fly-eye lens system 76.

In this case, the incidence surface of the first fly-eye lens system 72 and the incidence surface of the second fly-eye lens system 76 are set optically conjugate with each other.

Further, an exit side focal plane (on which a surface light source to be described later is formed) of the first fly-eye lens system 72, the exit side focal plane (on which a surface light source to be described later is formed) of the second fly-eye lens system 76 and a pupil plane (an entrance pupil) PP2 of condensing optical system 530 are set optically conjugate with each other.

The beams mixed by light guide fiber 62 are incident on the first fly-eye lens system 72 of double fly-eye optical system 64. Thus, the surface light source, i.e., a secondary light source made up of, many light source images (point light sources) is formed on the exit side focal plane of the first fly-eye lens system 72. The laser beam from each of the many point light sources is incident on the second fly-eye lens system 76 via lens system 74. Accordingly, the surface light source (a tertiary light source), in which many fine light source images are uniformly distributed in an area having a predetermined shape, is formed on the exit side focal plane of the second fly-eye lens system 76. Note that the exit side focal plane of the first fly-eye lens system 72 may be a plane spaced apart from the exit surface of the first fly-eye lens system 72 toward the beam exit side in order to decrease the possibility of the beams damaging the first fly-eye lens system 72. At this time, the secondary light source by the first fly-eye lens system 72 is formed at a position deviated from the exit surface of the first fly-eye lens system 72. Similarly, the exit side focal plane of the second fly-eye lens system 76 may be a plane spaced apart from the exit surface of the second fly-eye lens system 76 toward the beam exit side. At this time, the tertiary light source by the second fly-eye lens system 76 is formed at a position deviated from the exit surface of the second fly-eye lens system 76.

Condenser lens system 66 has a front side focal point located at the exit surface of the second fly-eye lens system 76 or near the exit surface, and emits the laser beams that have been emitted from the tertiary light source described above, as beams with uniform illuminance distribution.

Note that the beams emitted from condenser lens system 66 can be regarded as the parallel beams by optimizing the square measure of the incidence end of the second fly-eye lens system 76, the focal distance of condenser lens system 66, and the like.

Light source system 510 of the present embodiment is equipped with an illuminance uniformizing optical system comprising light guide fiber 62, double fly-eye optical system 64 and condenser lens system 66, and by this illuminance uniformizing optical system, mixes the beams emitted respectively from the plurality of laser units 70 and generates the parallel beams with uniformized cross-sectional illuminance distribution. Note that uniformizing the cross-sectional illuminance distribution may include causing the illuminance distribution in the beam cross-section of the beams emitted from the illuminance uniformizing optical system to be in a state closer to uniformity than the illuminance distribution in the beam cross-sections of the beams incident on the illuminance uniformizing optical system.

Note that the configuration of the illuminance uniformizing optical system is not limited to the foregoing one. The illuminance uniformizing optical system may be configured including a rod integrator, a collimator lens system and the like.

Light source unit 60 of light source system 510 is connected to controller 600 (see FIG. 14), and ON and OFF of the plurality of laser units 70 configuring light source unit 60 are individually controlled by controller 600. By this control, light quantity (laser output) of the laser beams irradiated from condensing optical system 530 to (the target surface of) workpiece W via illumination optical system 520 (and mask M) is adjusted. Note that, as the adjustment of light quantity (energy) of the laser beams irradiated on (the target surface of) workpiece W, the laser output of each of the plurality of laser units 70 may be adjusted, or a variable attenuator may be disposed in the optical paths between the plurality of laser units 70 and mask M and the light quantity (energy) of the laser beams passing through the attenuators may be changed.

As shown in FIG. 4, illumination optical system 520 has an optical device 78, a first section illumination optical system 79, a mirror array 80 and a second section illumination optical system 82 that are sequentially disposed in the optical path of the parallel beam from light source system 510 (condenser lens system 66).

Optical device 78 is capable of changing the intensity distribution in the cross section of the parallel beam from light source system 510 (condenser lens system 66). In the present embodiment, optical device 78 is configured of a mirror array that is a type of spatial light modulator (SLM). Herein, the spatial light modulator is a general term for a device to spatially modulate the amplitude (the intensity), the phase or the polarization state of light traveling in a predetermined direction. Hereinafter, optical device 78 is also referred to as a second mirror array 78. The second mirror array 78 is capable of changing the cross-sectional intensity distribution (and the illumination shape) of the parallel beam from light source system 510 at a pupil plane PP1 of illumination optical system 520. Note that mirror array 80 mentioned above is hereinafter referred to as a first mirror array 80 (which can also be referred to as an optical device 80), for identification from the second mirror array 78.

Figure 7:
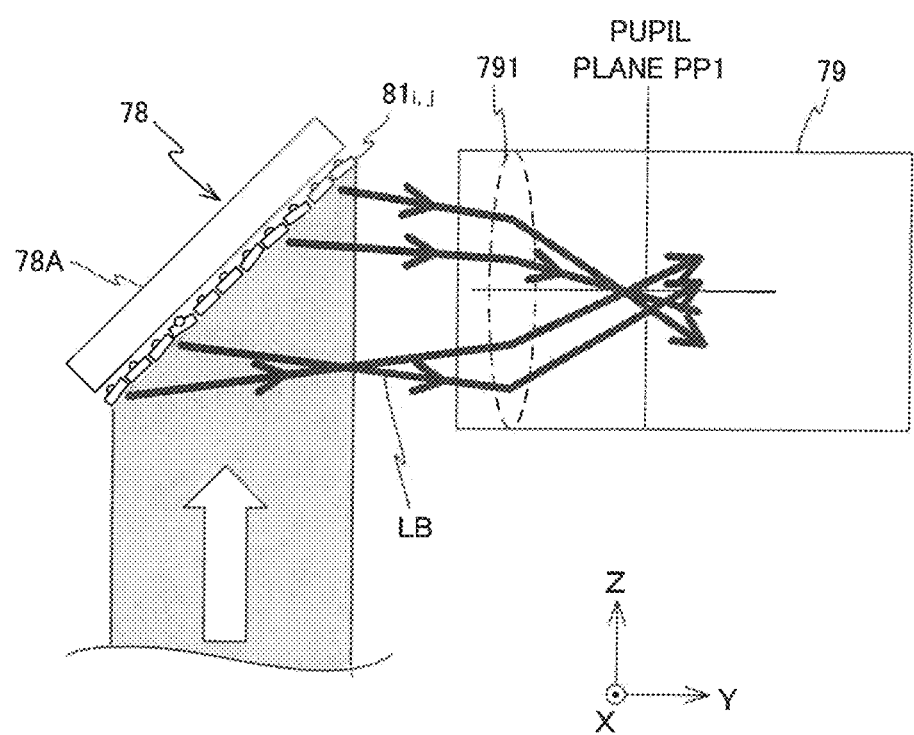
FIG. 7 is a view showing a state where a parallel beam from the light source system is irradiated on a second mirror array and a reflected beam from each of a plurality of mirror elements enters a first section illumination optical system.

As shown in FIG. 7, the second mirror array 78 has: a base member 78A having a surface (hereinafter, referred to as a reference surface for the sake of convenience) angled by 45 degrees ($\pi/4$) with respect to the XY-plane and the XZ-plane; for example, K ($=I\times J$) numbers of mirror elements $81_{i,j}$ (i=1 to I, j=1 to J) disposed in a matrix shape with I rows and J columns on the reference surface of base member 78A; and a drive section 78B (not illustrated in FIG. 7, see FIG. 14) including the K numbers of actuators (not illustrated) to individually drive the respective mirror elements $81_{i,j}$. Each mirror element $81_{i,j}$ of the second mirror array 78 is configured rotatable around a rotation axis, and the inclined angle of the reflection surface of each mirror element $81_{i,j}$ with respect to the reference surface can be set at an arbitrary angle within a predetermined angle range. The angle of the reflection surface of each mirror element is measured by a sensor to detect the rotation angle of the rotation axis, for example, a rotary encoder $83_{i,j}$ (not illustrated n FIG. 7, see FIG. 14). Note that a sensor may be provided that irradiates at least one of mirror elements $81_{i,j}$ with a measurement beam and receives the reflected beam, thereby optically detecting the rotation angle of the at least one mirror element irradiated with the measurement beam.

Drive section 78B includes, for example, an electromagnet or a voice coil motor, as the actuator, and each mirror element $81_{i,j}$ is moved by the actuator and operates at an extremely high response.

The plurality of mirror elements $81_{i,j}$ configuring the second mirror array 78 are each illuminated with the parallel beam from light source system 510, emit a plurality of reflected beams (parallel beams) LB in directions that are in accordance with the inclined angles of the respective reflection surfaces, and cause the reflected beams (the parallel beams) to enter the first section illumination optical system 79 (see FIG. 7). The first section illumination optical system 79 includes a plurality of lenses including relay lenses, and the like, and has pupil plane PP1 of illumination optical system 520 inside thereof. The first section illumination optical system 79 has a sectional optical system 791 between the second mirror array 78 and pupil plane PP1. Sectional optical system 791 is disposed so that its front side focal position is located at a surface where the second mirror array 78 is disposed or near the surface and its rear side focal position is located at pupil plane PP1 or near pupil plane PP1, and sectional optical system 791 distributes the plurality of reflected beams LB on pupil plane PP1 in accordance with traveling directions of the plurality of reflected beams LB from the second mirror array 78. That is, the second mirror array 78 is capable of setting or changing the cross-sectional intensity distribution of beams at pupil plane PP1 by adjusting the inclined angle of the reflection surface of each of the plurality of mirror elements $81_{i,j}$. Consequently, the second mirror array 78 is capable of setting or changing the cross-sectional shape (which can also be referred to as an illumination shape) of beams at pupil plane PP1 by adjusting the inclined angle of the reflection surface of each of the plurality of mirror elements $81_{i,j}$. Herein, pupil plane PP1 is a conjugate plane with pupil plane (an entrance pupil plane) PP2 of condensing optical system 530. Note that the front side focal position of sectional optical system 791 needs not be located at the surface where the second mirror array 78 is disposed or near the surface. Further, the rear side focal position of sectional optical system 791 needs not be located at pupil plane PP1 or near pupil plane PP1.

Note that sectional optical system 791 can be regarded as an optical system to convert the angle of the incident beam into a position on an exit side. Further, optical device 78 is not limited to being configured of the spatial light modulator such as the mirror array, but can also be configured of, for example, an illumination system aperture stop plate, in which plural types of aperture stops are formed on a rotatable discoidal member and such plural types of aperture stops can be exchanged to be placed in the optical path of beams, or the like. This illumination system aperture stop plate may be disposed at pupil plane PP1 in the first section illumination optical system 79 or near pupil plane PP1, or may be disposed at pupil plane PP2 of condensing optical system 530 or near pupil plane PP2. In this case, optical device 78 needs not be provided. Note that the second mirror array 78 is located at a plane conjugate with the image plane (a processing plane MP) (see FIGS. 4 and 9A) of condensing optical system 530 or near the plane, also may prevent a part of the parallel beam from light source system 510 (e.g., the parallel beam from a part of the mirror elements (also referred to as mirrors where necessary)) from entering illumination optical system 520, and is therefore capable of adjusting the intensity or the intensity distribution of processing beams at the image plane (processing plane MP) of condensing optical system 530. For example, at the image plane (processing plane MP) of condensing optical system 530, the intensity distribution within an irradiation area of the processing beams from condensing optical system 530 can be adjusted.

In the present embodiment, the parallel beams via optical device (the second mirror array, as an example) 78 are irradiated on mask M via the first section illumination optical system 79, the first mirror array 80 and the second section illumination optical system 82, and are incident on condensing optical system 530 via the opening of mask M, as will be described later. By changing the cross-sectional intensity distribution of the parallel beam from light source system 510 with optical device (the second mirror array, as an example) 78, the intensity distribution of the beams at pupil plane PP1 of illumination optical system 520 and at pupil plane (entrance pupil) PP2 of condensing optical system 530, i.e., the cross-sectional shape of the beams can be changed.

Further, optical device 78 is disposed at a position conjugate with the image plane (processing plane MP) of condensing optical system 530 or near the position, and therefore, by converting the cross-sectional intensity distribution of the parallel beam from light source system 510 with optical device 78, the intensity distribution at the image plane of condensing optical system 530 of the beams emitted from condensing optical system 530 can also be substantially changed. For example, the inclined angles of some mirrors of the second mirror array 78 are set to prevent the beams reflected off such mirrors from entering illumination optical system 520, and thereby the intensity distribution within the irradiation area of the beams at the image plane (processing plane MP) can be changed. Further, since optical device 78 is disposed at a position conjugate with a surface where the openings of mask M are disposed or near the position, the intensity distribution of the beams on mask M can be substantially changed or adjusted by converting the cross-sectional intensity distribution of the parallel beam from light source system 510 with optical device 78. For example, it is also possible to impart the non-uniform intensity distribution to the beams that enter the openings of mask M.

The plurality of reflected beams (parallel beams) LB respectively, emitted from mirror elements $81_{i,j}$ of the second mirror array 78 toward directions in accordance with the inclined angles of the respective reflection surfaces, are incident on pupil plane PP1 of illumination optical system 520, and the cross-sectional intensity distribution (i.e., the cross-sectional shape, the illumination shape) at pupil plane PP1 is set in accordance with the inclined angles of the respective reflection surfaces of mirror elements $81_{i,j}$ of the second mirror array 78. The beams having the cross-sectional intensity distribution that has been set are irradiated, by the first section illumination optical system 79, on the first mirror array 80 disposed at a position conjugate with pupil plane PP1 of illumination optical system 520 or near the position.

Figure 8:
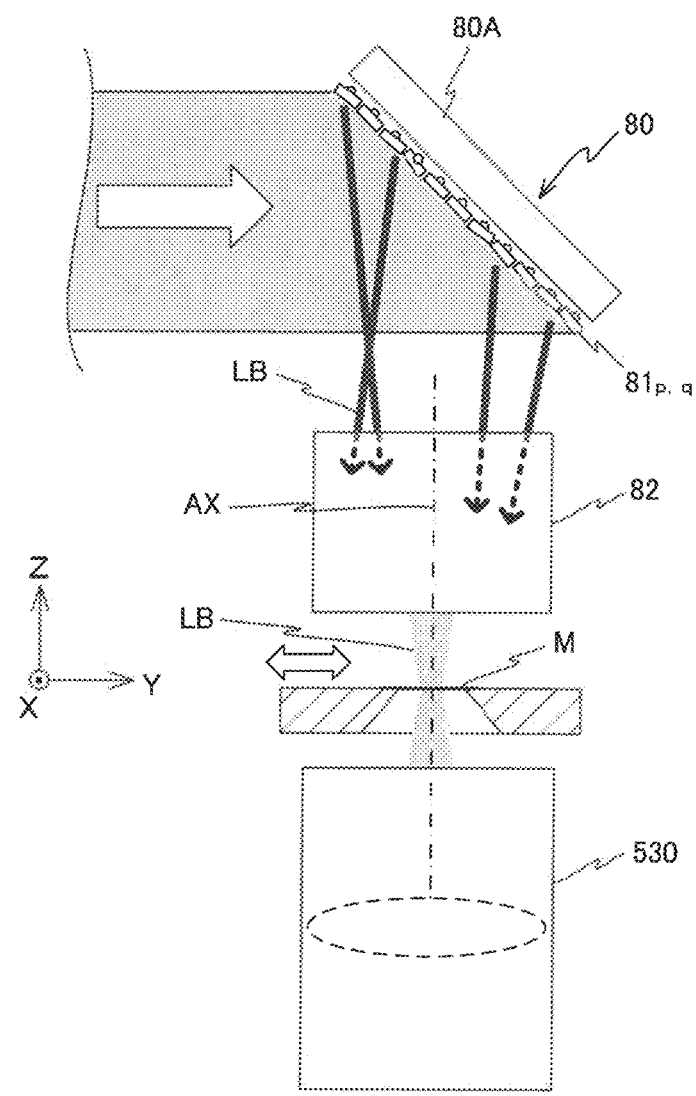
FIG. 8 is a view showing a state where parallel beams from the first section illumination optical system are irradiated on a first mirror array and a reflected beam from each of a plurality of mirror elements is incident on a condensing optical system.
Figure 9A:
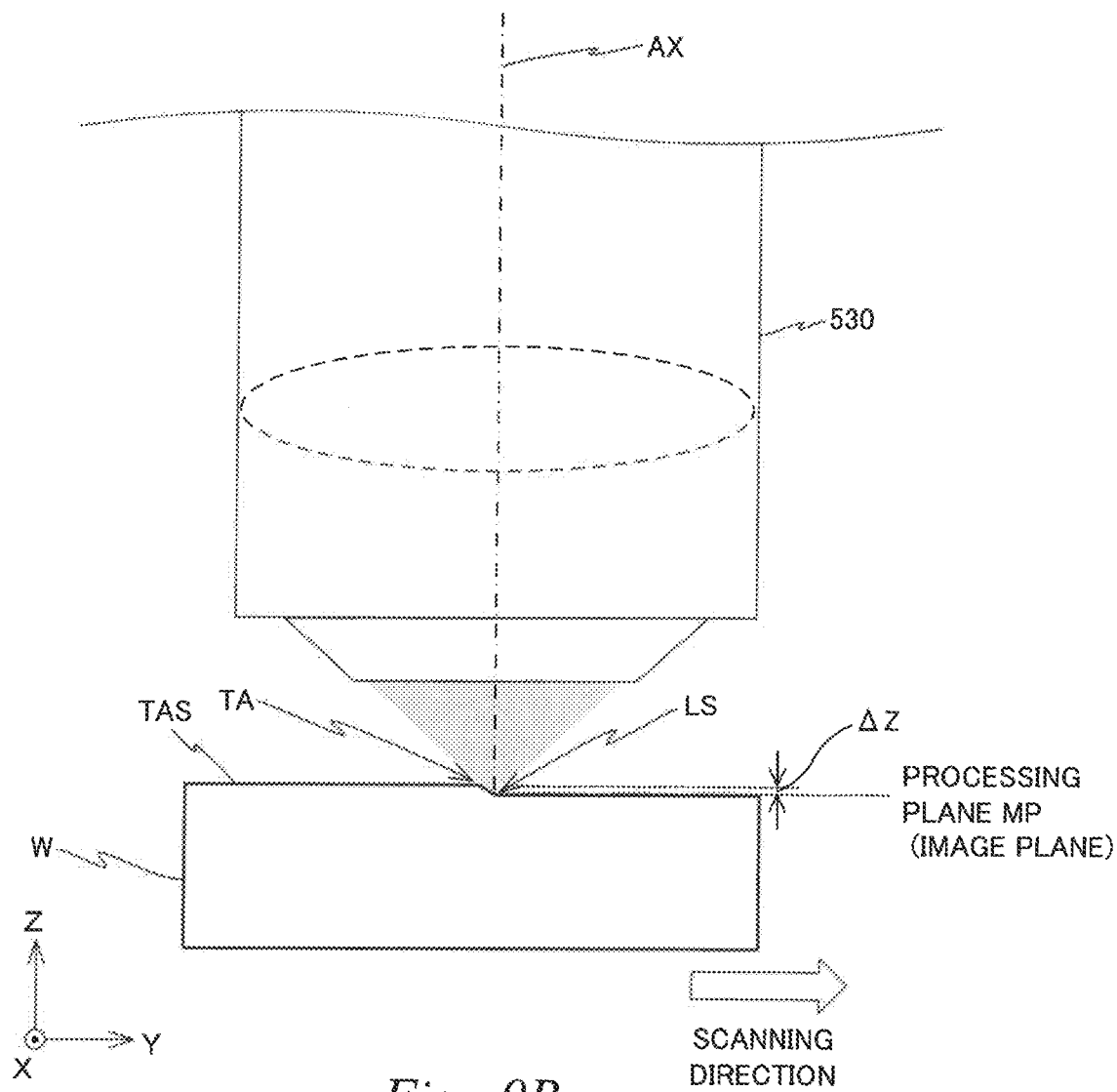
FIG. 9A is a view enlargedly showing the vicinity of a target surface of a workpiece when beams are irradiated from the condensing optical system to a target portion of the workpiece and a slit-shaped irradiation area is formed.
Figure 9B:
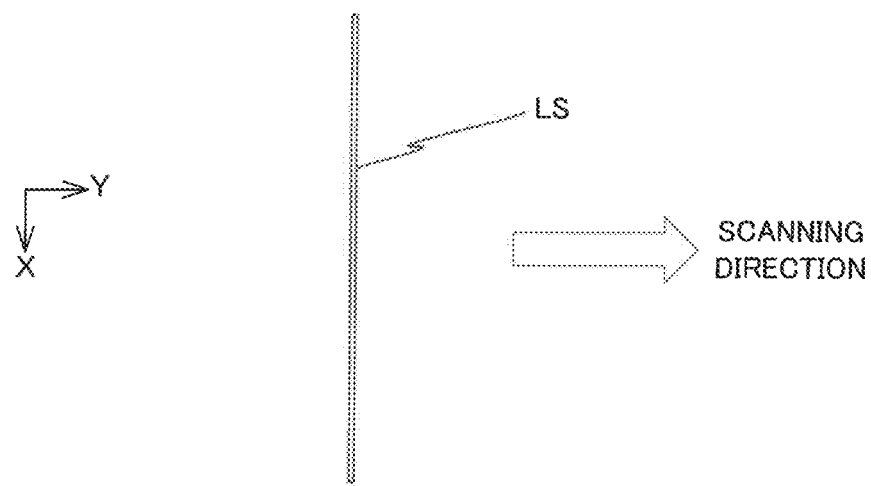
FIG. 9B is a view showing a relationship between the slit-shaped irradiation area and a scanning direction shown in FIG. 9A.

As shown in FIG. 8, the first mirror array 80 has: a base member 80A having a surface (hereinafter, referred to as a reference surface for the sake of convenience) angled by 45 degrees ($\pi/4$) with respect to the XY-plane and the XZ-plane; for example, M (=P×Q) numbers of mirror elements $81_{p,q}$ (p=1 to P, q=1 to Q) disposed in, for example, a matrix shape with P rows and Q columns on the reference surface of base member 80A; and a drive section 80B (not illustrated in FIG. 4, see FIG. 14) including the M numbers of actuators (not illustrated) to individually drive the respective mirror elements $81_{p,q}$, and the first mirror array 80 is configured similar to the second mirror array 78 though the first mirror array 80 is arranged with the left side and right side reversed with respect to the second mirror array 78.

Of the plurality of mirror elements configuring the first mirror array 80, mirror elements $81_{p,q}$ illuminated with the parallel beams from the first section illumination optical system 79 are capable of emitting a plurality of reflected beams (parallel beams) LB, respectively, in directions in accordance with the inclined angles of the respective reflection surfaces, and causing reflected beams LB to enter the second section illumination optical system 82, and condensing the beams emitted from the second section illumination optical system 82 on mask M, with an arbitrary size and an arbitrary shape (such as, for example, a spot shape or a slit shape). This second section illumination optical system 82 has a front side focal position located at a position of the first mirror array 80 or near the position, and a rear side focal position located at a position of mask M or near the position (e.g. a surface where the openings of mask M are disposed). Consequently, in the present embodiment, the beams can be irradiated only on a partial area including one arbitrary opening on mask M, by adjusting the position of mask M within the XY-plane. Accordingly, in the present embodiment, the beams from illumination optical system 520 can be made to efficiently enter condensing optical system 530 via mask M. Note that if the beams are irradiated on the openings of mask M, the first mirror array 80 needs not be provided. Note that the front side focal position of the second section illumination optical system 82 needs not be located at a position of the first mirror array 80 or near the position. And, the rear side focal position of the second section illumination optical system 82 needs not be located at a position of mask M or near the position.

In the present embodiment, condensing optical system 530 is an optical system with low aberration that has a numerical aperture N.A., for example, not less than 0.5, preferably a high N.A. not less than 0.6. In the present embodiment, as condensing optical system 530, a reduction projection lens with a N.A. of 0.75, a projection magnification of 1/10 and the maximum field of 1 mm square is employed.

In the present embodiment, since condensing optical system 530 has a large diameter, low aberration and high N.A., a plurality of beams that are irradiated from the first mirror array 80 to mask M via the second section illumination optical system 82 and are transmitted through one opening of mask M, can be condensed on at least one position or area on the image plane. Although the details will be described later, in the present embodiment, beam irradiation system 500 is capable of condensing the beams emitted from condensing optical system 530 into, for example, a spot shape or a slit shape in accordance with the shape of the opening of mask M. It can also be said that, in the present embodiment, condensing optical system 530 is capable of reducing and projecting the opening pattern on mask M onto the image plane, and forming the reduced image of the opening pattern on the image plane. Note that on the image plane of condensing optical system 530, the image of the opening (the irradiation area of the beams) may be formed at the optical axis of condensing optical system 530, or may be formed at a position displaced from the optical axis. In this case, the opening of mask M to be used for processing should be disposed at a position deviated from the optical axis of condensing optical system 530 and the beams from the first mirror array 80 should be irradiated on the opening.

Note that, since the size and the shape of the irradiation area of the beams at the image plane (processing plane MP) of condensing optical system 530 can be changed by moving mask stage 15 and changing the opening to be used for processing, mask stage 15 may be regarded as a part of a mechanism to change the intensity distribution of the beams at the image plane (processing plane MP) of condensing optical system 530.

Further, since condensing optical system 530 has one lens or a plurality of lenses (one lens is representatively illustrated in the drawings such as FIGS. 4 and 8), the square measure of the incident light can be increased, and thereby the large quantity of light energy can be taken in, compared to the case of employing a condensing optical system with a small numerical aperture N.A. Consequently, the beams condensed by condensing optical system 530 related to the present embodiment have an extremely sharp and high energy density at processing plane MP, which directly leads to increasing processing accuracy on processing of workpieces. In the present embodiment, the case is explained where table 12 is moved in a scanning direction parallel to the XY-plane (the Y-axis direction as an example in FIG. 4), and thereby a processing target surface (also referred to as a target surface where necessary) TAS of workpiece W provided with a target portion is made into a parallel or perpendicular state to the XY-plane, and processing (processing treatment) is performed while relatively scanning the beams and workpiece W in the scanning direction (the scan direction), as will be described later. Incidentally, it is needless to say that, on processing, table 12 may be moved in at least one direction of the X-axis direction, the Z-axis direction, the θx direction, the θy direction and the θz direction, during movement of table 12 in the Y-axis direction.

In processing apparatus 100 related to the present embodiment, in order to realize the processing with high throughput that exerts as much as possible the total output of laser (laser power) remarkably increased in the manner as described earlier, the image of the slit-shaped opening on mask M, for example, slit-shaped opening PAa or Pab described earlier, that is, the slit-shaped irradiation area of the beams (see a reference sign LS in FIG. 9B) is formed at the image plane (hereinafter, referred to as processing plane) MP (see, for example, FIGS. 4 and 9A) of condensing optical system 530, desired processing (such as, for example, removal processing) can be performed while relatively scanning workpiece W with respect to the beams forming that irradiation area LS in a direction (the Y-axis direction) perpendicular to the longitudinal direction of the irradiation area. Accordingly, processing, for example, removal processing can be performed at one time on a square measure remarkably wider (e.g., a square measure around several times wider or several tens of times wider), compared to the case of performing scanning (scan) of the workpiece with a spot-shaped beam.

Note that, in FIGS. 4 and 9, an example of removal processing to workpiece W is shown, and the position of workpiece W is controlled so that processing plane MP coincides with the surface of workpiece W after processing (the surface after a part of workpiece W has been removed by the beams). In this case, as obvious from FIGS. 4 and 9, the surface (target surface TAS) of workpiece W before processing is displaced by ΔZ from the image plane (processing plane MP) toward the +Z direction. This ΔZ may be determined on the basis of at least one of the intensity of the beams, material quality of workpiece W and relative scanning velocity between the beams and the workpiece.

Note that processing plane MP needs not be coincident with the surface of workpiece W after processing if that is possible in desired removal processing. For example, the position of workpiece W may be controlled so that target surface TAS of workpiece W and processing plane MP substantially coincide with each other.

In processing apparatus 100 of the present embodiment, the three-dimensional intensity distribution of the beams at a first plane on the exit surface side of condensing optical system 530 and near the first plane can be changed, by the combination of the cross-sectional intensity distribution of the collimated beam from light source system 510, at pupil plane PP1 of illumination optical system 520 set by the second mirror array 78 (the cross-sectional intensity distribution at pupil plane PP2 of condensing optical system 530), and the opening on mask M. This will be described in detail below. In the present embodiment, the first plane on the exit surface side of condensing optical system 530 is a plane where an image of the opening on mask M is formed, and for example, in the case of performing removal processing of a part of the surface of the workpiece with the beams from condensing optical system 530, the first plane refers to processing plane MP. In the present embodiment, processing plane MP is an image plane of condensing optical system 530 (see, for example, FIGS. 4 and 9A), but processing plane MP may be a plane near the image plane. Further, in the present embodiment, processing plane MP is perpendicular to optical axis AX on the exit side of condensing optical system 530, but needs not be perpendicular thereto. Further, it can also be said that beams LB irradiated on processing plane MP function similarly to blades used as processing tools when cutting processing or the like of workpiece W is performed, and therefore the tip of the beams is also referred to as an optical blade in the present text.

FIG. 10A shows a diagram for an example of processing modes that can be set in processing apparatus 100 related to the present embodiment. Six modes of Modes 1 to 6 will be described now. In FIG. 10A, in the figures in the column for =illumination shape□, virtual axis lines orthogonal at the center of a pupil plane (an optical axis) are shown in dashed-dotted lines. In FIG. 10A, the □illumination shape□ is the cross-sectional intensity distribution (the cross-sectional shape) of the beams at pupil plane PP1 of illumination optical system 520, and it can also be said that the □illumination shape□ is the cross-sectional intensity distribution (the cross-sectional shape) of the beams at pupil plane PP2 of condensing optical system 530.

Further, in FIG. 10A, the columns for □front view□ and □side view□ of the tip of the beams (the optical blade) show the shapes of the tip of the beams (the optical blade) between a virtual plane perpendicular to an optical axis between condensing optical system 530 and the image plane (processing plane MP), and the image plane (processing plane MP). Note that, also in the case of employing laser beams in non-visible wavelength band, the explanation can be made with reference to FIG. 10A, assuming that such a laser beams are visible.

Mode 1 is a processing mode in which the intensity distribution is uniform, a circular illumination shape (which is also referred to as a normal illumination) with the optical axis serving as its center is set, and as the opening on mask M, a slit-shaped opening with a linewidth of 10 μm and a length of 10 mm, i.e., opening PAa or PAb described earlier is selected. In the present text, selecting the opening includes forming (setting), with the first mirror array 80, an illumination field (an irradiation area of illumination light) in which only a partial area on mask M including the selected opening is irradiated with the illumination light. Here, the illumination field is formed only in the partial area on mask M including the selected opening, so that the loss of laser power is reduced as much as possible by concentratedly irradiating a selected pattern section with the entire beam emitted from light source system 510.

In Mode 1, as shown in FIG. 10A, the shape of the optical blade is an isosceles trapezoidal shape in vertically reversed state and the length of its edge is 1 mm when viewed from its front, and is an isosceles triangular shape in vertically reversed state and a dimension of its edge is 1 μm when viewed from its side. Note that in FIG. 10A the direction indicated by the coordinate axis shown in each of the front views and the side views of the optical blade refers to a scanning direction of the workpiece on processing. In Mode 1, the scanning direction is in the X-axis direction in the case where opening PAa is selected, and the scanning direction is in the Y-axis direction in the case where opening PAb is selected.

Mode 2 is a processing mode in which as the opening on mask M, the foregoing slit-shaped opening PAa or PAb is selected, and a half-circular illumination shape having a linear part corresponding to the longitudinal direction of the selected opening is set. The illumination shape in Mode 2 has an edge along a virtual axis line extending in a lateral direction in a paper surface of FIG. 10A, and the beams are distributed in an area on one side of two areas divided by this virtual axis line, at the pupil plane. The half-circular illumination shape in Mode 2 can be referred to as an illumination shape that is one-fold rotationally symmetric with respect to the center of the pupil plane (the optical axis). In Mode 2, the virtual axis line extending in the lateral direction in the paper surface corresponds to a direction orthogonal to the scanning direction of the workpiece at the image plane (the XY-plane).

In Mode 2, as shown in FIG. 10A, the shape of an optical blade is an isosceles trapezoidal shape in vertically reversed state and the length of its edge is 1 mm when viewed from its front, which is similar to Mode 1. However, when viewed from its side, the shape of the optical blade is a right-angled triangular shape that is the isosceles triangle in vertically reversed state of Mode 1 being halved. In Mode 2, the scanning direction is in the X-axis direction in the case where opening PAa is selected, and the scanning direction is in the Y-axis direction in the case where opening PAb is selected. In Mode 2, as shown in the side view, the optical blade (the tip of the beams) has an outer edge substantially included in a plane parallel to the optical axis of condensing optical system 530, on the side of a traveling direction of the optical blade (which is a reversed direction to the scanning direction of the workpiece), and the workpiece and the optical blade are relatively moved in a direction substantially orthogonal to the plane including the outer edge (a direction parallel to the scanning direction). Note that the illumination shape in Mode 2 has an edge along the virtual axis line extending in the lateral direction in the paper surface and the beams are distributed in the area on one side (the lower side) of two areas divided by this virtual axis line, at the pupil plane, but there may be another mode in which the beams are distributed in an area on the other side (the upper side).

Mode 3 is a processing mode in which as the opening on mask M, the foregoing slit-shaped opening PAa or PAb is selected, and a half-circular illumination shape having a linear part corresponding to a direction orthogonal to the longitudinal direction of the selected opening is set. The illumination shape in Mode 3 has an edge along a virtual axis line extending in a vertical direction in the paper surface of FIG. 10A, and the beams are distributed in an area on one side of two areas divided by this virtual axis line, at the pupil plane. This half-circular illumination shape in Mode 3 can be referred to as an illumination shape that is one-fold rotationally symmetric with respect to the center of the pupil plane (the optical axis). In Mode 3, the virtual axis line extending in the vertical direction in the paper surface corresponds to the scanning direction of the workpiece at the image plane (the XY-plane). In Mode 3, as shown in FIG. 10A, the shape of an optical blade is a trapezoidal shape, when viewed from its front, which is like an isosceles trapezoidal shape in vertically reversed state in Mode 1 with a right-angled triangular section on a right end being excised, and one leg is perpendicular to the upper base and the lower base, and the length of its edge is 1 mm similarly to Modes 1 and 2. When viewed from its side, the shape of the optical blade is an isosceles triangular shape similar to that in Mode 1, and the dimension of the edge is 1 µm. In Mode 3, the scanning direction is in the X-axis direction in the case where opening PAa is selected, and the scanning direction is in the Y-axis direction in the case where opening PAb is selected. In Mode 3, as shown in the front view, the optical blade (the tip of the beams) has an outer edge substantially included in a plane parallel to the optical axis of condensing optical system 530, and the workpiece and the optical blade are relatively moved in a direction parallel to the plane including the outer edge (a direction parallel to the scanning direction). Note that the illumination shape in Mode 3 has an edge along the virtual axis line extending in the vertical direction in the paper surface and the beams are distributed in an area on one side (the left side) of two areas divided by this virtual axis line, at the pupil plane, but there may be another mode in which the beams are distributed in an area on the other side (the right side).

Mode 4 is a processing mode in which as the opening on mask M, the foregoing slit-shaped opening PAa or PAb is selected, and a quarter-circular illumination shape having two linear parts corresponding to the longitudinal direction of the selected opening and a direction orthogonal to the longitudinal direction, respectively, is set. The illumination shape in Mode 4 has an edge along a virtual axis line extending in the lateral direction in the paper surface of FIG. 10A and an edge along a virtual axis line extending in the vertical direction in the paper surface of FIG. 10A, and the beams are distributed in one area of four areas divided by these two virtual axis lines, at the pupil plane. In Mode 4, as shown in FIG. 10A, the shape of an optical blade is a trapezoidal shape which is similar to that in Mode 3 when viewed from its front, and is a right-angled triangular shape which is similar to that in Mode 2 when viewed from its side. In Mode 4, the scanning direction is in the X-axis direction in the case where opening PAa is selected, and the scanning direction is in the Y-axis direction in the case where opening PAb is selected. The quarter-circular illumination shape in Mode 4 can be referred to as an illumination shape that is one-fold rotationally symmetric with respect to the center of the pupil plane (the optical axis). In Mode 4, similarly to Mode 2, the optical blade (the tip of the beams) has a first outer edge substantially included in a plane parallel to the optical axis of condensing optical system 530, on the side of a traveling direction of the optical blade (which is a reversed direction to the scanning direction of the workpiece), and the workpiece and the optical blade are relatively moved in a direction substantially orthogonal to the plane including the first outer edge (a direction parallel to the scanning direction). Further, in Mode 4, similarly to Mode 3, the optical blade (the tip of the beams) has a second outer edge substantially included in a plane parallel to the optical axis of condensing optical system 530, and the workpiece and the optical blade are relatively moved in a direction substantially parallel to the plane including the second outer edge (a direction parallel to the scanning direction). Note that the illumination shape in Mode 4 has an edge along a virtual axis line extending in the lateral direction in the paper surface and an edge along a virtual axis line extending in the vertical direction in the paper surface, and the beams are distributed in one area (a third quadrant) of four areas (quadrants) divided by these two virtual axis lines, at the pupil plane, but there may be another mode in which the beams are distributed in another area (another quadrant), e.g. a first quadrant, of the four areas (the quadrants).

Mode 5 is a processing mode in which a circular illumination shape with a small diameter with the optical axis serving as its center (which is also referred to as a small a illumination) is set in the center part of the pupil plane, and as the opening on mask M, a pinhole-shaped opening PAc with a diameter of 10 µm is selected. In Mode 5, as shown in FIG. 10A, the shape of an optical blade is a linear shape with a diameter of 1 µm and extending vertically (in the Z-axis direction) when viewed from both of its front and its side. The optical blade in this case has a bar-like shape with a circular cross section and a linear shape with a diameter of 1 µm and extending vertically (in the Z-axis direction) when viewed from any directions in side view. Accordingly, in Mode 5, the scanning direction can be set in an arbitrary direction.

Mode 6 is a processing mode in which the normal illumination is set as the illumination shape, and pinhole-shaped opening PAc with a diameter of 10 µm is selected as the opening on mask M. In Mode 6, as shown in FIG. 10A, the shape of an optical blade is an isosceles triangular shape in vertically reversed state similar to the side view of Mode 1, when viewed from both of its front and its side. The optical blade in this case has a conical shape with a circular cross section, and has a same isosceles triangular shape in vertically reversed state when viewed from any directions in side view. Accordingly, in Mode 6, the scanning direction can be set in an arbitrary direction.

Note that the workpiece and the beams may be relatively moved in a direction intersecting the X-axis and the Y-axis within the image plane (the XY-plane), by using an opening of mask M and an illumination shape similar to Mode 2. Similarly, the workpiece and the beams may be relatively moved in a direction intersecting the X-axis and the Y-axis within the image plane (the XY-plane), by using an opening of mask M and an illumination shape similar to Mode 3. Similarly, the workpiece and the beams may be relatively moved in a direction intersecting the X-axis and the Y-axis within the image plane (the XY-plane), by using an opening of mask M and an illumination shape similar to Mode 4.

Note that a combination of the illumination shape in any one of Modes 2, 3 and 4, and opening PAc (pinhole) may be set.

Figure 19A:
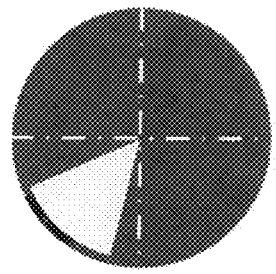
FIGS. 19A to 19D are diagrams s respectively showing different examples of illumination shapes that can be set in the processing apparatus related to the embodiment.
Figure 19B:
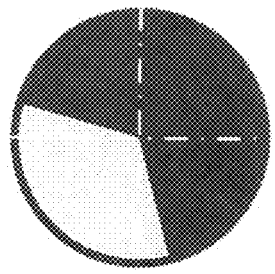

Further, as shown in FIGS. 19A and 19B, an illumination shape whose linear edge is not along a virtual axis line (non-parallel to the virtual axis line) may be set.

And, as shown in FIG. 19B, an illumination shape that lies across three areas (quadrants) of the four areas (quadrants) may be set.

Figure 19C:
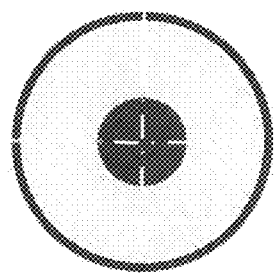
Figure 19D:
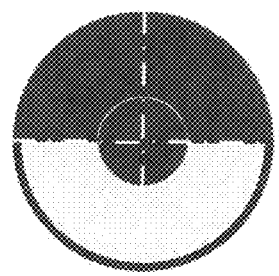

And, as shown in FIGS. 19C and 19D, such an illumination shape may be set that the beams do not pass through an area including the center of the pupil plane (the optical axis). In the case of such an illumination shape also, a linear edge needs not be along the virtual axis line, as shown in FIGS. 19A and 19B.

Note that in the change from one mode to another mode among Modes 1, 2, 3 and 4, only the change of the illumination shape is performed.

Also, in the change from one of Modes 5 and 6 to the other, only the change of the illumination shape is performed.

In the change from one of Modes 1 and 6 to the other, only the change of the opening shape is performed.

And, in the change from one mode of Modes 1, 2, 3 and 4 to Mode 5, or in the change from Mode 5 to one mode of Modes 1, 2, 3 and 4, the change of the illumination shape and the opening shape is performed.

Further, in the change from one mode of Modes 2, 3 and 4 to Mode 6, or in the change from Mode 6 to one mode of Modes 2, 3 and 4, the change of the illumination shape and the opening shape is performed.

FIG. 10B shows examples of target portions of the workpiece suitable to be processed with the optical blades of Mode 1, Mode 2, Mode 3 and Mode 4, respectively, and FIG. 10C shows examples of target portions of the workpiece suitable to be processed with the optical blades of Mode 5 and Mode 6, respectively.

The optical blade of Mode 1 is suitable, in particular, for removal processing of the surface of the workpiece, for example, as shown in the optical blade front view and the optical blade side view in FIG. 10A, and FIG. 10B. Further, the respective optical blades of Mode 2, Mode 3 and Mode 4 are suitable for removal processing of the side surface of a groove section when forming the groove section with a predetermined depth on the surface of the workpiece, for example, as shown in the optical blade front views and the optical blade side views in FIG. 10A, and FIG. 10B. In particular, Mode 4 is suitable for removal processing of a corner part of the groove section.

Further, the optical blade of Mode 5 is suitable for cutting-off processing of cutting, for example, a plate-shaped member into an arbitrary curved shape or linear shape, as obvious from the optical blade front view and the optical blade side view in FIG. 10A. □Mode 5□ in FIG. 10C shows that a workpiece with a gourd-shape is made as a result of cutting the plate-shaped member by the optical blade of Mode 5 and the side surface of such a workpiece is the cut surface by the optical blade of Mode 5.

Further, the optical blade of Mode 6 is suitable, in particular, for forming a fine groove pattern with an arbitrary shape on the surface of the workpiece, for example, a fine pattern such as, for example, a biochip channel or the like, as obvious from the optical blade front view and the optical blade side view in FIG. 10A, and FIG. 10C.

Besides, processing apparatus 100 is provided with a liquid supply device 540 (see FIG. 14). Liquid supply device 540 can be used, for example, in quenching processing with the beams from condensing optical system 530. Liquid supply device 540 has a supply port to supply cooling liquid (cooling water), and is configured to supply the cooling liquid to a cooling target. Liquid supply device 540 is connected to controller 600 (see FIG. 14). On the quenching processing, controller 600 controls light source unit 60 to adjust the thermal energy of the beams from condensing optical system 530 irradiated on the workpiece, to an appropriate value for the quenching processing. Then, after irradiating the surface of the workpiece held by table 12 with the beams, thereby heating it to a high temperature, controller 600 is capable of performing the quenching processing by jetting the cooling liquid from liquid supply device 540 to the high-temperature part, thereby rapidly cooling the high-temperature part, while the workpiece is held on table 12.

Processing apparatus 100 related to the present embodiment is equipped with a measurement device 110 (see FIG. 11) to perform measurement processing by receiving the beams from condensing optical system 530. For example, measurement device 110 is capable of measuring the optical properties of the beams and the like by receiving the beams from condensing optical system 530. In the present embodiment, measurement device 110 can be used, for example, to manage the intensity distribution of the beams. In the present embodiment, measurement device 110 is capable of measuring at least one of the intensity distribution of the beams at the image plane (which coincides with processing plane MP in the present embodiment) of condensing optical system 530 and the intensity distribution of the beams at pupil plane PP2 of condensing optical system 530. Note that the intensity distribution of the beams at pupil plane PP2 of condensing optical system 530 can be regarded as the intensity distribution in the angular direction of the beams at the image plane of condensing optical system 530.

Figure 11:
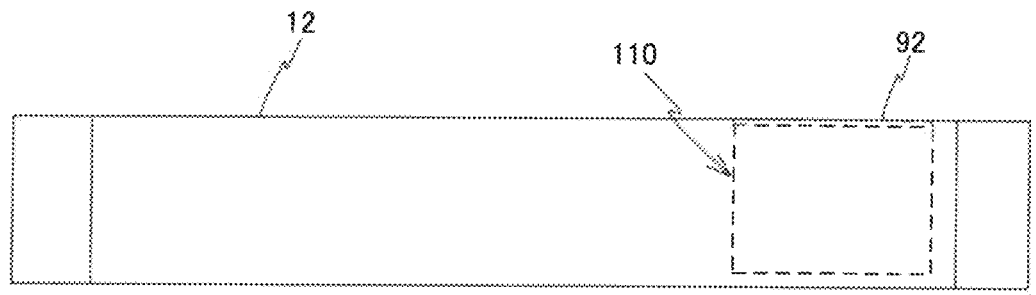
FIG. 11 is a view showing an arrangement of a measurement device on the table.

As shown in FIG. 11, measurement device 110 has a measurement member 92 that configures a part of the upper surface of table 12, and remaining constituent parts housed inside table 12.

Figure 12:
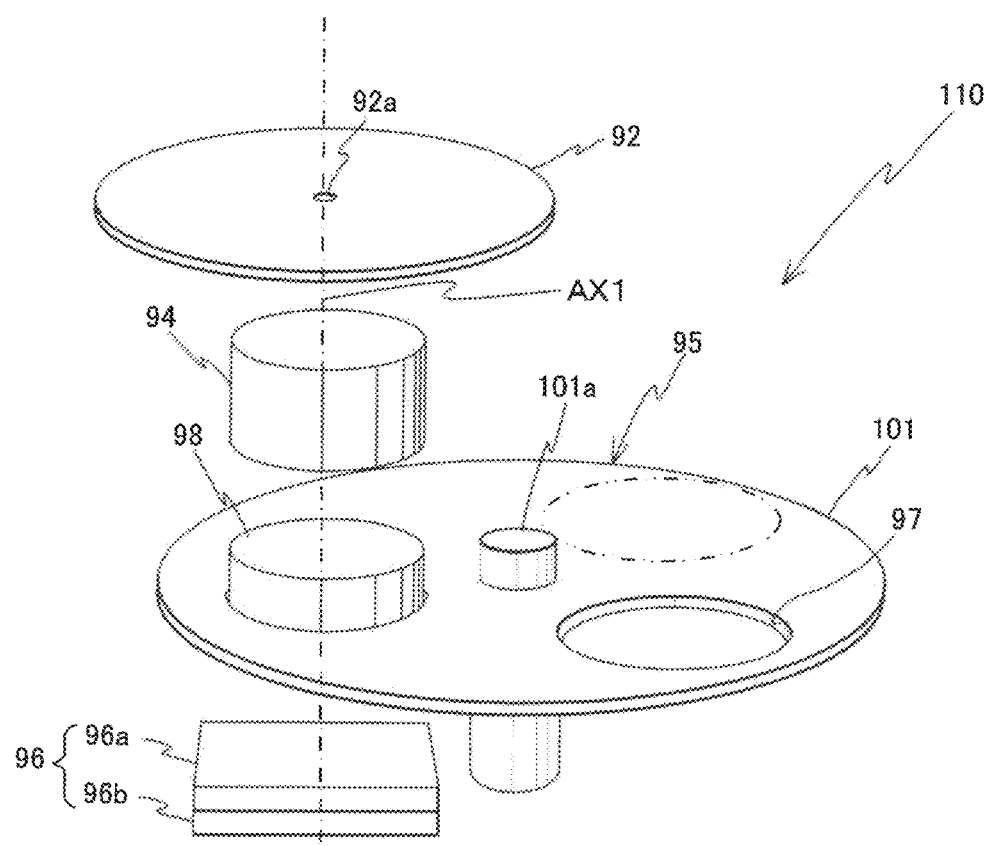
FIG. 12 is a view showing constituent parts, disposed inside the table, that configure the measurement device, together with a measurement member.

FIG. 12 shows in a perspective view the constituent parts that are a part of measurement device 110 and are disposed inside table 12, together with measurement member 92. As shown in FIG. 12, measurement device 110 is equipped with measurement member 92, a first optical system 94, an optical system unit 95 and a light receiver 96.

Measurement member 92 is disposed in a circular opening formed on the upper surface of table 12 in a state where the upper surface of measurement member 92 is flush (coplanar) with remaining parts of table 12. Measurement member 92 has a base material formed of material capable of transmitting the beams from condensing optical system 530 such as, for example, synthetic quartz, and a light-shielding film also serving as a reflection film is formed on the surface of the base material by vapor-deposition of metal such as chromium, and a circular opening 92a is formed in the center part of the light-shielding film. Thus, the upper surface of measurement member 92 includes the surface of the light-shielding film and the base material surface in opening 92a. Note that the light-shielding film is formed very thin, and in the description below, the explanation will be made assuming that the surface of the light-shielding film and the base material surface in opening 92a are located in the same plane. Although the light-shielding film needs not be formed, the effect of suppressing the influence of flare and the like can be expected on measurement by forming the light-shielding film.

The first optical system 94 is disposed below measurement member 92. The beams via opening 92a of measurement member 92 are incident on the first optical system 94. Note that, although the first optical system 94 in the present embodiment is a collimator optical system, it needs not be the collimator optical system.

Optical system unit 95 has a rotation plate 101 with a circular shape provided with a rotating shaft 101a in the center. At rotation plate 101, an opening section 97 and a lens (second optical system) 98 are disposed at a predetermined angular spacing with rotating shaft 101a serving as the center. By the rotation of rotating shaft 101a, i.e. the rotation of rotation plate 101, either of opening section 97 or lens 98 can be selectively placed in an optical path of the beams via the first optical system 94 (placed at a position corresponding to an optical axis AX1). The rotation of rotating shaft 101a is performed by a drive device 102 (not illustrated in FIG. 12, see FIG. 14) under the instruction of controller 600.

Opening section 97 causes parallel beams emitted from the first optical system 94 to directly pass through. By placing this opening section 97 in the optical path of the beams via condensing optical system 530 and moving the first optical system 94 or at least one optical element configuring the first optical system 94, the intensity distribution of the beams at the pupil plane (the entrance pupil) of condensing optical system 530 can be measured with light receiver 96. Note that measurement device 110 needs not be capable of measuring the intensity distribution at the pupil plane (the entrance pupil) of condensing optical system 530. In this case, lens 98 may be fixed.

Lens 98 configures a relay optical system, together with the first optical system 94, and causes the upper surface of measurement member 92 in which opening 92a is formed and the light-receiving surface of a light-receiving element (to be described later) of light receiver 96 to be optically conjugate with each other.

Light receiver 96 has a light-receiving element (hereinafter, referred to as a □CCD□ where necessary) 96a made up of a two-dimensional CCD or the like, and an electric circuit 96b such as, for example, a charge transfer control circuit. Incidentally, it is needless to say that a CMOS image sensor may be employed as light-receiving element 96a. The light-receiving results (the light-receiving data) of light receiver 96 are output to controller 600 (see FIG. 14). CCD 96a has a square measure sufficient to receive all the parallel beams that enter the first optical system 94 via opening 92a, are emitted from the first optical system 94 and pass through opening section 97. Further, the light-receiving surface of CCD 96a is optically conjugate with the upper surface of measurement member 92 (the formation surface of opening 92a) by the relay optical system including the first optical system 94 and lens 98. Further, each pixel of CCD 96a has such a size that a plurality of pixels are included in an irradiation area of the beams converged via the relay optical system described above. One reference pixel or a plurality of reference pixels is/are determined for CCD 96a, and a positional relationship between the reference pixel (s) and a reference point of table 12, for example, a center point of table 12 is already known. Consequently, controller 600 is capable of knowing a positional relationship between the beams incident on CCD 96a and the reference pixel(s) from the output of light receiver 96, and acquiring position information of the beams within the table coordinate system (e.g. condensed position information of the beams).

Note that the light-receiving surface of CCD 96a is conjugate with the pupil plane of condensing optical system 530 in a state where the upper surface of measurement member 92 (the base material surface) coincides with the image plane (processing plane MP) of condensing optical system 530 and also opening section 97 is placed in the optical path of the beams via opening 92a and the first optical system 94.

Further, instead of opening section 97, an optical system (an optical member) may be disposed at rotation plate 101, and the light-receiving surface of CCD 96a and the pupil plane of condensing optical system 530 may be made conjugate. Further, on the measurement, the upper surface of measurement member 92 may be disposed at a position displaced from the image plane of condensing optical system 530 in a direction of optical axis AX.

Further, optical system unit 95 is not limited to the foregoing one. For example, lens 98 may be held by a movable member without rotation plate 101, and lens 98 may be inserted and withdrawn by moving the movable member in a direction perpendicular to the optical axis (e.g., along the X-axis direction).

As obvious from the above description, in the present embodiment, since measurement device 110 including measurement member 92 is provided at table 12 that is freely movable in the directions of six degrees of freedom, measurement member 92 that functions as a light-receiving section of measurement device 110 is capable of receiving the beams from condensing optical system 530 while moving in at least one direction of the Z-axis direction parallel to optical axis AX on the exit surface side of condensing optical system 530, the X-axis direction and the Y-axis direction that are perpendicular to optical axis AX.

Although the description goes out of sequence, measurement with measurement device 110 will be described now. Measurement of the intensity distribution of the beams at the image plane of condensing optical system 530 and near the image plane (a nearby plane in the Z-axis direction) is performed, for example, in the following manner.

First of all, controller 600 controls planar motor 26 and telescopic mechanisms $16_1$ to $16_6$ on the basis of the measurement values of position measurement system 28 and linear encoders $24_1$ to $24_6$, thereby moving table 12 on the basis of a known target value (such as design information), and positioning opening 92a of measurement member 92 at a position in optical axis AX of condensing optical system 530.

Further, controller 600 rotates rotation plate 101 via drive device 102, and places lens 98 in the optical path of the beams via opening 92a and the first optical system 94. Then, in this state, the intensity distribution of the beams at the image plane of condensing optical system 530 is measured on the basis of the light-receiving data (which is denoted by a reference sign □LRD1□, see FIG. 14) that is the light-receiving results of the beams converged by lens 98 on the light-receiving surface of CCD 96a.

In FIG. 13A, the optical arrangement at the time when the intensity distribution of the beams at the image plane of condensing optical system 530 is measured is shown expanding along optical axis AX1 of measurement device 110 and optical axis AX of condensing optical system 530 (however, the illustration of upstream-side sections of condensing optical system 530 is omitted). On the measurement of the intensity distribution of the beams, it is assumed that, for example, the positioning of mask M in any one of Modes 1 to 6 described earlier and the setting of the reflection surface of each mirror element $81_{i,j}$ of the second mirror array 78 are performed, and furthermore that the reflection surface of each mirror element $81_{p,q}$ of the first mirror array 80 is set at a design angle with which a desired intensity distribution of the beams (the shape, the size, the position and the like of the irradiation area of the beams) can be obtained on mask M.

Under the preconditions as described above, in the optical arrangement as shown in FIG. 13A, when controller 600 oscillates a laser beam from at least one laser unit 70 of light source unit 60 and a parallel beam is emitted from light source system 510, the parallel beam is irradiated on the first mirror array 80 via the second mirror array 78 and the first sectional illumination optical system 79, and is reflected by the plurality of mirror elements $81_{p,q}$ of the first mirror array 80 to be a plurality of parallel beams, and the plurality of parallel beams are irradiated on an area that surrounds and is slightly larger than the selected opening of mask M via the second section illumination optical system 82. The plurality of beams entering condensing optical system 530 via the opening of mask M are condensed on the image plane by condensing optical system 530, and enter opening 92a located at the image plane or near the image plane.

The beams having passed through opening 92a are condensed on an optically conjugate plane of measurement member 92, i.e., the light-receiving surface of CCD 96a, by the relay optical system composed of the first optical system 94 and lens 98. Thus, the intensity distribution at the light-receiving surface of CCD 96a is the intensity distribution of the beams in the upper surface of measurement member 92. The beams having such the intensity distribution are received by CCD 96a, and light-receiving data LRD1 obtained by photoelectric conversion is transmitted from light receiver 96 (electric circuit 96b) to controller 600 (see FIG. 14).

Then, while performing step movement of table 12 in the Z-axis direction via telescopic mechanisms $16_1$ to $16_6$ on the basis of the measurement values of linear encoders $24_1$ to $24_6$, controller 600 captures the foregoing light-receiving data LRD1, and on the basis of the captured light-receiving data LRD1, finds such a position in the Z-axis direction that the square measure of the irradiation area of the beams formed on the light-receiving surface of CCD 96a is reduced to the minimum. The square measure of the irradiation area of the beams formed on the light-receiving surface of CCD 96a is the minimum when the upper surface of measurement member 92 coincides with the image plane of condensing optical system 530 and the sharpest irradiation area of the beams is formed in opening 92a. Consequently, on the basis of light-receiving data LRD1 from light receiver 96, controller 600 is capable of deciding that such a Z-position of table 12 that the number of pixels to receive the beams is the fewest is a Z-position at which the upper surface of measurement member 92 and the image plane are coincident with each other. In the present embodiment, the image plane serves as processing plane MP and therefore, on the basis of light-receiving data LRD1 at such the Z-position, controller 600 is capable of obtaining the intensity distribution of the beams (the shape, the size, the position and the like of the irradiation area of the beams) at processing plane MP. In the present embodiment, controller 600 is capable of obtaining the three-dimensional intensity distribution of the beams between the image plane (processing plane MP) and a plane (the foregoing virtual plane) (on the +Z side) near the image plane, on the basis of light-receiving data LRD1 that has been captured with respect to each step position in the Z-axis direction in the process of obtaining such a Z-position of table 12 that the upper surface of measurement member 92 and the image plane are coincident with each other. It can also be said that obtaining the three-dimensional intensity distribution of the beams is obtaining the shape of the optical blade. Therefore, in the case where the three-dimensional intensity distribution of the beams (e.g., the cross-sectional intensity distribution at a plane on the +Z side near the image plane) is different from a desired state, controller 600 adjusts, for example, the angle of at least a part of the plurality of mirror elements $81_{i,j}$ of the second mirror array 78 and thereby adjusts the three-dimensional intensity distribution of the beams into the desired state. It can also be said that the adjustment of the three-dimensional intensity distribution of the beams is the adjustment of the shape of the optical blade.

Note that controller 600 is also capable of adjusting the intensity distribution of the beams (the shape, the size, the position and the like of the irradiation area of the beams) at processing plane MP, taking into consideration only the measurement results of the intensity distribution of the beams at the image plane (processing plane MP), without taking the three-dimensional intensity distribution of the beams into consideration. Note that since the first mirror array 80 is disposed at a position conjugate with pupil plane PP2 of condensing optical system 530 or near the position, the three-dimensional intensity distribution of the beams may be adjusted by adjusting the angle of at least a part of mirror elements $81_{i,j}$.

Further, in the case where the intensity distribution of the beams at the image plane (processing plane MP) of condensing optical system 530 is different from a desired state, controller 600 performs at least one of position adjustment of mask M (the opening) and angle adjustment of at least a part of the plurality of mirror elements $81_{i,j}$ of the second mirror array 78.

Note that, in order to change the intensity distribution of the beams at the image plane (processing plane MP) of condensing optical system 530, mask M (the opening) may be deformed. Further, the size of an image of the opening may be changed or the image of the opening may be distorted by adjusting condensing optical system 530 (e.g., by moving a part of the optical elements of condensing optical system 530).

Further, from a positional relationship between the intensity distribution of the beams at the light-receiving surface of CCD 96a and one reference pixel or a plurality of reference pixels in a state where the upper surface of measurement member 92 and the image plane of condensing optical system 530 are coincident with each other, the position on the table coordinate system and the like of the irradiation area of the beams at processing plane MP (the image plane of condensing optical system 530) can be obtained.

In the present embodiment, after performing measurement of at least one of the intensity distribution of the beams (the shape, the size, the position and the like of the irradiation area of the beams) at processing plane MP described above and the intensity distribution of the beams at a plane near the processing plane, controller 600 performs measurement of the intensity distribution of the beams at pupil plane (entrance pupil) PP2 of condensing optical system 530, which will be described next. Note that the measurement of the intensity distribution of the beams at pupil plane PP2 may be performed before performing the measurement of the intensity distribution of the beams at the image plane (processing plane MP). Further, the measurement of the intensity distribution of the beams at pupil plane PP2 and the measurement of the intensity distribution of the beams at the image plane (processing plane MP) need not continuously be performed.

The measurement of the intensity distribution of the beams at the pupil plane (the entrance pupil) of condensing optical system 530 is performed, for example, in the following manner.

After the measurement of the intensity distribution of the beams at processing plane MP described above has been completed, controller 600 rotates rotation plate 101 via drive device 102 and places opening section 97 in the optical path of the beams via opening 92a and the first optical system 94, while maintaining the position of table 12 at such a position that the upper surface of measurement member 92 (the formation surface of opening 92a) is located in optical axis AX of condensing optical system 530 and at the same height as processing plane MP. Then in this state, controller 600 performs the measurement of the intensity distribution of the beams at pupil plane PP2. It can also be said that the measurement of the intensity distribution of the beams at pupil plane PP2 is measurement of the cross-sectional shape of the beams at pupil plane PP2. Further, since pupil plane PP1 of illumination optical system 520 is conjugate with pupil plane PP2 of condensing optical system 530, it can also be said that the measurement of the intensity distribution at pupil plane PP2 is measurement of the intensity distribution at pupil plane PP1. It can also be said that the measurement of the intensity distribution at pupil plane PP1 of illumination optical system 520 is measurement of the cross-sectional shape (the illumination shape) of the beams at pupil plane PP1.

In FIG. 13B, the optical arrangement at the time when the intensity distribution of the beams at the pupil plane is measured is shown expanding along optical axis AX1 of measurement device 110 and optical axis AX of condensing optical system 530 (however, the illustration of upstream-side sections of condensing optical system 530 is omitted). As shown in FIG. 13B, in this state, opening section 97 is placed in the optical path of the beams, and therefore the parallel beams via the first optical system 94 directly enter CCD 96a configuring light receiver 96. In this case, the light-receiving surface of CCD 96a can be regarded as being disposed at a position conjugate with the pupil plane of condensing optical system 530, and it becomes possible to receive light flux corresponding to the intensity distribution of the beams at the pupil plane. Therefore, controller 600 captures light-receiving data (which is denoted by a reference sign □LRD2□, see FIG. 14) of light receiver 96, and obtains the intensity distribution of the beams at the pupil plane on the basis of light-receiving data LRD2. Then, data of the intensity distribution that has been obtained is stored in a memory.

Controller 600 is capable of adjusting, for example, the angle of at least a part of the plurality of mirror elements $81_{i,j}$ of the second mirror array 78 on the basis of the measurement results of the intensity distribution of the beams at the pupil plane. Note that the intensity distribution of the beams at the image plane (processing plane MP) and the intensity distribution of the beams at pupil plane PP2 may be regarded as the three-dimensional intensity distribution of the beams. That is, from the intensity distribution of the beams at the image plane (processing plane MP) measured with measurement device 110 and the intensity distribution of the beams at pupil plane PP2, the three-dimensional intensity distribution of the beams (the shape of the optical blade) may be obtained, and on the basis of the obtained result, for example, the angle of at least a part of the mirror elements of at least one of the first mirror array 80 and the second mirror array 78 may be adjusted.

Referring back to FIG. 1, controller 600 includes: a superior system cooperating section 620 that is connected to a superior system including a host computer via, for example, a local area network (LAN) or the like; and a recipe creating section 630. Superior system cooperating section 620 acquires online CAD data of a workpiece before and after processing from the superior system, on the basis of instructions from an operator. Recipe creating section 630 creates recipe data (control information with respect to each part of processing apparatus 100 when processing is performed, which is information to instruct a series of procedures) to be used in the processing by processing apparatus 100 on the basis of the CAD data of the workpiece before and after processing acquired by superior system cooperating section 620. That is, in processing apparatus 100, by only instructing the creation of the recipe data (hereinafter, shortly referred to as a recipe where necessary), an operator is capable of acquiring the recipe to be used in the processing by processing apparatus 100.

In FIG. 14, a block diagram is illustrated that shows the input/output relationship of controller 600 that centrally configures the control system of processing apparatus 100. Controller 600 includes a workstation (or a microcomputer) and the like, and performs the overall control of the respective constituents of processing apparatus 100.

Processing apparatus 100 configured as described above related to the present embodiment is capable of performing, to a processing target (a workpiece), various types of processing such as removal processing to remove a part of the workpiece and cutting processing to cut the workpiece, with the beams from condensing optical system 530. The workpiece is fed into processing apparatus 100 and then is carried out from processing apparatus 100 after being processed. A series of works performed in processing apparatus 100 are automated, and the workpieces can be supplied by the feeding in a lot unit with a constant quantity of the workpieces collected on a pallet being regarded as one lot.

Figure 15:
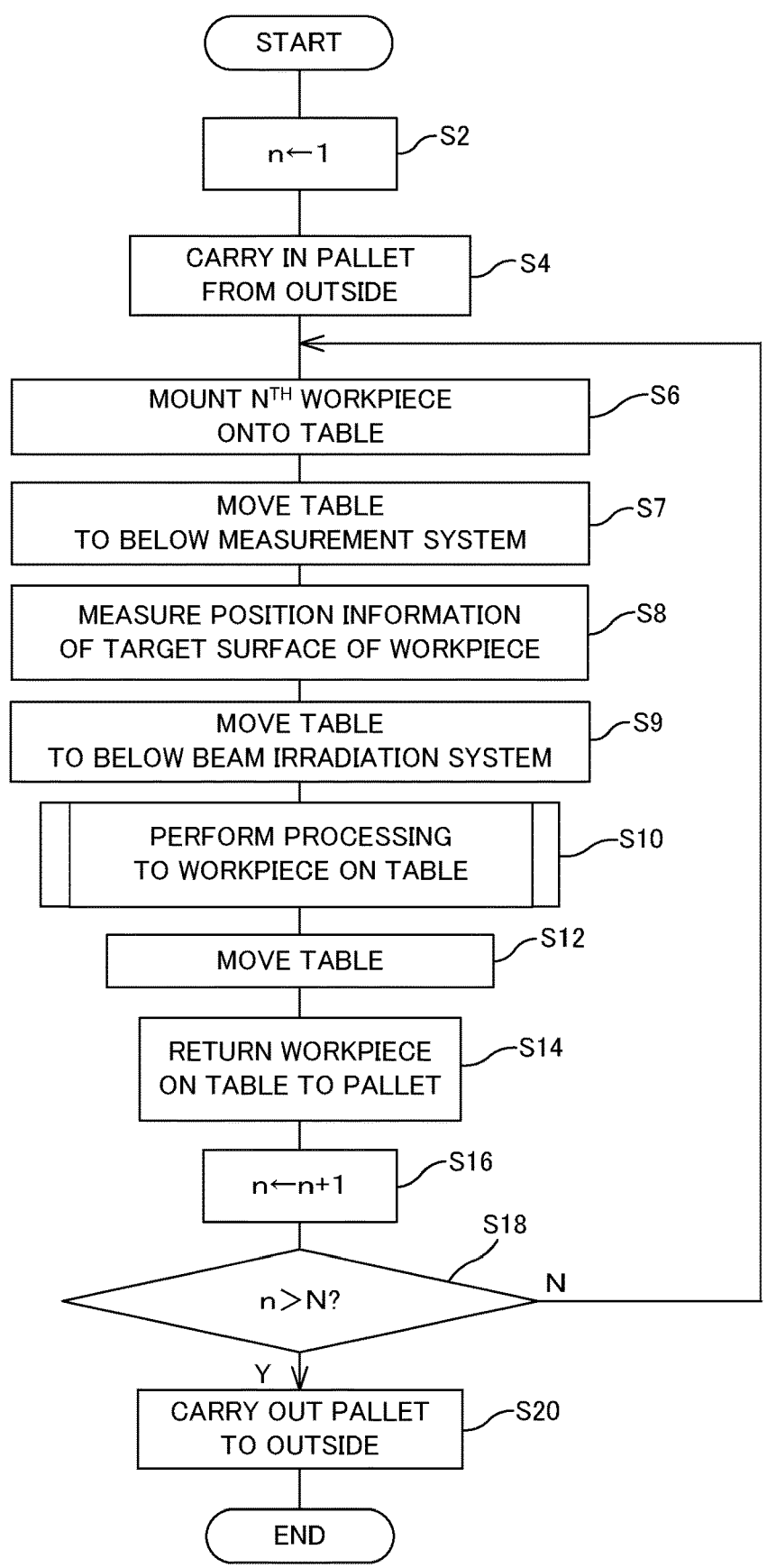
FIG. 15 is a flowchart corresponding to a series of processing algorithms of the controller.

FIG. 15 shows a flowchart corresponding to a series of processing algorithm of controller 600. Although the following processing (including judgement) of each step in the flowchart is performed by controller 600, the description regarding controller 600 will be omitted below except for the case where such the description is needed in particular.

As the premise, it is assumed that, in response to a recipe creation instruction from an operator, at least one recipe has been created beforehand by superior system cooperating section 620 and recipe creating section 630 that controller 600 has, and the recipe has been stored in a storing device (not illustrated) as recipe database. Then, when the operator instructs controller 600 to select a desired recipe, the processing following the flowchart in FIG. 15 is started.

First of all, in Step S2, a count value n of a counter that indicates the number of a workpiece in a lot is initialized (n←1).

In the next Step S4, a pallet (not illustrated) on which workpieces in one lot before processing are mounted is carried from the outside into a predetermined carry-out/carry-in position in processing apparatus 100. This carry-in is performed by a carry-out/carry-in device (not illustrated) in response to the instruction from controller 600. Herein, one lot includes, for example, i×j numbers of workpieces, and the i×j numbers of workpieces are mounted in an arrangement of matrix shape with i rows and j columns on the pallet. That is, on the upper surface of the pallet, the mounting positions (the placing positions) of the workpieces in the arrangement of matrix shape with i rows and j columns are determined, and the workpieces are mounted (placed) at the respective mounting positions. For example, marks are provided at the respective mounting positions, and the position of each mark on the pallet is known. In the description below, it is assumed that, as an example, one lot includes 4×5=20 workpieces, marks are provided in an arrangement of matrix shape with 4 rows and 5 columns on the upper surface of the pallet, and the workpieces are mounted on the respective marks. For example: the first to fifth workpieces in the lot are disposed at positions of row 1 of column 1 to row 1 of column 5; the sixth to tenth workpieces are disposed at positions of row 2 of column 1 to row 2 of column 5; the eleventh to fifteenth workpieces are disposed at positions of row 3 of column 1 to row 3 of column 5; and the sixteenth to twelfth workpieces are disposed at positions of row 4 of column 1 to row 4 of column 5.

In the next Step S6, the $n^{th}$ workpiece in the lot is taken out of the pallet and mounted onto table 12. At this time, the first stage system 200A is assumed to be at a loading/unloading position set near a position where carrier system 300 is installed in processing apparatus 100. Further, at this time, table 12 is in the foregoing reference state $(Z, \theta x, \theta y, \theta z) = (Z_0, 0, 0, 0)$, and the X-position and the Y-position of table 12 are coincident with the X-position and the Y-position of slider 10 measured by position measurement system 28.

Specifically, controller 600 identifies a position (i,j) on the pallet for a workpiece to be taken out, referring to the count value n, and provides carrier system 300 with the instruction of taking out the workpiece located at the identified position (i,j). In response to this instruction, the workpiece is taken out from the pallet and is mounted onto table 12 by carrier system 300. For example, in the case of n=1, a workpiece located at a position of row 1 of column 1 on the pallet is taken out and mounted onto table 12.

Subsequently, in Step S7, table 12 on which the workpiece is mounted is moved to below measurement system 400 (sensor section 38). This movement of table 12 is performed by controller 600 controlling planar motor 26 on the basis of measurement information of position measurement system 28 and moving the first stage system 200A in the X-axis direction (and the Y-axis direction) above base BS. During this movement also, table 12 is maintained in the foregoing reference state.

In the next Step S8, measurement of position information in a three-dimensional space (the three-dimensional shape information in the present embodiment) of at least a part of a target surface of the workpiece mounted on table 12 in the reference state is performed with measurement system 400. After that, on the basis of this measurement result, it becomes possible to manage the position of the target surface of the workpiece in the directions of six degrees of freedom by the control on the table coordinate system (the reference coordinate system).

Figure 21:
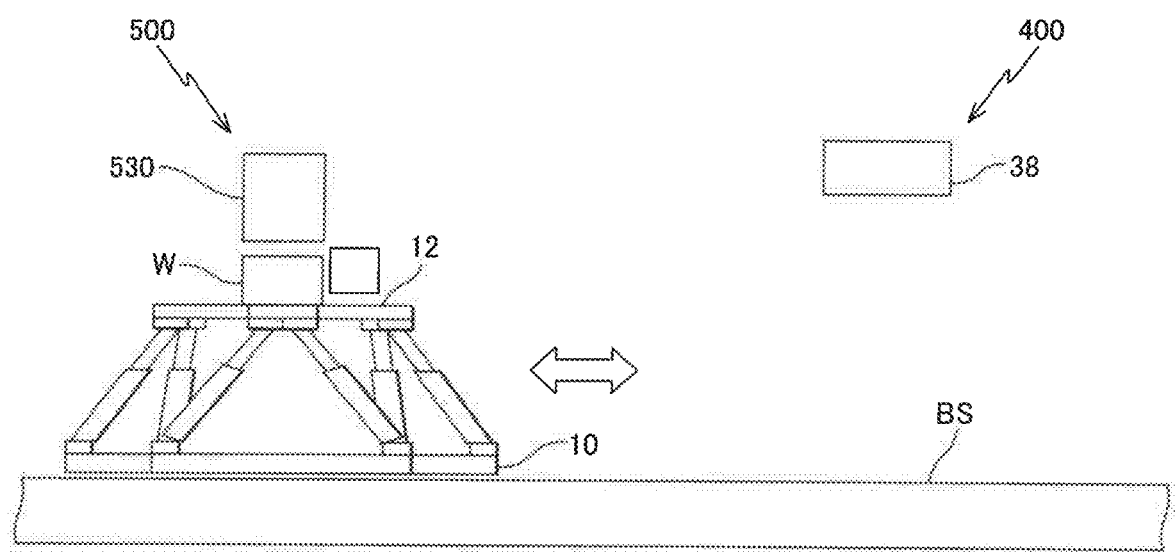
FIG. 21 is a view showing an example of movement of a table from under one of the measurement system and the beam irradiation system to under the other, in the processing apparatus related to the embodiment.

In the next Step S9, as shown in FIG. 21, slider 10 is moved above base BS and thereby table 12 mounting the workpiece, for which measurement of the position information (the shape information) of at least a part of the target surface has been completed, is moved to below beam irradiation system 500. Note that, in FIG. 21, sensor section 38 representing measurement system 400 and condensing optical system 530 representing beam irradiation system 500 are each shown.

In the subroutine of the next Step S10, processing in accordance with the recipe is performed to the workpiece on table 12. Note that, in order to simplify the description, the designation of processing in the same processing mode is assumed to be made only once for the same recipe.

Figure 16:
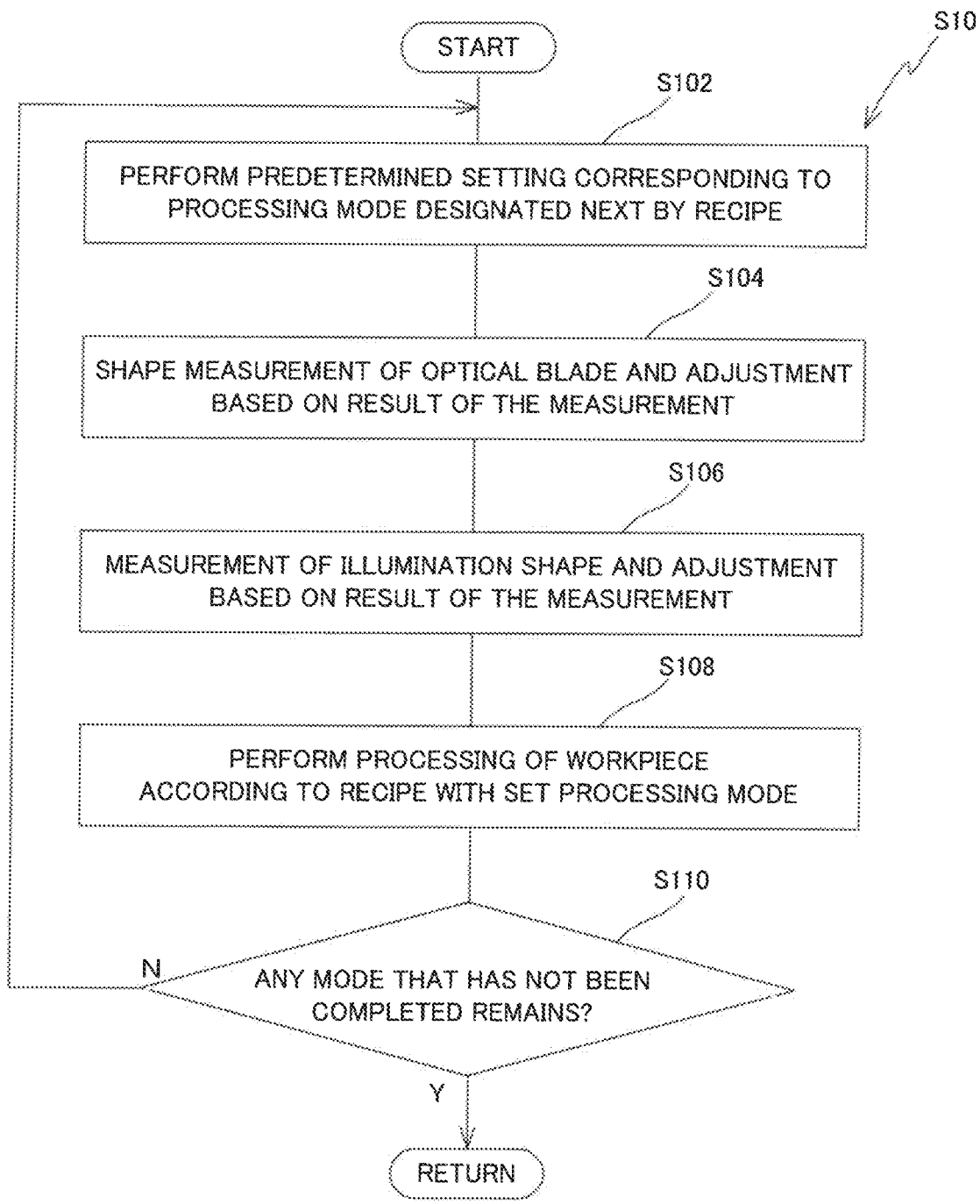
FIG. 16 is a flowchart showing an example of a subroutine of Step S10 shown in FIG. 6.
Figure 18:
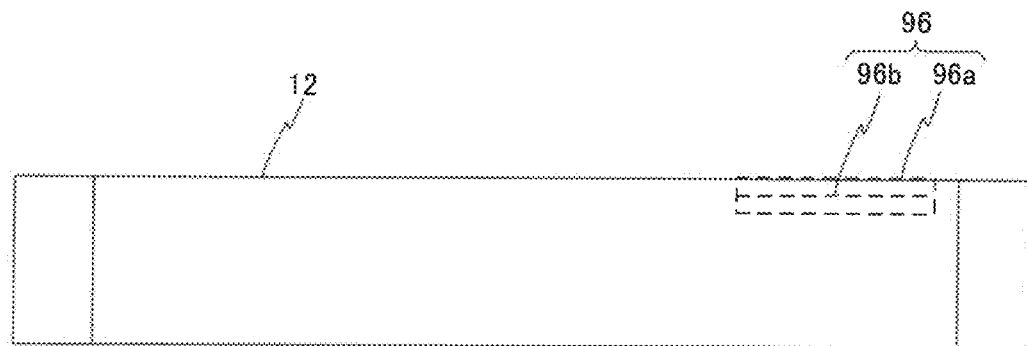
FIG. 18 is a view showing an example of the measurement device for measuring the intensity distribution of beams at a processing plane.

In the subroutine of Step S10, as shown in FIG. 16, first of all, in Step S102, predetermined settings corresponding to the processing mode designated next in the selected recipe (however, which is the processing mode designated first, at the first time), i.e., the setting of the illumination shape and the selection setting of the opening on mask M are performed. Herein, one mode of the forgoing Modes 1 to 6 is assumed to be designated. For example, in the case where Mode 1 is designated first, the normal illumination is set as the illumination shape and the opening designated in the recipe is selected. As an example, slit-shaped opening PAa is selected.

In the next Step S104, measurement of the three-dimensional intensity distribution of the beams (the shape of the optical blade) at processing plane MP and near the processing plane and the adjustment based on results of the measurement are performed in the foregoing procedures. This adjustment includes, for example, at least one of adjustment of the angle of at least a part of mirror elements of the first mirror array 80, adjustment of the angle of at least a part of mirror elements of the second mirror array 78, adjustment of condensing optical system 530 (including adjustment of the position, the inclination and the like of a part of lenses), and position adjustment of mask M (the opening). Incidentally, it is needless to say that the adjustment based on the measurement of the three-dimensional intensity distribution of the beams (the shape of the optical blade) is performed only when necessary. Further, on the basis of the measurement results in Step S104, the position of processing plane MP may be determined or a positional relationship between processing plane MP and table 12 may be determined.

In the next Step S106, the measurement of the intensity distribution of the beams at pupil plane PP2 of condensing optical system 530 (which can be said to be the measurement of the illumination shape) and the adjustment based on results of the measurement are performed. This adjustment includes, for example, at least one of adjustment of the angle of at least a part of mirror elements of the first mirror array 80 and adjustment of the angle of at least a part of mirror elements of the second mirror array 78. In this case also, it is needless to say that the adjustment based on the measurement results of the intensity distribution of the beams at pupil plane PP2 is performed only when necessary. In this manner, necessary preparation works are completed. Note that at least one of Step S104 and Step S106 may be omitted.

In the next Step S108, in order to perform processing to workpiece W, the first stage system 200A and beam irradiation system 500 are controlled, and thereby processing of the workpiece in accordance with the recipe (e.g., in the case of Mode 1, removal processing of the surface by the optical blade of Mode 1) is performed while table 12 is scanned with respect to the beams in the scanning direction. Relative movement velocity of the workpiece and the beams (in this case, the movement velocity of table 12) is controlled by controller 600. This relative movement velocity may be determined on the basis of material quality of workpiece W, the type of processing or the like. Note that the relative movement velocity may be determined in accordance with the intensity distribution (the intensity) at processing plane MP measured previously. Here, the control of the position and the attitude of the target surface (and the target portion) of the workpiece at the time of processing is performed taking into account the position information (the shape information in the present embodiment) of the target surface previously measured with measurement system 400. For example, the position information (the shape information) of target surface TAS (see FIG. 9A) of workpiece W that has been acquired with measurement system 400 is used to relatively move target portion TA (see FIG. 9A) on target surface TAS of workpiece W and the irradiation area of the beams at processing plane MP in a desired positional relationship.

In the next Step S110, the judgement is made of whether or not there remains any mode which has been designated by the recipe but processing of which has not been completed, and in the case where negative judgement is made here, i.e., there remains any mode that has not been completed, the procedure returns to Step S102, and afterwards loop processing (including the judgement) of Steps S102→S104→S106→S108→S110 is repeatedly performed until affirmative judgement is made in Step S110. Thus, processing of the workpiece in accordance with the recipe in all the processing modes designated by the recipe is sequentially performed. Then, when all the processing designated by the recipe has been completed, the affirmative judgement is made in Step S110, and the procedure returns to Step S12 of the main routine. Note that, also in the case where the negative judgement is made in Step S110, at least one of Step S104 and Step S106 after Step 102 may be omitted.

Now, a case is also conceivable where a workpiece having an inclined surface that is tilted by a predetermined angle with respect to the upper surface of table 12 (e.g. a surface parallel to the XY-plane) in a state of being placed on table 12 is employed as workpiece W and, for example, removal processing needs to be performed with the inclined surface serving as a target surface. However, processing apparatus 100 related to the present embodiment is equipped with the first stage system 200A capable of arbitrarily setting the position of table 12, on which the workpiece is mounted, in the directions of six degrees of freedom. Therefore, in such a case, controller 600 is capable of easily aligning the target surface (the inclined surface) of the workpiece with processing plane MP, by controlling the first stage system 200A on the basis of the three-dimensional shape of the workpiece measured with measurement system 400. As a matter of course, the inclined surface as described above can be easily formed on a workpiece with an arbitrary shape placed on table 12.

In Step S12, table 12 on which the processed workpiece is mounted is moved to the foregoing loading/unloading position.

In the next Step S14, the $n^{th}$ workpiece in the lot, which has been processed and is mounted on table 12, is returned to the pallet. Specifically, controller 600 identifies the position on the pallet referring to the count value n, and provides carrier system 300 with the instruction for returning the workpiece to the identified position on the pallet. In response to this instruction, carrier system 300 takes out the processed workpiece from table 12 and returns it to the identified position on the pallet.

When the processing of Step S14 is executed, the procedure proceeds to Step S16. At this point in time, any workpiece does not exist on table 12. In Step S16, the count value n of the counter is incremented by one (n←n+1).

In the next step S18, the judgement is made of whether or not the count value n exceeds N (N is the number of the workpieces in one lot, N=20 in the present embodiment). Then, in the case where negative judgement is made in Step S18, i.e., there are any workpieces to which processing has not been completed in the lot, the procedure returns to Step S6, and the processing of Step S6 to S18 (including the judgement) are repeated until affirmative judgement is made in Step S18. Thus, the foregoing series of processing (including the judgement) is performed to the second and subsequent workpieces in the lot. Then, when the processing has been completed to all the workpieces in the lot and the affirmative judgement is made in Step S18, the procedure proceeds to Step S20, the instruction is provided to the carry-out/carry-in device (not illustrated) to carry out the palette, on which the processed workpieces are mounted, to the outside of the apparatus, and then the series of processing in this routine has been completed.

Note that in the case where the processing apparatus is equipped with a plurality of tables as described above, each of the tables is used in Steps S6 to S18. For example, as shown in FIG. 20, in the case where the processing apparatus is equipped with two tables, the odd-numbered workpiece including the first workpiece is held by table 12*a*, and the even-numbered workpiece including the second workpiece is held by table 12*b*, and table 12*a* and table 12*b* are alternately used in Steps S6 to S18.

Note that, in the subroutine of Step S10 described above, the measurement of the intensity distribution of the beams at the pupil plane is to be performed after the three-dimensional intensity distribution of the beams has been measured, but this is not intended to be limiting, and the measurement of the intensity distribution of the beams at the pupil plane may be performed before the measurement of the intensity distribution of the beams at the image plane (processing plane MP) is performed. Further, the measurement of the three-dimensional intensity distribution of the beams and the measurement of the intensity distribution of the beams at the pupil plane need not be performed continuously. Further, the frequency of the measurement of the three-dimensional intensity distribution of the beams and the measurement frequency of the intensity distribution of the beams at the image plane (processing plane MP) may be different from each other.

Further, in the case where there is a risk that at least one of the intensity distribution of the beams at processing plane MP (image plane) and the three-dimensional intensity distribution of the beams is changed, as a result of the adjustment based on the measurement results of the intensity distribution of the beams at the pupil plane described above, controller 600 may again measure the intensity distribution of the beams at processing plane MP and the three-dimensional intensity distribution, and may perform adjustment based on results of such measurement.

Further, Step S104 and Step S106 described above are to be performed each time when any mode of Modes 1 to 6 is set. However, this is not intended to be limiting, and the processing in Step S104 and Step S106 may be performed only with respect to some modes of Modes 1 to 6.

Note that, in the above description, after the processing to workpiece W has been completed, table 12 on which the processed workpiece W is mounted is moved to the loading/unloading position in order to return the processed workpiece W to the pallet. However, after the processing to the workpiece has been completed, table 12 on which the processed workpiece W is mounted may be moved to below measurement system 400 and the shape of the workpiece on table 12 may be inspected with three-dimensional measuring device 401 of measurement system 400. For example, a dimensional error of the processed portion may be obtained on the basis of the measured shape information (a type of the three-dimensional position information). In this case, the pass/fail decision of the processing may be further performed by the dimensional error. Among the workpieces that have been decided to fail as a result of performing the pass/fail decision, regarding the workpiece whose dimensional error showing a positive value (the workpiece that can be corrected by removal processing and the like), the necessary correction processing may be performed by beam irradiation system 500 while such the workpiece remains placed on table 12 (remains held by chuck mechanism 13 on table 12), on the basis of the dimensional error. Alternatively, after the processing to the workpiece has been completed, table 12 on which the processed workpiece W is mounted may be moved to below measurement system 400, the shape of the workpiece on table 12 may be inspected with three-dimensional measuring device 401 of measurement system 400, and then table 12 may be moved to the loading/unloading position to return the processed workpiece to the pallet, without applying any correction processing regardless of the inspection result. In this case, result data of the shape inspection may be sent to an external device, for example, a superior device by controller 600.

Note that cleaning may be performed to the processed workpiece on table 12. For example, foreign particles generated by processing may be removed from the processed workpiece by the cleaning. For example, as a cleaning mechanism, at least one fluid supply port to supply fluid (liquid or gas) is disposed, and the fluid from the fluid supply port may be supplied to at least a part of the surface of the processed workpiece while moving the fluid supply port or table 12, or both of the fluid supply port and table 12. In the case where such the cleaning mechanism is provided, after the processed workpiece has been cleaned, the shape of the workpiece on table 12 may be inspected with three-dimensional measuring device 401 of measurement system 400 as described above.

Further, in the case where the processing apparatus is equipped with a plurality of tables as described above, in parallel with a part of processing with respect to a workpiece on one table, measurement of a processed workpiece on another table may be performed. For example, as shown in FIG. 20, in the case where the processing apparatus is equipped with two tables, in parallel with a part of processing of a workpiece W on one table (12b), measurement of a processed workpiece W on the other table (12a) may be performed.

As described in detail so far, with processing apparatus 100 related to the present embodiment and the processing method executed by processing apparatus 100, the three-dimensional intensity distribution of the beams near the image plane on the exit surface side of condensing optical system 530 can be changed by a combination of the cross-sectional intensity distribution of the beams at pupil plane PP2 of condensing optical system 530 (the cross-sectional intensity distribution at the pupil plane of illumination optical system 520 (the illumination shape)), and the intensity distribution of the beams at processing plane MP (the image plane) (the opening on mask M). That is, the shape of the optical blade described earlier can be changed. Consequently, as explained earlier about Modes 1 to 6, the processing of the workpiece with the optical blades of various shapes can be performed. Note that Modes 1 to 6 are examples, and in processing apparatus 100 a wide variety of processing modes can be set, and much more types of processing modes can be set by adding the types of openings on mask M, or adding the types of illumination shapes to be set, or the like. In this case, the foregoing adjustment based on the measurement results may be performed to one selected opening as a representative or with respect to each opening, in each mode.

In FIG. 17, the contents of various types of processing that can be performed in processing apparatus 100 are shown, being made correspondent to conventional machine tools that have been used to perform each type of the processing.

As the types of processing which processing apparatus 100 is capable of dealing with, three major types of processing, i.e., removal processing, heat treatment and measurement can be cited. Of these types, processing apparatus 100 has a main role in the removal processing in which the shape of a workpiece is changed by the processing, and conventionally this removal processing can be classified into plane cutting, plane grinding, cylindrical cutting, cylindrical grinding, drilling cutting, drilling grinding, plane polishing, cutting-off, printing/engraving of characters or patterns, transfer in free form by metal mold, generation of fine shapes, and the like, and for the respective types of processing, the machine tools described in the column for □conventional machine tool□ in FIG. 17 have been used so far.

In this manner, as the removal processing with respect to a processing target, various kinds of processing such as surface processing (such as grinding and cutting), groove processing (such as cutting at the time of groove formation and surface grinding after the formation), cutting-off of an arbitrary shape, and formation of fine processing patterns can be handled by one processing apparatus 100 related to the present embodiment. Further, in the case of processing of holes, cylinders and grooves, processing apparatus 100 is capable of executing each processing with high accuracy, though applicable depth might be restricted. In particular, regarding patterning of fine patterns such as biochip channels and microreactors, the processing that can be regarded on another level, different from the conventional machine tools, can be performed in all of the thinness of formable linewidths, position accuracy, and degree of freedom of formable pattern shapes. Further, generation of fine shapes that has been conventionally performed with a low-end exposure apparatus or the like can be achieved by direct processing with respect to a workpiece for which development, etching, layer division and the like are unnecessary. Further, three-dimensional shapes can also be handled. In addition, processing apparatus 100 is also capable of dealing with surface modification treatment such as quenching treatment and three-dimensional shape inspection of objects.

Note that processing apparatus 100 may be adaptable also to joining processing such as welding with the beams from condensing optical system 530, and may perform additional processing (three-dimensional shaping processing) with the beams from condensing optical system 530, though they are not described in FIG. 17. In this case, processing apparatus 100 may be equipped with a device that supplies a material to perform the joining processing or the additional processing to the vicinity of the image plane. In the case where the additional processing can be performed, the additional processing may be executed onto the surface of a workpiece after the removal processing, or the removal processing (processing to remove at least a part of the added portion) may be performed to the surface of a workpiece after the additional processing. Also in the case of performing the joining processing or the additional processing, an optimum combination of the intensity distribution of the beams at the pupil plane and the intensity distribution of the beams at the image plane (the opening of the mask) should be set.

Further, the material of the workpiece to be processed by processing apparatus 100 may be metal or resin.

Further, with processing apparatus 100 related to the present embodiment, a reaction force caused by processing is virtually nonexistent, and therefore the workpiece needs not be firmly fixed onto table 12, which is different from machine tools such as a machining center in which the fixed state of a workpiece directly affects processing accuracy and finished state. Further, processing apparatus 100 is equipped with measurement system 400, and therefore, even if the workpiece is somewhat roughly mounted on table 12 by carrier system 300, such rough mounting does not cause problems because the position of the workpiece with respect to the coordinate system is newly identified later by measurement system 400. Since this three-dimensional shape measurement (one aspect of three-dimensional alignment) by measurement system 400 is performed, a series of operations by carrier system 300 including loading of the workpiece onto table 12 and unloading of the processed workpiece from table 12 can be automated, which enables efficient production.

Further, with processing apparatus 100 related to the present embodiment and the processing method executed by processing apparatus 100, the position control of a workpiece (table 12) with respect to the beams is performed on the basis of a target position during the processing of the workpiece. However, in order to prevent as much as possible a positional error with respect to the target position caused by the control responsiveness, the control accuracy and the like of table 12, follow-up control of mask M (mask stage 15) with respect to workpiece W may be performed in at least one direction in the X-axis, the Y-axis and the Z-axis, on the basis of position information of table 12 and measurement information of mask stage position measurement system 19. By this follow-up control, a relative positional relationship between the target portion of workpiece W and the irradiation area of the beams via the opening of mask M can be correctly controlled. Accordingly, the submicron or finer processing can be achieved even if, for example, the position control accuracy of table 12 is at around micron order or less.

Further, with processing apparatus 100 related to the present embodiment, light source system 510 which beam irradiation system 500 is equipped with synthesizes a plurality of laser beams respectively output from the plurality of laser units 70 to be a parallel beam with a large diameter, and emits the parallel beam toward illumination optical system 520. Accordingly, it becomes possible to improve the total power without damaging each component such as a lens.

Further, with processing apparatus 100 related to the present embodiment, during processing, an illumination field in which the beams (the illumination light) are irradiated on a partial area on mask M including the selected pattern (the irradiation area of the illumination light) is formed (set) with the first mirror array 80, the entire beam emitted from light source system 510 is focused and irradiated on the selected pattern part, and thereby the loss of laser power is reduced as much as possible. Then, the beams transmitted through the selected opening of mask M are irradiated on the workpiece via condensing optical system 530 composed of the reduction projection lens with a large N.A. Consequently, on the target surface of the workpiece, a field size can be increased to around 1 mm while keeping the high energy density, and a range that can be processed within a unit time can be drastically enlarged, compared with the conventional laser processing apparatus employing a spot beam with a diameter of around 10 μm. Further, by employing the pulsed laser with a short wavelength, the beam with a small spot size and a high energy density can be generated on the target surface, and thereby the high absorptance with respect to metal can be secured.

Further, with processing apparatus 100 related to the present embodiment, it is not necessary to provide a firm chuck having resistance to the reaction force on table 12. Further, since the shape of a workpiece can be measured by measurement system 400 and the position of the workpiece can be controlled on the basis of the measurement results in a state where the workpiece is placed on table 12, a jig for finding the position of the workpiece, a jig exclusive for setup, and the like are not necessary. Further, in processing apparatus 100, controller 600 automatically creates recipes from CAD date of workpieces before and after processing, and therefore, an engineer does not need to perform programming for creating the recipes by CAD on the basis of drawings. Further, on processing, since an operator only has to instruct the selection of the recipes that have been already created, the operator does not need to instruct the trajectory of tools by manual input in front of the apparatus.

With processing apparatus 100 related to the present embodiment and the processing method executed by processing apparatus 100, in a state where a workpiece to which processing has been applied is not detached from table 12 but remains mounted on table 12, the three-dimensional shape of the target surface of the workpiece can be measured by measurement system 400, and on the basis of the measurement result, for example, the pass/fail (OK/NG) of the shape after the processing can be decided. Then, in the case where the failure decision is made, correction processing can also be performed with beam irradiation system 500 while the workpiece remains mounted on table 12, which is extremely efficient.

Further, in the process of mass-producing components, manufacturing components and performing dimensional inspection at the site are extremely convenient from the viewpoint of controlling the quality. This is because the accuracy of the apparatus inevitably comes with drift due to various factors. Performing the inspection at the site enables controller 600 to sense tendency of the drift, and on the basis of the results thereof, and to perform feedback with respect to processing accuracy. That is, controller 600 is capable of obtaining the tendency of drift of the apparatus in processing on the basis of the position information (the shape information) of the target surface of the workpiece acquired with measurement system 400, and adjusting at least one of measurement system 400, beam irradiation system 500 and the first stage system 200A in accordance with the obtained results, and thereby suppressing variation in dimension and improving the yield and the uneven quality.

Note that, not limited to the case of obtaining the tendency of drift of the apparatus in the processing, controller 600 may adjust at least one of measurement system 400, beam irradiation system 500 and the first stage system 200A, on the basis of the position information (the shape information) of the target surface of a workpiece acquired with measurement system 400. The workpiece in this case includes both of a workpiece to which the processing has been applied and a workpiece to which the correction processing has been applied. The adjustment of the beam irradiation system includes also adjustment of the intensity distribution of the beams at processing plane MP.

Note that the case has been described so far where a plurality of beams are made to enter condensing optical system 530 via mask M, and the plurality of beams are condensed on the image plane (processing plane MP) by condensing optical system 530 (the image of the opening of mask M is formed on the image plane (processing plane MP)). However, processing apparatus 100 does not necessarily have to use mask M.

This is because, as a method of setting or changing the intensity distribution of the beams at processing plane MP (e.g., a method of forming a slit-shaped illumination area as described above on processing plane MP), a condensed position or a condensed area of the beams at t an object surface of condensing optical system 530 can be controlled by, for example, the first mirror array 80.

Further, as the condensing optical system, a configuration in which the pupil plane (the entrance pupil) and the front side focal plane coincide with each other, or a configuration in which the pupil plane (the entrance pupil) and the front side focal plane are located near may be employed. In this case also, a condensed position of each of the plurality of parallel beams at a rear side focal plane can accurately and conveniently be controlled by changing the incidence angles of the plurality of parallel beams incident on the condensing optical system, using, for example, the first mirror array 80 but without using the mask (the opening). In the case of employing a condensing optical system thus configured, the rear side focal plane of the condensing optical system can serve as processing plane MP. In the case of employing the condensing optical system of this type as well, the intensity distribution of the beams on at least one of the rear side focal plane (processing plane MP), a plane near the rear side focal plane, the pupil plane and a plane near the pupil plane can be measured with measurement device 110 described above.

Further, in the present embodiment, for example, a slit-shaped or spot-shaped irradiation area is formed only by the beams that pass through the same condensing optical system 530. Therefore, a beam spot can be formed with high quality, compared to the case where the beams via separate optical systems are condensed in the same area to form a beam spot (a laser spot).

Further, in the present embodiment, since controller 600 detects the state of each mirror element (herein, the inclined angle of the reflection surface) with the foregoing rotary encoders and thus monitors in real-time the state of each mirror element, the inclined angle of the reflection surface of each mirror element of mirror arrays 78 and 80 can be accurately controlled.

In processing apparatus 100 related to the present embodiment, controller 600 is capable of measuring, at an appropriate frequency, the three-dimensional intensity distribution of the beams, the intensity distribution of the beams in processing plane MP, and the like, with measurement device 110 in the manner described earlier, and is capable of performing necessary calibration. For example, controller 600 is capable of adjusting the three-dimensional intensity distribution of the beams, the intensity distribution of the beams in processing plane MP, and the like, on the basis of results of the measurement by measurement device 110.

Further, controller 600 may perform at least one of measurement of the intensity distribution of the beams in processing plane MP and measurement of the intensity distribution of the beams in a plane different from processing plane MP, with measurement device 110, for example, prior to processing with respect to a workpiece, and on the basis of the measurement results, may perform adjustment of at least one of beam irradiation system 500 and the first stage system 200A during the processing. The plane different from processing plane MP (the image plane) includes a plane near processing plane MP (the image plane), or the pupil plane (PP2).

As the adjustment (control) of the first stage system 200A in this case, position control of table 12 can be representatively cited.

Further, the contents of the adjustment (control) of beam irradiation system 500 include all of various types of control contents of the beam irradiation system that have been described earlier as methods of setting or changing the intensity distribution of the beams at the processing plane, for example, the shape, the size, the position and the like of the irradiation area of the beams formed on the processing plane.

Further, for example, in the case where the measurement of the intensity distribution of the beams at processing plane MP cannot be performed in one time by receiver 96 in a state where table 12 is static, i.e. such as, for example, the case where the arrangement range of the irradiation area of the beams at processing plane MP is wide, in particular, when mask M is not used, the measurement of the intensity distribution of the beams at processing plane MP is performed while table 12 (opening 92a of measurement member 92) is moved in at least one direction of the X-axis direction and Y-axis direction within the XY-plane.

Note that, in processing apparatus 100 related to the present embodiment, table 12 is provided with all constituent parts of measurement device 110. However, this is not intended to be limiting, and the constituent parts of measurement device 110 other than measurement member 92 may be provided external to table 12 as far as an optically conjugate relationship between the light-receiving surface of CCD 96a and the formation surface of opening 92a of measurement member 92 functioning as a light-receiving section is maintained.

Further, a movable member on which a sensor device similar to measurement device 110 described above is mounted and which is movable independently from table 12 may be provided separately from table 12. In this case, a configuration may be employed in which the movable member only has to be movable in three-axial directions of the X-axis, the Y-axis and the Z-axis and controller 600 is capable of controlling (managing) the positions of the movable member and the sensor on the table coordinate system. Controller 600 is capable of performing the foregoing measurement of the intensity distribution of the beams by the sensor device. In this case also, controller 600 may perform the adjustment of at least one of beam irradiation system 500 and the first stage system 200A described above during the processing, on the basis of the intensity distribution of the beams measured with the sensor device. Besides, in parallel with measuring a workpiece on table 12 with measurement system 400, controller 600 is capable of performing the foregoing measurement of the intensity distribution of the beams with the sensor device, and the like.

Note that, as understandable from the description so far, measurement device 110 can also be used as an unevenness sensor to detect the unevenness of the intensity (the intensity distribution) of the beams inside the irradiation area.

Further, aberration in condensing optical system 530, for example, wavefront aberration may be measured with measurement device 110. For example, a micro-lens array, in which a plurality of micro-lenses are disposed in a matrix shape that make the formation surface of opening 92a and the light-receiving surface of CCD 96a optically conjugate with each other, may be disposed in a vacant area of rotation plate 101 as shown in FIG. 12, for example, an area within a circle indicated by a virtual line (a two-dot chain line) in FIG. 12. In this case, a wavefront aberration measurement gauge of Shack-Hartman method can also be configured, which is capable of measuring the wavefront aberration of condensing optical system 530, by rotating rotation plate 101, positioning the micro-lens array in the optical path of parallel beams emitted from the first optical system 94, selecting the pinhole pattern of mask M, and condensing the beams on the pinhole pattern via the second section illumination optical system 82. In the case of employing a configuration capable of performing wavefront aberration measurement, even if the position of the image plane of condensing optical system 530 is changed, the changed position of the image plane of condensing optical system 530 can be measured from results of the wavefront aberration measurement, and on the basis thereof, the position of processing plane MP can be changed or the position of the upper surface of measurement member 92 on the measurement processing by measurement device 110 can be adjusted. Further, in the case of employing a configuration capable of performing the wavefront aberration measurement, such a configuration may also be capable of adjusting the optical properties of condensing optical system 530. For example, condensing optical system 530 is configured of a plurality of lenses, and a part of the plurality of lenses may be configured movable in an optical axis AX direction and an inclined direction (a tilt direction) with respect to a plane orthogonal to optical axis AX, by a drive element such as a piezoelectric element. In such a case, the optical properties of condensing optical system 530 can be adjusted by moving the movable lens (es) in at least one direction of the optical axis AX direction and the tilt direction.

Besides, instead of measurement device 110 described above, as shown in FIG. 18, light receiver 96 described earlier may be disposed on the upper surface of table 12 so that the light-receiving surface of CCD 96a is flush (coplanar) with the other sections of table 12 or conjugate with the other sections of table 12. Then, for example, the intensity distribution and the like of the beams at processing plane MP may be measured with this light receiver 96. In this case also, by enabling not only the measurement in a state where table 12 is stopped but also scan measurement of measuring the intensity distribution of the beams while table 12 is being moved, the influence of limited number of pixels of CCD or mirror arrays can be eliminated and the correct measurement results can be obtained. The intensity distribution of the beams is thus measured with a sensor that receives beams from condensing optical system 530, and thereby the management of the intensity distribution of the beams in which variation factors such as thermal aberration of condensing optical system 530 and the like are also taken into consideration can be performed. Further, by performing the adjustment based on the results thereof, the intensity distribution of the beams at processing plane MP (such as the image plane) of condensing optical system 530 can accurately be set into a desired state. Further, as measurement device 110, an aerial image measurement device of slit-scanning type disclosed in, for example, U.S. Patent Application Publication No. 2002/0041377 may be employed.

As described so far, processing apparatus 100 related to the present embodiment has more convenience and provides solutions that meet the demands of the manufacturing sites (processing sites) of actual components and the like compared with machine tools using conventional tools, which is the distinct feature of processing apparatus 100.

Note that, although the case has been described, as an example in the embodiment described above, where a constant quantity collected on a pallet is regarded as one lot and workpieces are processed in a lot unit, this is not intended to be limiting, and workpieces may be processed one by one. In this case, carrier system 300 loads a workpiece before processing received from an external carrier system onto table 12, and unloads from the table a workpiece having undergone processing and delivers it to the external carrier system.

Note that, although in the embodiment described above the case has been described where a transmissive mask having a plurality of openings is employed as mask M, a reflective mask may be employed instead.

Although, in the embodiment described above, mask M is moved by mask stage 15 so that the beams from illumination optical system 520 are irradiated on at least one of a plurality of openings on mask M, the beams may be controlled, by the first mirror array 80, to be irradiated on at least one of the plurality of openings on mask M. At this time, the position of mask M may be fixed or may be movable. In this case, the size and the shape of the irradiation area of the beams at the image plane (processing plane MP) of condensing optical system 530 can be changed by changing the openings used for processing, and therefore the first mirror array 80 may be regarded as a part of a mechanism to change the intensity distribution of the beams at the image plane (processing plane MP) of condensing optical system 530.

Further, in the case of using a plurality of openings on mask M (e.g., in the case of forming irradiation areas of a plurality of beams on the image plane (processing plane MP), in other words, in the case of forming images of a plurality of openings on the image plane (processing plane MP)), the beams may be irradiated only on a partial area including the plurality of openings. In this case, the beams may be irradiated on a plurality of areas spaced apart from each other on mask M.

Note that, in the embodiment described above, as light source unit 60, a light source that generates beams having wavelengths of a visible region to an infrared region is employed, but instead thereof, an ultraviolet light source such as excimer laser that generates beams having wavelengths of an ultraviolet region, or an X-ray light source that generates beams having wavelengths of an extreme ultraviolet region, or the like may be employed.

Note that, in the embodiment described above, the case has been described where the first mirror array 80 and the second mirror array 78 are employed as spatial light modulators, but instead thereof, a digital mirror device with a large square measure, which is composed of many digital micromirror devices (Digital Micromirror Device: DMD (registered trademark)) manufactured with MEMS technique and disposed in a matrix shape, may be employed. In such a case, it will be difficult to measure the state (e.g. the tilt angle) of each mirror element with encoders or the like. In such a case, a detection system may be employed that irradiates the surface of the digital mirror device having a large square measure with detection light, receives reflection light from many mirror elements configuring the digital mirror device, and on the basis of the intensity distribution of the reflection light, detects the state of each mirror element. In this case, the detection system may be configured to detect the state of each of the many mirror elements on the basis of image information obtained by capturing images formed by the digital mirror device, with an imaging means. Further, instead of the first mirror array 80 and the second mirror array 78, an adaptive mirror capable of positively changing the surface shape of the reflection surface may be employed, or a transmissive optical member capable of locally and positively changing the refractive index may be employed.

Although, in the embodiment described above, the case has been described where the first mirror array 80 is disposed at a pupil position of illumination optical system 520 or near the pupil position, the first mirror array 80 may be disposed at a position conjugate with a plane to be irradiated (a plane where mask M is placed) of the illumination optical system or near the position. Although, in the embodiment described above, the second mirror array 78 is disposed at the position conjugate with the plane to be irradiated (the plane where mask M is placed) of the illumination optical system or near the position, the second mirror array may be disposed at the pupil position of the illumination optical system or near the pupil position.

Note that, although in the embodiment described above the case has been described where the optical path is bent by 90 degrees by the first mirror array 80 and the second mirror array 78, the bent angle of the optical path by the first mirror array 80 and the second mirror array 78 is not limited to 90 degrees, and may be an arbitrary angle such as, for example, an angle from 110 to 175 degrees (the incident light and the emitting light form an acute angle of 5 to 80 degrees), or an angle from 5 to 80 degrees (the incident light and the emitting light form an obtuse angle of 120 to 175 degrees).

Note that, in the embodiment described above, a detector to detect the intensity of the beams from light source unit 60 may be provided. For example, a part of the beams on an upstream side of condensing optical system 530 may be branched and the branched beams not entering condensing optical system 530 may be received by the detector. For example, the intensity (the energy) of the beams entering condensing optical system 530 can be obtained from the output of this detector, and therefore, the condensed position in the Z-axis direction of the beams traveling toward processing plane MP (the position of the image plane in the Z-axis direction) may be estimated on the basis of the output from the detector. Then, condensing optical system 530 may be controlled on the basis of the estimation results, so that the condensed position (the position of the image plane in the Z-axis direction) described above is at a desired position.

Note that, in processing apparatus 100 related to the embodiment described above, a detection system 89 indicated by a virtual line in FIG. 14 may be used, for example, together with a rotary encoder $83_{p,q}$. As detection system 89, a detection system can be employed that irradiates the surface of the first mirror array 80 with detection light, receives reflected light from many mirror elements $81_{p,q}$ configuring the first mirror array 80, and on the basis of the intensity distribution thereof, detects the state of each mirror element $81_{p,q}$. As the detection system, a system having a configuration similar to that disclosed in, for example, U.S. Pat. No. 8,456,624 can be employed. Detection system 89 may be used together with rotary encoder $83_{i,j}$.

In the embodiment described above, the case has been exemplified where mirror arrays 78 and 80 of a type in which the inclined angle of the reflection surface of each mirror element $81_{i,j}$ or $81_{p,q}$ can be changed with respect to the reference surface, but this is not intended to be limiting and a mirror array having a structure in which each mirror element is inclinable with respect to a reference surface and also displaceable in a direction orthogonal to the reference surface may be employed. Further, each mirror element does not necessarily have to be inclinable with respect to the reference surface. The mirror array that is displaceable in the direction orthogonal to the reference surface as mentioned above is disclosed in, for example, U.S. Pat. No. 8,456,624. Besides, a mirror array of a type in which each mirror element is rotatable around two axes that are parallel to a reference surface and orthogonal to each other (i.e., the inclined angles in the two orthogonal directions can be changed) may be employed. The mirror array in which the inclined angles in the two orthogonal directions can be changed as mentioned above is disclosed in, for example, U.S. Pat. No. 6,737,662. In these cases also, the state of each mirror element can be detected with the detection system as disclosed in U.S. Pat. No. 8,456,624 referred to above.

Note that a detection system to irradiate the surface of mirror array 78 or 80 with detection light, and receive reflected light from many mirror elements $81_{i,j}$ or $81_{p,q}$ respectively configuring mirror array 78 or 80 may be employed. Alternatively, as a detection system, a sensor to individually detect an inclined angle and a spacing of each mirror element with respect to a reference surface (a base) may be provided at the mirror array (the optical device).

Note that the incidence angles and the like of all of the plurality of beams incident on condensing optical system 530 need not be controllable (changeable). Accordingly, in the cases such as where a mirror array is employed similarly to the embodiment described above, the states of reflection surfaces of all mirror elements (at least one of the positions and the inclined angles of the reflection surfaces) need not be changeable. Alternatively, a mirror array may be configured so that the states of reflection surfaces of a plurality of mirror elements can be changed individually or can be changed for each group. The former case includes the case where controller 600 changes the states of the reflection surfaces of the mirror arrays for each group.

Further, instead of the mirror arrays in the embodiment described above, a spatial light modulator (a non-emitting type image display element) to be described below may be employed. As a transmissive spatial light modulator, in addition to a transmissive liquid crystal display element (LCD: Liquid Crystal Display), an electrochromic display (ECD) and the like are given as examples. Further, as a reflective spatial light modulator, in addition to the micromirror arrays described above, a reflective liquid crystal display element, an electrophoresis display (EPD: Electro Phonetic Display), an electronic paper (or an electronic ink), an optically diffractive light valve (Grating Light Valve), a diffraction optical element (Diffractive Optical Element) and the like are given as examples.

Incidentally, it is needless to say that the cross-sectional intensity distribution of the beams may be an intensity distribution with two values, or may be an intensity distribution with multiple values being not less than three values, in the embodiment described above. Further, the intensity distribution of the beams, the cross-sectional shape of the beams (e.g. the illumination shape) and the like may be defined by a range having the intensity effective for processing of workpieces in that cross-section.

Furthermore, in the embodiment described above, the case has been described where the illuminance distribution of the beams irradiated to the opening on mask M is a uniform distribution, but the illuminance distribution of the beams irradiated to the opening on mask M may be an ununiform distribution.

Although it is desirable that condensing optical system 530 has a large diameter as described above, a condensing optical system with a numerical aperture N.A. less than 0.5 may be employed. Further, liquid immersion processing in which a space between condensing optical system 530 and a workpiece serving as an object to be processed is filled with liquid may be performed. In this case, the numerical aperture N.A. of the condensing optical system may be higher than 1.0. Further, an atmosphere between condensing optical system 530 and the workpiece may be vacuum.

Furthermore, in the embodiment described above, the aberration of condensing optical system 530 may be in a state where a predetermined aberration quantity remains, instead of completely reducing the aberration to zero.

Note that, in the embodiment described above, the case has been described as an example where controller 600 controls the respective constituents of the first stage system 200A, the second sage system 200B, carrier system 300, measurement system 400 and beam irradiation system 500. However, this is not intended to be limiting, and a controller of a processing system may be configured of a plurality of hardware each including a processor such as a microprocessor. In this case, each of the first stage system 200A, the second sage system 200B, carrier system 300, measurement system 400 and beam irradiation system 500 may be equipped with the processor, or a combination of a first processor to control at least two systems of the first stage system 200A, the second sage system 200B, carrier system 300, measurement system 400 and beam irradiation system 500, and a second processor to control the remaining systems may be employed, or alternatively another combination of a first processor to control three systems of the five systems described above, and a second processor and a third processor to individually control the two remaining systems may be employed. In any one of these cases, each of the processors will be responsible for apart of the functions of controller 600 described above. Alternatively, the controller of the processing system may be configured of processors such as a plurality of microprocessors and a host computer to perform the overall management of these processors.

Note that processing apparatus 100 needs not be equipped with measurement system 400.

Further, in each of the embodiments described above, on processing, gas may be supplied to parts irradiated with laser beams on a workpiece. The gas may be air, may be oxygen or may be nitrogen.

A plurality of constituent components of the embodiment described above may be combined as needed. Accordingly, a part of the plurality of constituent components described above need not be employed.

While the above-described embodiment of the present invention is the presently preferred embodiment thereof, those skilled in the art of shaping systems will readily recognize that numerous additions, modifications, and substitutions may be made to the above-described embodiment without departing from the spirit and scope thereof. It is intended that all such modifications, additions, and substitutions fall within the scope of the present invention, which is best defined by the claims appended below.

What is claimed is:

1. A processing apparatus to process a workpiece by irradiating the workpiece with a beam, the apparatus comprising:
    a first holding system that has a first holding member on which the workpiece is placed, and moves the workpiece held by the first holding member;
    a beam irradiation system including a condensing optical system to emit the beam; and
    a controller, wherein
    processing is performed to a target portion of the workpiece while the first holding member and a beam from the condensing optical system are relatively moved, and
    at least one of an intensity distribution of the beam at a first plane on an exit surface side of the condensing optical system and an intensity distribution of the beam at a second plane can be changed, the second plane being different from the first plane in position in a direction of an optical axis of the condensing optical system,
    the beam irradiation system has an optical device that is capable of changing a cross-sectional intensity distribution of a beam at a pupil plane of the condensing optical system,
    the intensity distribution of the beam at the second plane can be changed by the optical device changing the cross-sectional intensity distribution of the beam at the pupil plane of the condensing optical system, and
    the change of the cross-sectional intensity distribution of the beam at the pupil plane by the optical device includes at least one of change of a cross-sectional shape of the beam at the pupil plane and change of a position of the beam at the pupil plane.

2. The processing apparatus according to claim 1, wherein the change of the intensity distribution includes a change from a first state to a second state, the second state being different from the first state in at least one of the intensity distribution of the beam at the first plane and the intensity distribution of the beam at the second plane.

3. The processing apparatus according to claim 2, wherein the intensity distribution of the beam at the first plane in the first state is different from the intensity distribution of the beam at the first plane in the second state.

4. The processing apparatus according to claim 2, wherein the intensity distribution of the beam at the first plane in the first state is the same as the intensity distribution of the beam at the first plane in the second state, and
    the intensity distribution of the beam at the first plane in the first state is different from the intensity distribution of the beam at the second plane in the second state.

5. The processing apparatus according to claim 1, wherein the first plane and the second plane are perpendicular to the optical axis.

6. The processing apparatus according to claim 1, wherein plural types of laser processing can be performed, and
    a first laser processing performed in the first state and a second laser processing performed in the second state are of the same type.

7. The processing apparatus according to claim 1, wherein a first laser processing performed in the first state and a second laser processing performed in the second state are of different types.

8. The processing apparatus according to claim 7, wherein after the first laser processing performed in the first state is applied to the workpiece, the second laser processing performed in the second state is applied to the workpiece.

9. The processing apparatus according to claim 1, wherein the first holding system is capable of moving the workpiece in at least directions of three degrees of freedom that include a first direction and a second direction intersecting each other within a predetermined plane and a third direction orthogonal to the predetermined plane.

10. The processing apparatus according to claim 9, wherein
    the first holding system has a drive system to move the first holding member, and a first measurement device capable of measuring position information of the first holding member in at least the directions of three degrees of freedom.

11. The processing apparatus according to claim 1, wherein
    the change of the intensity distribution at the first plane involves change of at least one of a position of an irradiation area of the beam at the first plane, a size of the irradiation area at the first plane, and a shape of the irradiation area at the first plane.

12. The processing apparatus according to claim 1, wherein
    the change of the intensity distribution at the second plane involves change of at least one of a position of an irradiation area of the beam at the second plane, a size of the irradiation area at the second plane, and a shape of the irradiation area at the second plane.

13. The processing apparatus according to claim 1, wherein
    the optical device changes the cross-sectional intensity distribution at the pupil plane by changing a cross-sectional intensity distribution of a beam at a plane conjugate with the pupil plane.

14. The processing apparatus according to claim 1, wherein
    the optical device changes the cross-sectional shape at the pupil plane by changing a cross-sectional shape of a beam at a plane conjugate with the pupil plane.

15. The processing apparatus according to claim 1, wherein
in an area that defines the cross-sectional shape at the pupil plane, the beam has an intensity enabling processing by irradiation of the beam on the workpiece.

16. The processing apparatus according to claim 1, wherein
the optical device is capable of setting a cross-sectional shape that is one-fold rotationally symmetric with respect to a center of the pupil plane.

17. The processing apparatus according to claim 1, wherein
the cross-sectional shape is defined in one of two areas divided by a first virtual axis line that passes through a center of the pupil plane at the pupil plane.

18. The processing apparatus according to claim 17, wherein
the cross-sectional shape is defined in one quadrant of four quadrants defined by the first virtual axis line and a second virtual axis line that passes through the center of the pupil plane at the pupil plane and is orthogonal to the first virtual axis line.

19. The processing apparatus according to claim 1, wherein
a part of an edge of the cross-sectional shape coincides with at least a part of a first virtual axis line that passes through a center of the pupil plane at the pupil plane.

20. The processing apparatus according to claim 19, wherein
another part of the edge of the cross-sectional shape coincides with at least a part of a second virtual axis line that passes through the center of the pupil plane at the pupil plane and is orthogonal to the first virtual axis line.

21. The processing apparatus according to claim 1, wherein
at least a part of an edge that defines the cross-sectional shape at the pupil plane is a linear edge.

22. The processing apparatus according to claim 21, wherein
the linear edge coincides with at least a part of a first virtual axis line that passes through a center of the pupil plane at the pupil plane.

23. The processing apparatus according to claim 22, wherein
the linear edge coincides with at least a part of a second virtual axis line that passes through the center of the pupil plane at the pupil plane and is orthogonal to the first virtual axis line.

24. The processing apparatus according to claim 1, wherein
as the cross-sectional shape, at least one of a circular shape, a half-circular shape and a quarter-circular shape can be set by the optical device.

25. The processing apparatus according to claim 1, wherein
a cross-sectional intensity distribution at the pupil plane is set by the optical device so that only a beam that has passed through one of two areas divided by a first virtual axis line is irradiated on the first plane, the first virtual axis line passing through a center of the pupil plane at the pupil plane.

26. The processing apparatus according to claim 25, wherein
a cross-sectional intensity distribution at the pupil plane is set by the optical device so that only a beam that has passed through one quadrant of four quadrants defined by the first virtual axis line and a second virtual axis line is irradiated on the first plane, the second virtual axis line passing through the center of the pupil plane at the pupil plane and being orthogonal to the first virtual axis line.

27. The processing apparatus according to claim 17, wherein
the target portion is processed while the workpiece and the beam are relatively moved in a scanning direction orthogonal to an optical axis of the condensing optical system, and
the first virtual axis line corresponds to the scanning direction or a non-scanning direction that is orthogonal to the optical axis and the scanning direction.

28. The processing apparatus according to claim 1, wherein
the optical device has a spatial light modulator.

29. The processing apparatus according to claim 1, wherein
the intensity distribution at the pupil plane is set based on a type of the processing.

30. The processing apparatus according to claim 1, wherein
the beam irradiation system has an illuminance uniformizing optical system, and
a beam emitted from the illuminance uniformizing optical system is incident on the optical device.

31. The processing apparatus according to claim 30, wherein
the illuminance uniformizing optical system mixes and uniformizes a plurality of beams respectively emitted from a plurality of light source units.

32. The processing apparatus according to claim 1, wherein
the beam irradiation system has a spatial light modulator, and changes the intensity distribution with the spatial light modulator.

33. The processing apparatus according to claim 1, wherein
the first plane is a rear side focal plane of the condensing optical system.

34. The processing apparatus according to claim 1, wherein
the first plane is an image plane of the condensing optical system.

35. The processing apparatus according to claim 34, wherein
in the beam irradiation system, a beam incident on the condensing optical system includes a beam that has passed through an opening disposed on an incidence surface side of the condensing optical system, and
the intensity distribution at the first plane can be changed by changing at least one of a size, a shape and an orientation of the opening.

36. The processing apparatus according to claim 35, wherein
the opening defines an intensity distribution, at a plane conjugate with the first plane with respect to the condensing optical system, of a beam incident on the condensing optical system.

37. The processing apparatus according to claim 35, further comprising:
a second holding system that has a second holding member to hold an opening member at which the opening is formed.

38. The processing apparatus according to claim 37, wherein
the second holding system is capable of moving the opening member.
39. The processing apparatus according to claim 37, wherein
the second holding system has a drive system to move the second holing member, and a second measurement device capable of measuring position information of the second holding member.
40. The processing apparatus according to claim 35, wherein
the controller moves at least one of the first holding member and the second holding member so that an irradiation area of the beam in the first plane coincides with the target portion of the workpiece.
41. The processing apparatus according to claim 35, wherein
the change of the intensity distribution includes changing a first opening to a second opening, the first opening and the second opening being disposed on the incidence surface side of the condensing optical system, and
the first opening and the second opening are different from each other in at least one of a size, a shape and an orientation.
42. The processing apparatus according to claim 41, wherein
the first opening and the second opening are slit-shaped openings, and
the first opening is different from the second opening in at least one of a length and an orientation.
43. The processing apparatus according to claim 41, wherein
the first opening and the second opening extend in directions orthogonal to each other.
44. The processing apparatus according to claim 41, wherein
at least one of the first opening and the second opening is a pinhole-shaped opening.
45. The processing apparatus according to claim 35, wherein
the beam irradiation system has a spatial light modulator, and
the controller changes, in accordance with the opening, at least one of a position, a size and a shape of an irradiation area of a beam to be incident on a surface where the opening is disposed, using the spatial light modulator.
46. The processing apparatus according to claim 45, wherein
the spatial light modulator has a plurality of mirrors,
each of the plurality of mirrors has a reflection surface,
the plurality of mirrors are individually movable,
states of the reflection surfaces of the plurality of mirrors can be individually changed, and
change of a state of the reflection surface includes change of at least one of a position and an inclined angle of the reflection surface.
47. The processing apparatus according to claim 34, wherein
the beam irradiation system is capable of changing an intensity distribution, at a plane conjugate with the first plane with respect to the condensing optical system, of a beam incident on the condensing optical system.

48. The processing apparatus according to claim 47, wherein
the beam irradiation system has a spatial light modulator that is capable of changing the intensity distribution at the plane conjugate with the first plane.
49. The processing apparatus according to claim 48, wherein
the spatial light modulator has a plurality of mirrors.
50. The processing apparatus according to claim 1, wherein
at least one incident beam that is incident on the condensing optical system is a parallel beam.
51. The processing apparatus according to claim 1, wherein
the controller determines a relative movement velocity between the workpiece and the beam in accordance with the intensity distribution at the first plane.
52. The processing apparatus according to claim 1, wherein
the target portion is processed by relatively moving the workpiece and the beam.
53. The processing apparatus according to claim 1, further comprising:
a base member that supports the first holding system, wherein
the first holding system is supported by floating/levitation above the base member in an air-floating method or a magnetic levitation method.
54. The processing apparatus according to claim 1, wherein
the controller controls the first holding system and the beam irradiation system according to recipe data created beforehand.
55. The processing apparatus according to claim 1, further comprising:
a measurement system to acquire position information of the workpiece in a state where the workpiece is movable by the first holding system, wherein
the controller controls the first holding system and the beam irradiation system based on processing information with respect to the workpiece and the position information of the workpiece acquired by the measurement system.
56. The processing apparatus according to claim 55, wherein
the measurement system includes a three-dimensional measuring device.
57. The processing apparatus according to claim 55, wherein
the measurement system is capable of measuring position information of at least three points of the workpiece.
58. The processing apparatus according to claim 55, wherein
the measurement system is capable of measuring a three-dimensional shape of a target surface of the workpiece.
59. The processing apparatus according to claim 55, wherein
the controller controls the first holding system and the beam irradiation system according to recipe data created beforehand.
60. The processing apparatus according to claim 59, wherein
the controller creates the recipe data based on design data before and after processing of the workpiece.

61. The processing apparatus according to claim 55, wherein
the controller adjusts an intensity distribution of the beam at a first plane perpendicular to an optical axis on an exit surface side of the condensing optical system, based on a measurement result of the measurement system.

62. The processing apparatus according to claim 55, wherein
the controller controls a position and an attitude of the first holding member under a reference coordinate system, and
the target portion of the workpiece is correlated with the reference coordinate system, by acquiring the position information.

63. The processing apparatus according to claim 55, wherein
after the processing, the controller acquires position information of at least a part of the workpiece including a processed portion, with the measurement system.

64. The processing apparatus according to claim 63, wherein
the controller measures a three-dimensional shape as the position information of the at least a part.

65. The processing apparatus according to claim 64, wherein
the controller obtains a dimensional error of the processed portion based on the position information acquired by the measurement system.

66. The processing apparatus according to claim 65, wherein
the controller makes pass/fail decision of the processing, with the dimensional error.

67. The processing apparatus according to claim 65, wherein
the controller applies correction processing based on the dimensional error with the beam irradiation system, while the workpiece remains held on the first holding member.

68. The processing apparatus according to claim 63, wherein
the controller adjusts at least one of the measurement system, the beam irradiation system and the first holding system, based on the position information of the at least a part of the workpiece including the processed portion.

69. The processing apparatus according to claim 68, wherein
the controller obtains tendency of a drift of the apparatus in the processing based on the position information, and adjusts at least one of the measurement system, the beam irradiation system and the first holding system in accordance with a result obtained.

70. The processing apparatus according to claim 1, further comprising:
a sensor to receive a beam emitted from the condensing optical system, with a light-receiving section.

71. The processing apparatus according to claim 70, wherein
the sensor is capable of measuring the intensity distribution of the beam.

72. The processing apparatus according to claim 70, wherein
the controller receives the beam with the light-receiving section of the sensor, while moving the light-receiving section.

73. The processing apparatus according to claim 70, wherein
the light-receiving section is disposed to receive the beam at the first plane or near the first plane.

74. The processing apparatus according to claim 70, wherein
the light-receiving section is capable of receiving a beam from the condensing optical system while moving in at least one of a direction parallel to an optical axis on an exit surface side of the condensing optical system and a direction perpendicular to the optical axis.

75. The processing apparatus according to claim 70, wherein
the sensor is capable of measuring the intensity distribution of the beam in a first plane perpendicular to an optical axis on an exit surface side of the condensing optical system.

76. The processing apparatus according to claim 70, wherein
the controller adjusts the intensity distribution of the beam at the first plane based on a result of measurement performed by the sensor.

77. The processing apparatus according to claim 70, wherein
the controller performs adjustment of at least one of the beam irradiation system and the first holding system based on a result of measurement performed by the sensor.

78. The processing apparatus according to claim 1, further comprising:
a carrier system to load the workpiece before processing onto the first holding member, and unload the workpiece to which the processing has been completed from the first holding member, wherein
the controller controls the carrier system.

79. The processing apparatus according to claim 1, wherein
the processing includes removal processing.

80. The processing apparatus according to claim 1, wherein
a shape of the workpiece is changed by the processing.

81. The processing apparatus according to claim 1, wherein
a surface of the workpiece on which the beam is irradiated for the processing is a metallic surface.

* * * * *

UNITED STATES PATENT AND TRADEMARK OFFICE
CERTIFICATE OF CORRECTION

PATENT NO. : 11,691,217 B2
APPLICATION NO. : 16/668305
DATED : July 4, 2023
INVENTOR(S) : Yuichi Shibazaki It is certified that error appears in the above-identified patent and that said Letters Patent is hereby corrected as shown below:

On the Title Page

After item (63), add:
-- (30) Foreign Application Priority Data
May 1, 2017 (JP) .................................. PCT/JP2017/017119 --

Signed and Sealed this
Twentieth Day of August, 2024

Katherine Kelly Vidal
*Director of the United States Patent and Trademark Office*